(12) United States Patent
Chen

(10) Patent No.: US 11,325,697 B1
(45) Date of Patent: *May 10, 2022

(54) VTOL FLYING WING AND FLYING WING AIRCRAFT

(71) Applicant: Franklin Y. K. Chen, Northport, NY (US)

(72) Inventor: Franklin Y. K. Chen, Northport, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/212,346

(22) Filed: Jul. 18, 2016

(51) Int. Cl.
| B64C 29/00 | (2006.01) |
| B64C 15/14 | (2006.01) |
| B64C 25/32 | (2006.01) |
| B64C 39/08 | (2006.01) |
| A62B 5/00  | (2006.01) |
| B64C 39/00 | (2006.01) |

(52) U.S. Cl.
CPC .......... B64C 29/0008 (2013.01); B64C 15/14 (2013.01); B64C 25/32 (2013.01); B64C 39/005 (2013.01); B64C 39/08 (2013.01); A62B 5/00 (2013.01)

(58) Field of Classification Search
CPC ........ B64C 15/14; B64C 25/32; B64C 37/00; B64C 39/005; B64C 39/08; B64D 1/22; B60F 5/02; A62B 5/00
See application file for complete search history.

(56) References Cited

U.S. PATENT DOCUMENTS

| 1,825,493 A | * | 9/1931 | Wander, Jr. | B64C 39/005 244/19 |
| 2,008,771 A | * | 7/1935 | Reed | B64C 11/343 416/133 |
| 2,012,768 A | * | 8/1935 | Nemeth | B64C 39/005 244/22 |
| 2,018,730 A | * | 10/1935 | Paulm | B64C 39/005 244/20 |
| 2,309,899 A | * | 2/1943 | Hepperle | B63H 1/26 416/162 |
| 2,339,338 A | * | 1/1944 | Karlik | B64C 39/08 244/13 |
| 2,413,460 A | * | 12/1946 | Main | B64C 39/005 244/9 |
| 2,436,113 A | * | 2/1948 | Main | B64C 39/005 244/9 |
| 3,065,934 A | * | 11/1962 | Jackson | B64D 1/22 244/17.21 |

(Continued)

FOREIGN PATENT DOCUMENTS

| GB | 2412356 A | * | 9/2005 | ............. B64C 39/02 |
| WO | WO-2021144485 A1 | * | 7/2021 | ............. B64C 39/00 |

*Primary Examiner* — Joseph W Sanderson

(74) *Attorney, Agent, or Firm* — Edwin D. Schindler

(57) ABSTRACT

A vertical take-off and landing ("VTOL") aircraft has at least two flying wings ("FW") with each FW equipped with multiple transverse-radial propellers or a propulsion system for producing a lift force and thrust force on the stationary or non-stationary FW. This VTOL/FWA is capable of exchanging payloads horizontally, as well as vertically, with a stationary or a moving object. In particular, the VTOL/FWA can "walk" on a building wall to adjust and anchor its position in order to rescue people from a high-rise-building window horizontally.

24 Claims, 33 Drawing Sheets

(56) References Cited

U.S. PATENT DOCUMENTS

| | | | | |
|---|---|---|---|---|
| 3,312,286 | A * | 4/1967 | Irgens | B63H 1/14 416/197 R |
| 3,506,220 | A * | 4/1970 | Anthony | B64C 39/005 244/19 |
| 3,697,193 | A * | 10/1972 | Phillips | B63H 1/26 416/223 R |
| 3,931,868 | A * | 1/1976 | Smith, Jr. | A62B 1/02 182/145 |
| 4,113,207 | A * | 9/1978 | Dalziel | B64D 1/22 182/137 |
| 4,158,448 | A * | 6/1979 | Mochizuki | B64C 31/032 244/13 |
| 4,194,707 | A * | 3/1980 | Sharpe | B64C 3/141 244/12.3 |
| 4,210,299 | A * | 7/1980 | Chabonat | B64C 39/005 244/20 |
| 4,411,598 | A * | 10/1983 | Okada | F01P 5/02 416/223 R |
| 4,802,822 | A * | 2/1989 | Gilgenbach | B63H 1/26 416/235 |
| 5,022,820 | A * | 6/1991 | Bergeron | B63H 3/008 416/153 |
| 5,098,034 | A * | 3/1992 | Lendriet | B64C 3/385 244/12.5 |
| 5,100,080 | A * | 3/1992 | Servanty | B64C 39/005 244/9 |
| 5,209,642 | A * | 5/1993 | Larimer | B63H 5/16 416/223 R |
| 5,265,827 | A * | 11/1993 | Gerhardt | B64C 39/005 244/20 |
| 5,375,795 | A * | 12/1994 | Strunk | B64D 1/22 244/118.5 |
| 5,403,160 | A * | 4/1995 | You | F04D 29/384 416/223 R |
| 5,454,531 | A * | 10/1995 | Melkuti | B64C 29/0025 244/12.6 |
| 5,758,844 | A * | 6/1998 | Cummings | B64C 29/0033 244/12.4 |
| 6,164,591 | A * | 12/2000 | Descatha | B64C 39/08 244/48 |
| 6,719,244 | B1 * | 4/2004 | Gress | B64C 29/0033 244/17.25 |
| 6,824,096 | B2 * | 11/2004 | Zoppitelli | B64C 27/28 244/17.25 |
| 6,834,835 | B1 * | 12/2004 | Knowles | B64C 3/54 244/198 |
| 6,892,979 | B2 * | 5/2005 | Milde, Jr. | B64C 29/0025 244/12.3 |
| 6,942,458 | B2 * | 9/2005 | McCallum | F04D 29/362 416/139 |
| 6,991,426 | B2 * | 1/2006 | Pietricola | F04D 29/544 415/193 |
| 7,063,291 | B2 * | 6/2006 | Rado | B64C 3/42 244/101 |
| 7,281,900 | B2 * | 10/2007 | Zientek | B64C 27/467 416/231 B |
| 7,461,811 | B2 * | 12/2008 | Milde, Jr. | B64C 3/56 244/12.3 |
| 7,607,606 | B2 * | 10/2009 | Milde, Jr. | B64C 3/56 244/12.3 |
| 7,641,144 | B2 * | 1/2010 | Kummer | B64C 39/005 244/12.5 |
| 7,735,773 | B2 * | 6/2010 | Schwaiger | B64C 39/008 244/9 |
| 8,177,159 | B2 * | 5/2012 | Khakimov | A62B 5/00 244/5 |
| 8,448,905 | B2 * | 5/2013 | Peebles | B64C 39/005 244/206 |
| 8,528,855 | B2 * | 9/2013 | Seifert | B64C 39/005 244/21 |
| 8,561,935 | B2 * | 10/2013 | Milde, Jr. | B64C 21/04 244/9 |
| 8,800,912 | B2 * | 8/2014 | Oliver | B64C 39/08 244/12.4 |
| 9,187,175 | B1 * | 11/2015 | Chen | B64C 39/08 |
| 10,377,480 | B2 * | 8/2019 | Groninga | B64C 15/12 |
| 2006/0054736 | A1 * | 3/2006 | Milde, Jr. | B64C 29/0033 244/9 |
| 2006/0202081 | A1 * | 9/2006 | Milde, Jr. | B64C 39/005 244/12.1 |
| 2006/0266879 | A1 * | 11/2006 | Svoboda, Jr. | B64C 27/24 244/7 A |
| 2006/0266882 | A1 * | 11/2006 | Kummer | B64C 39/005 244/55 |
| 2008/0121752 | A1 * | 5/2008 | Chen | B64C 11/30 244/13 |
| 2010/0096493 | A1 * | 4/2010 | Khakimov | B64B 1/36 244/25 |
| 2011/0101173 | A1 * | 5/2011 | Peebles | B64C 39/005 244/204.1 |
| 2011/0315809 | A1 * | 12/2011 | Oliver | B64D 27/06 244/12.4 |
| 2012/0068020 | A1 * | 3/2012 | Milde, Jr. | B64C 21/04 244/207 |
| 2012/0111994 | A1 * | 5/2012 | Kummer | B63G 8/18 244/15 |
| 2012/0160955 | A1 * | 6/2012 | Seifert | B64C 39/005 244/21 |
| 2012/0226394 | A1 * | 9/2012 | Marcus | A62B 5/00 701/2 |

* cited by examiner

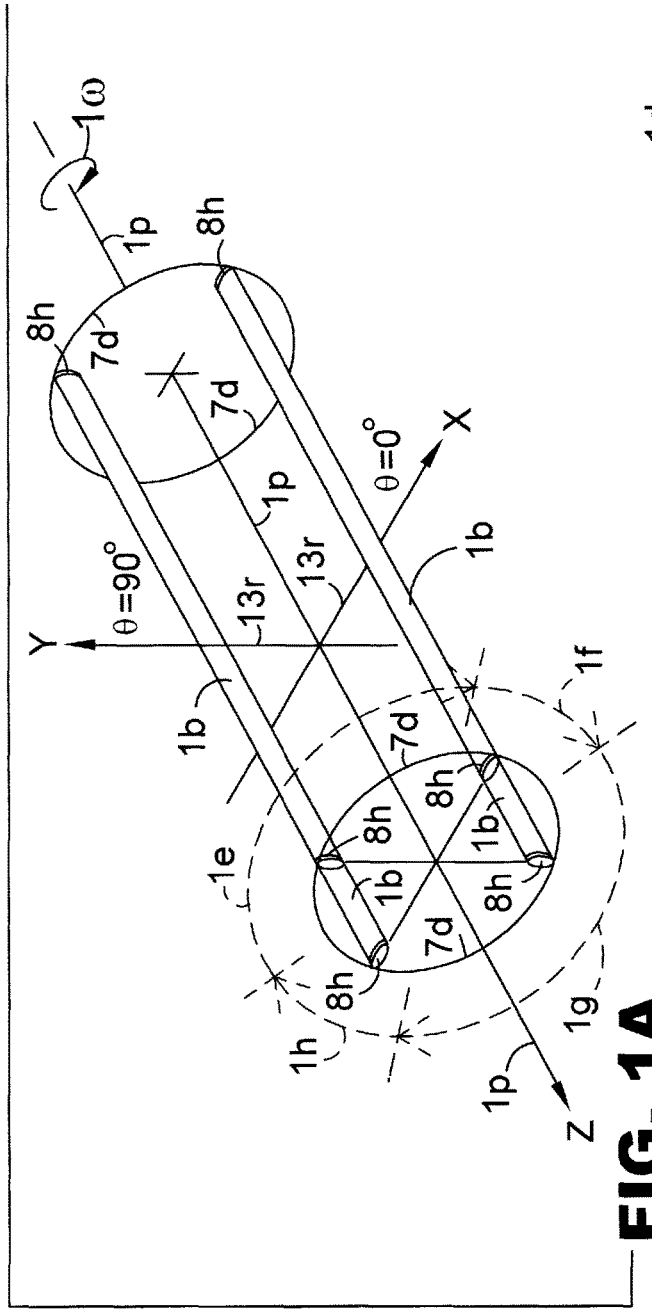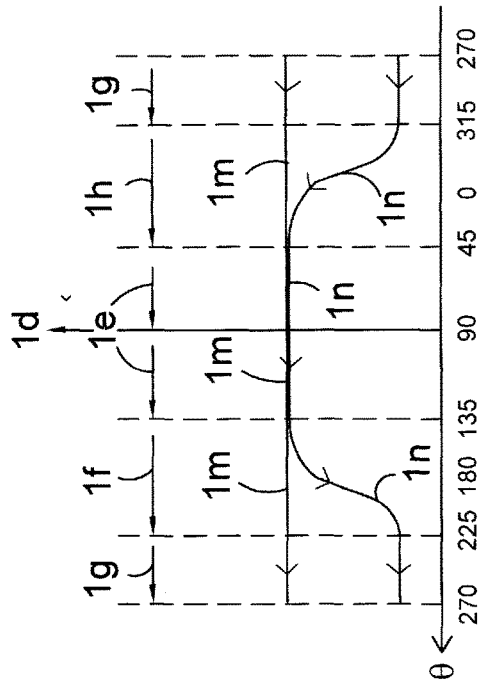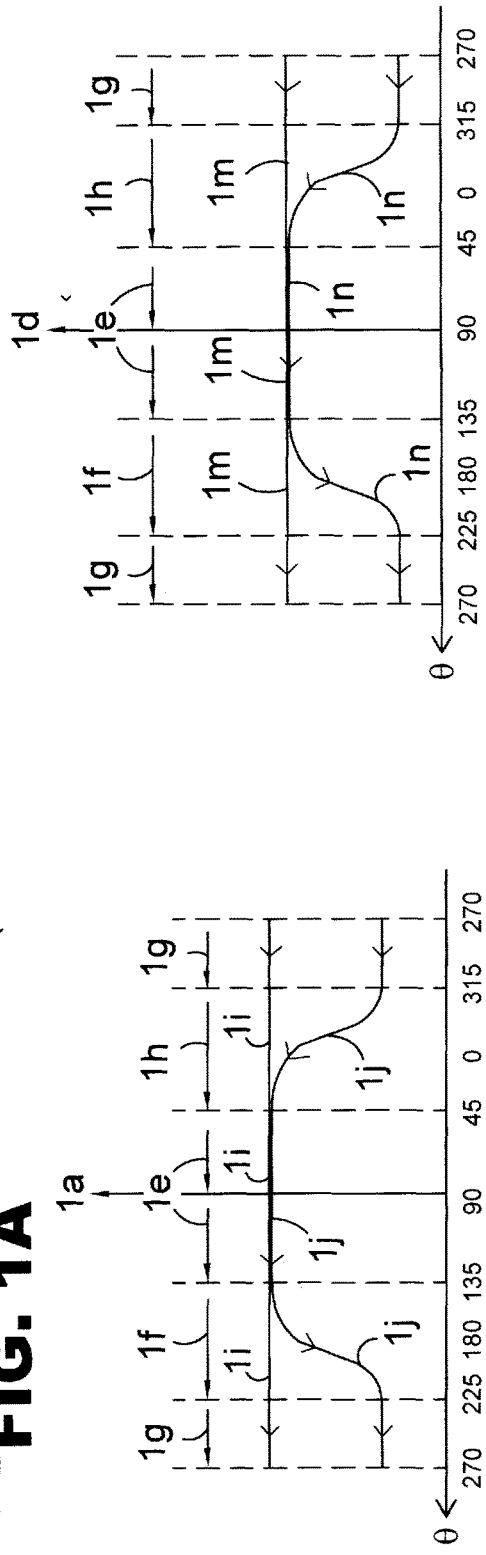
FIG. 1A
FIG. 1B
FIG. 1C

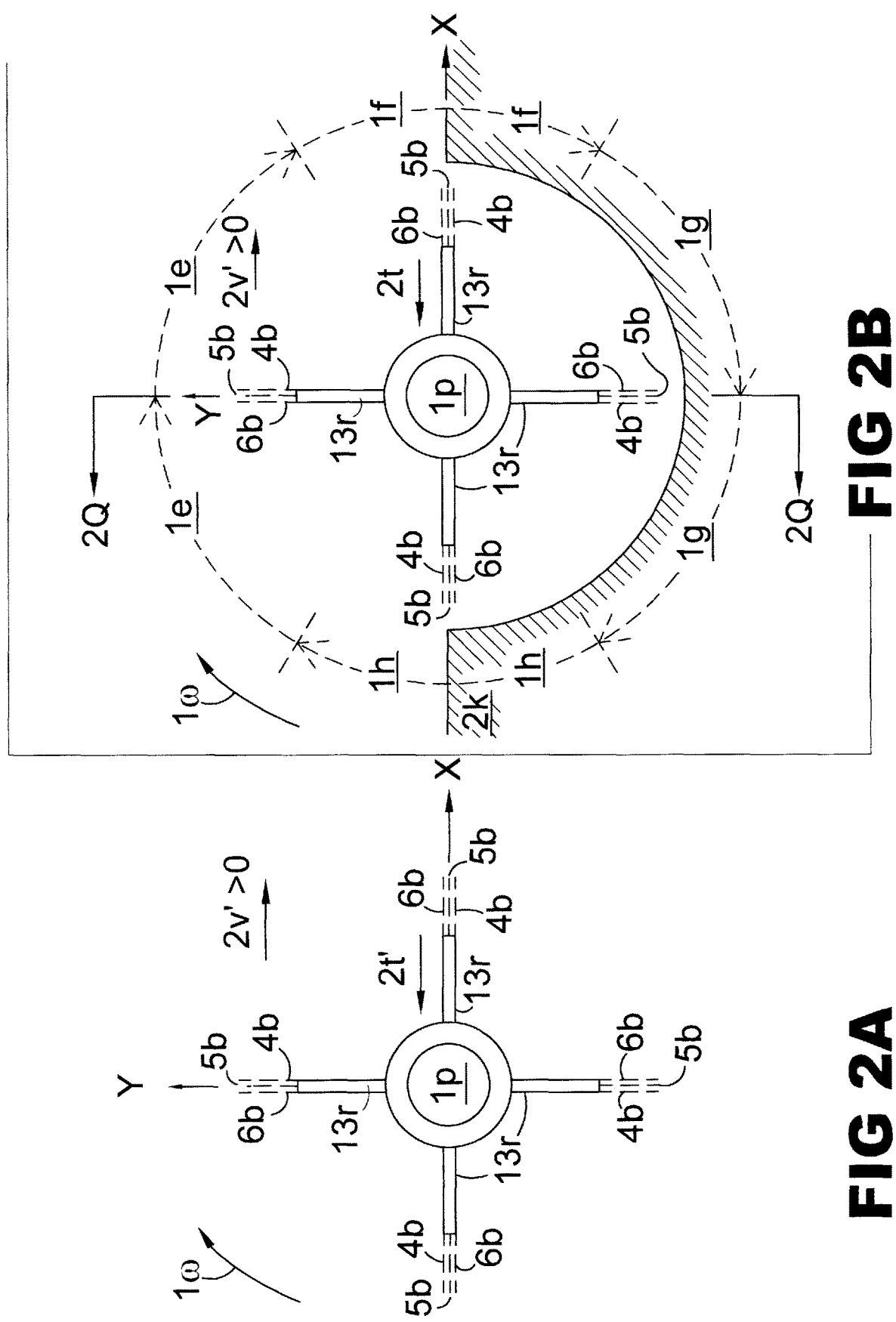

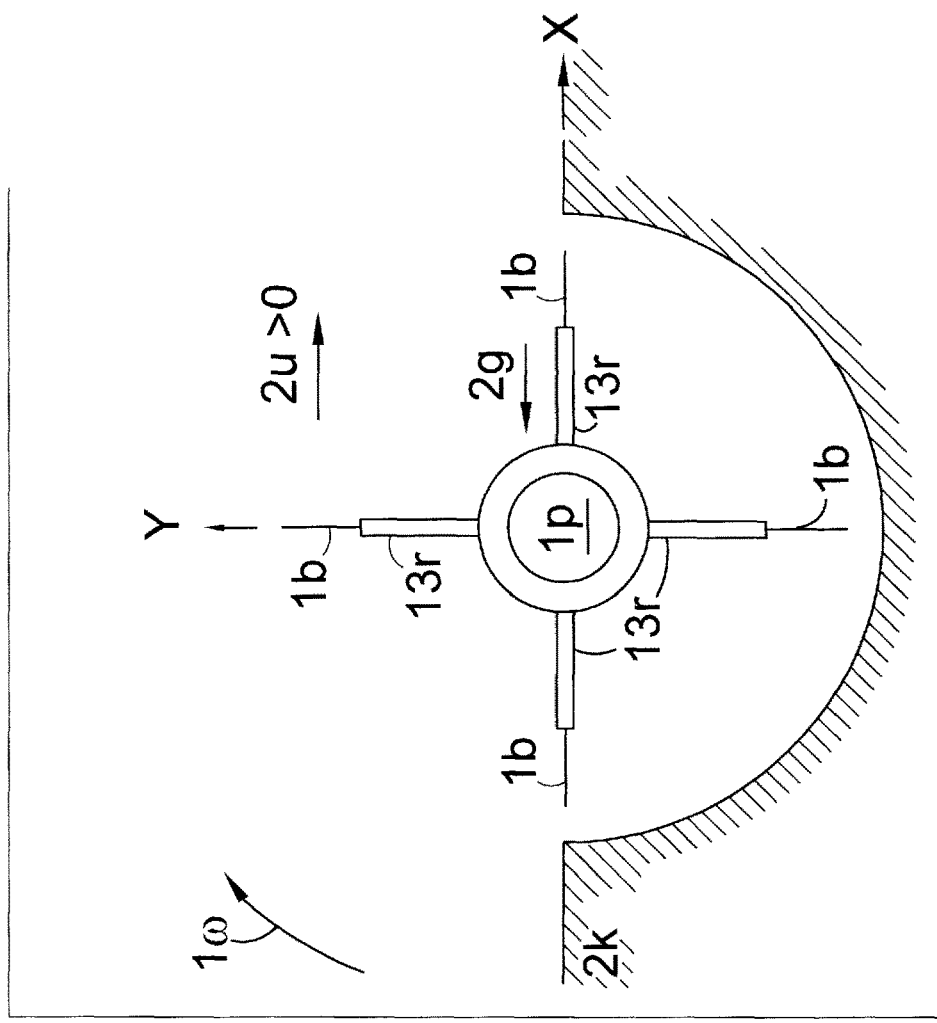
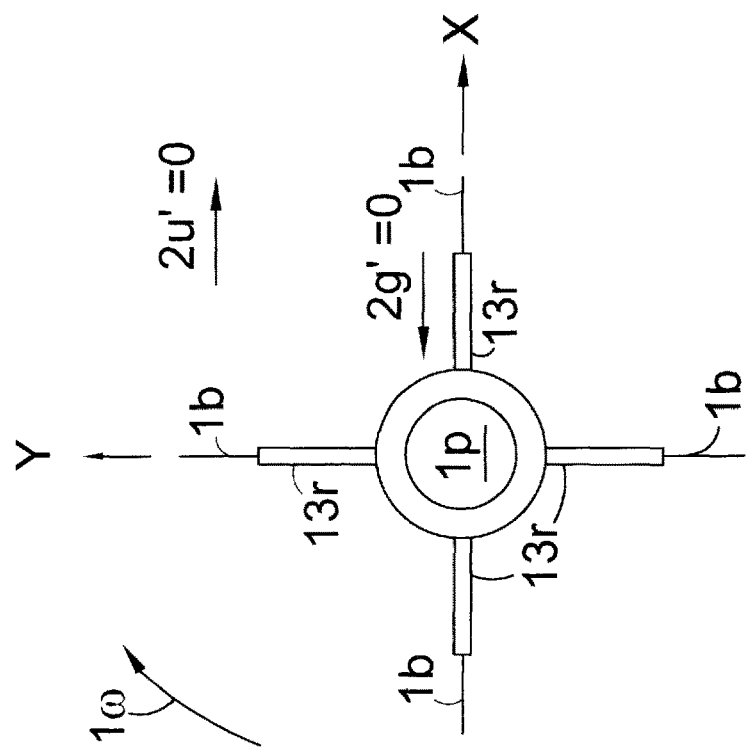
FIG 2D
FIG 2C

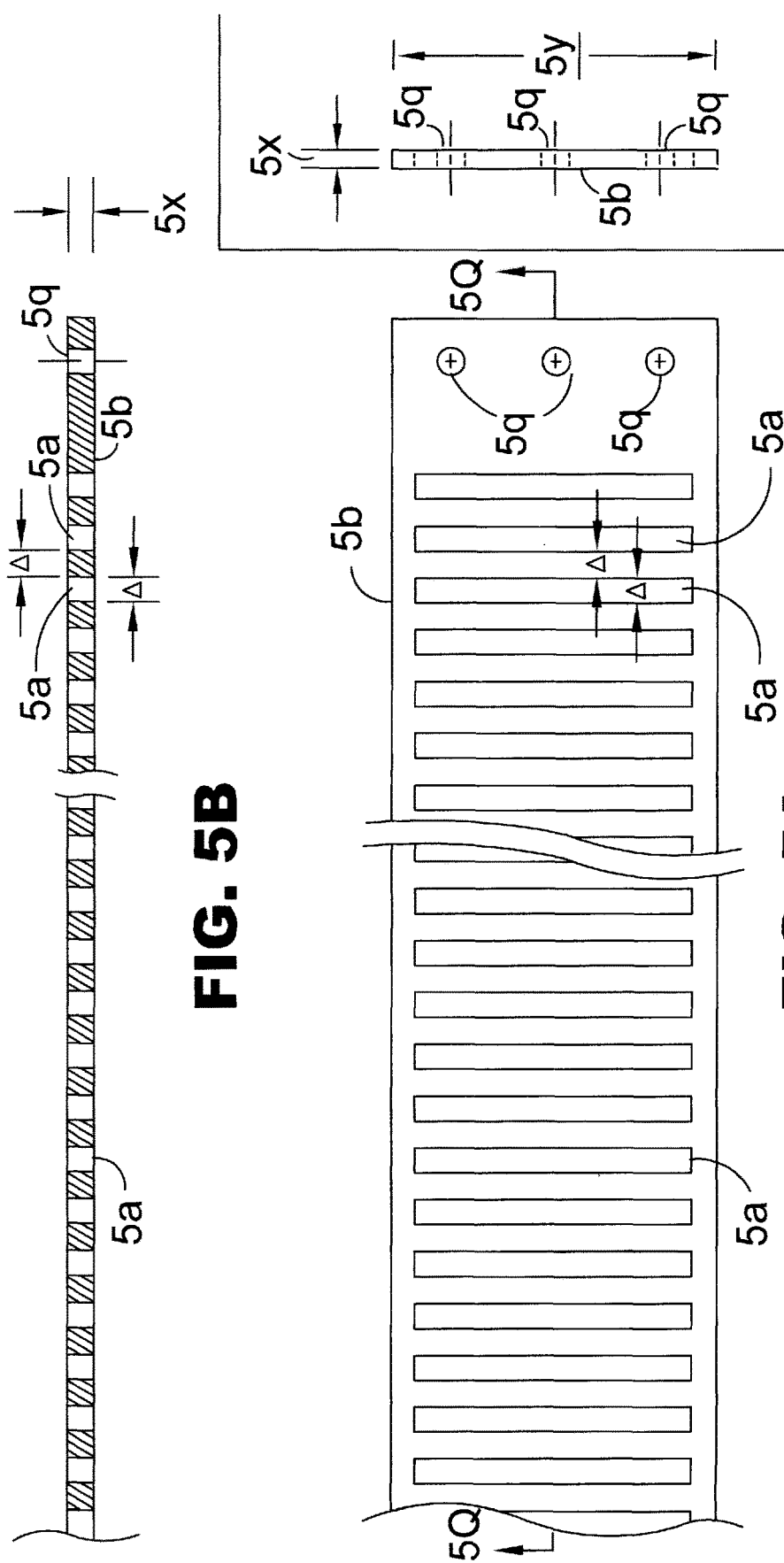

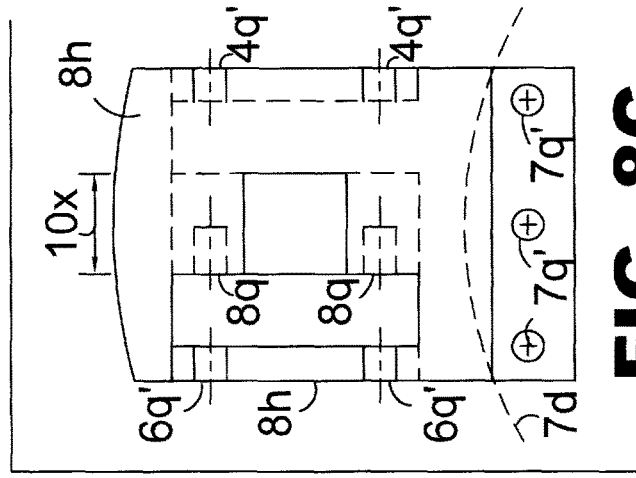
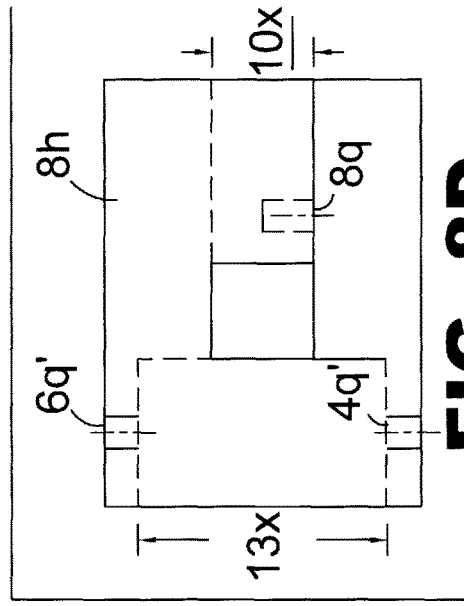
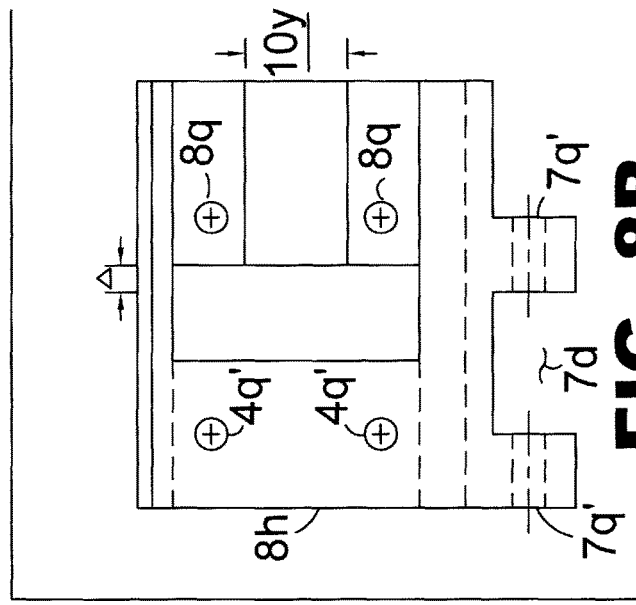
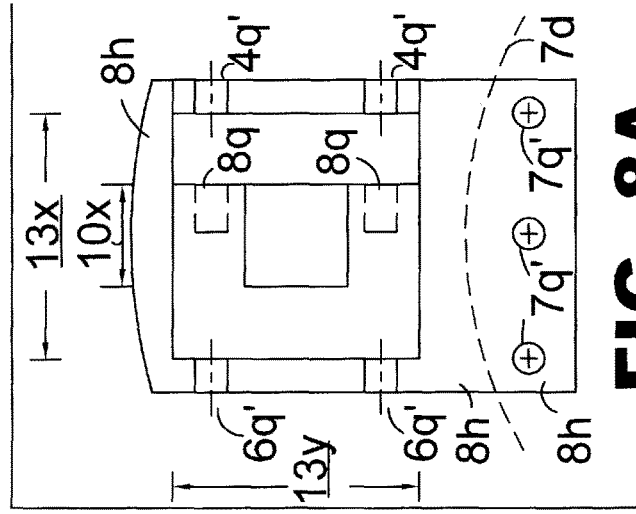

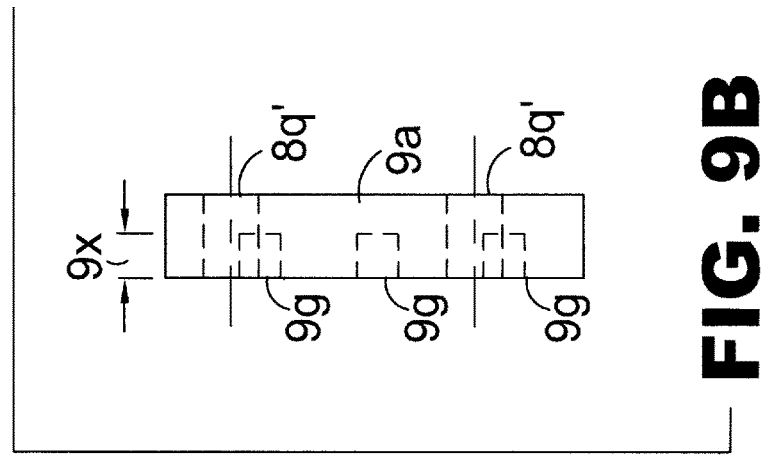
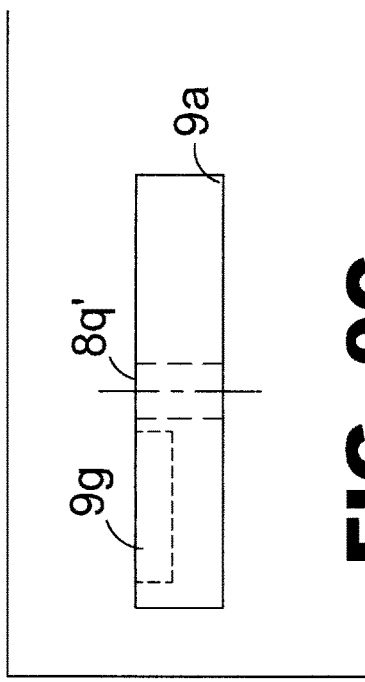
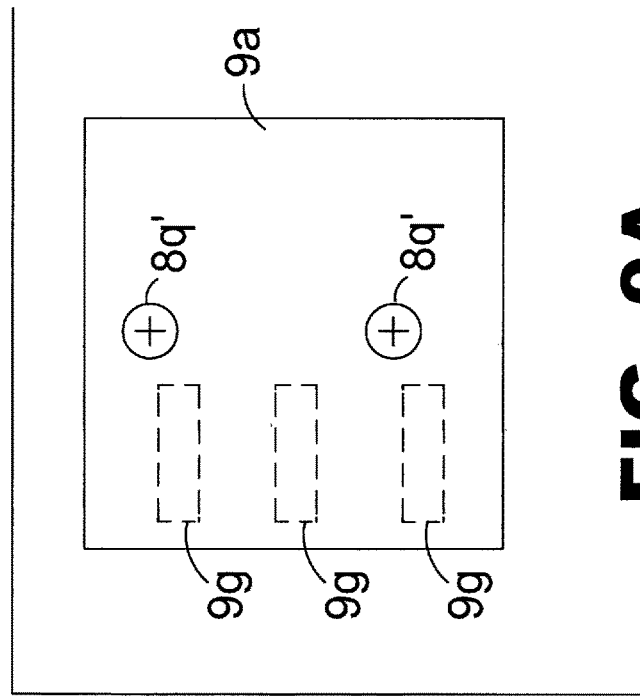
FIG. 9B
FIG. 9C
FIG. 9A

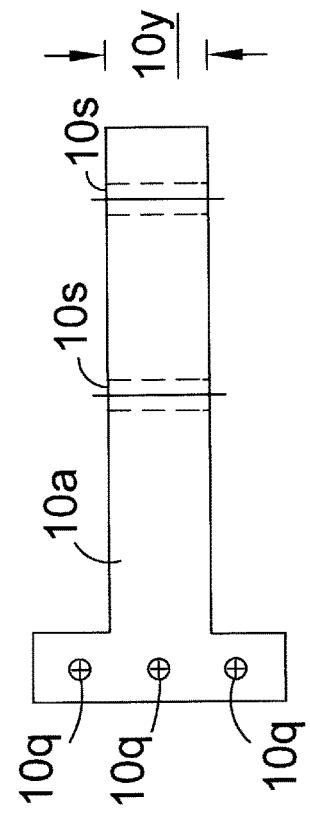
FIG. 10A
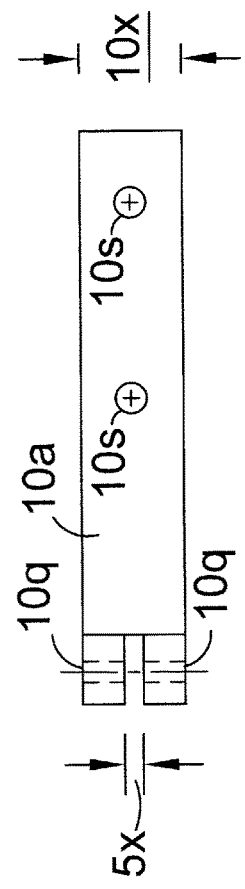
FIG. 10B
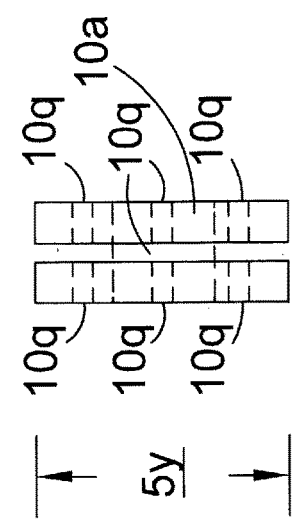
FIG. 10C
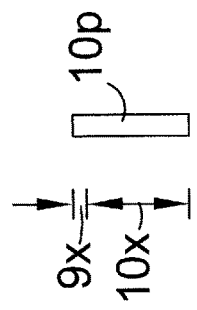
FIG. 10D
FIG. 10E

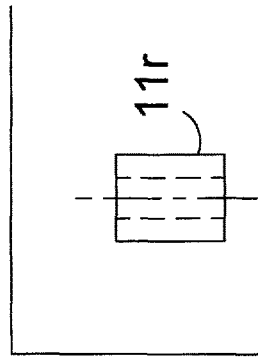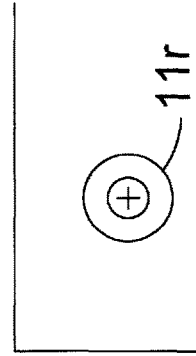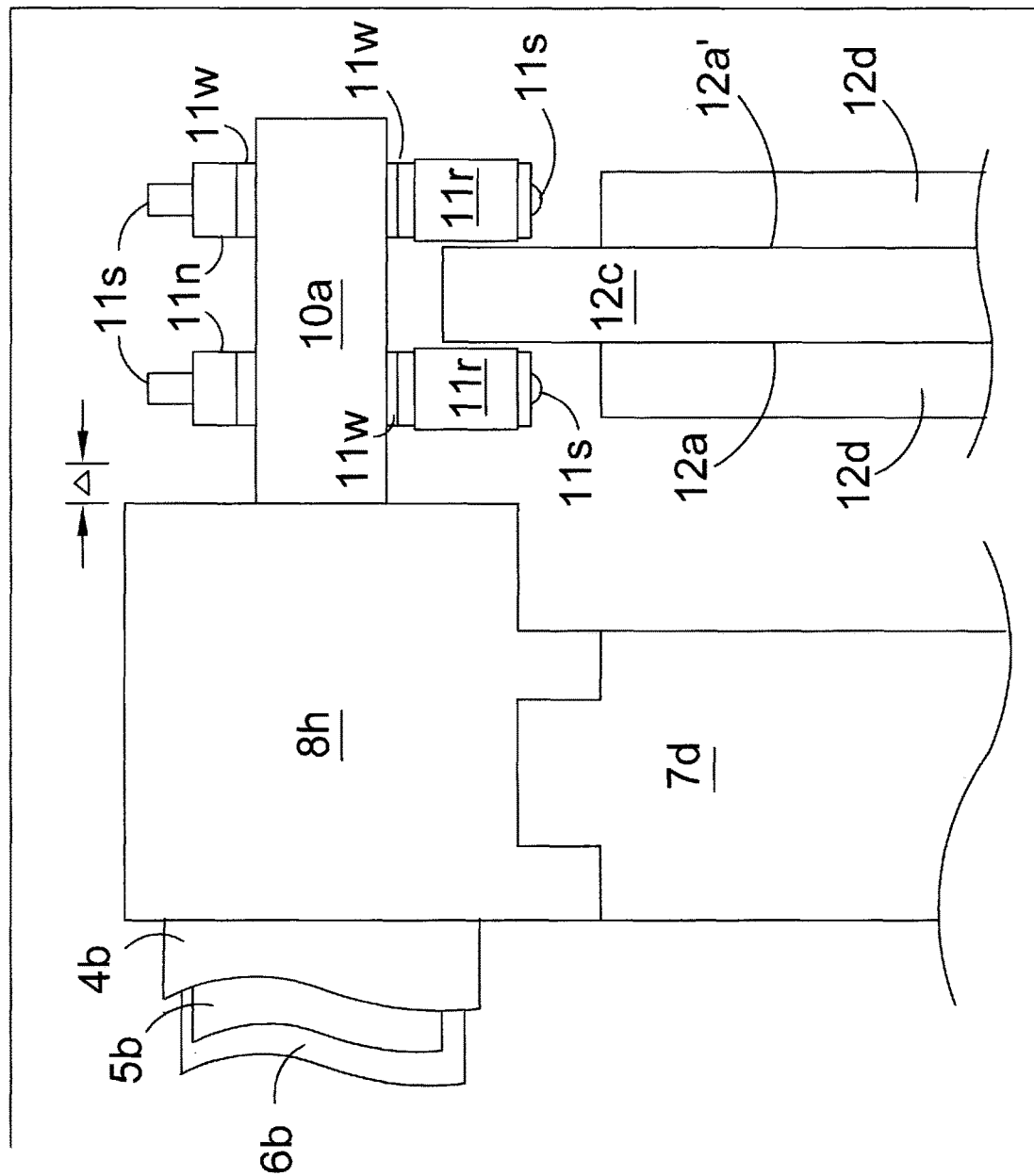

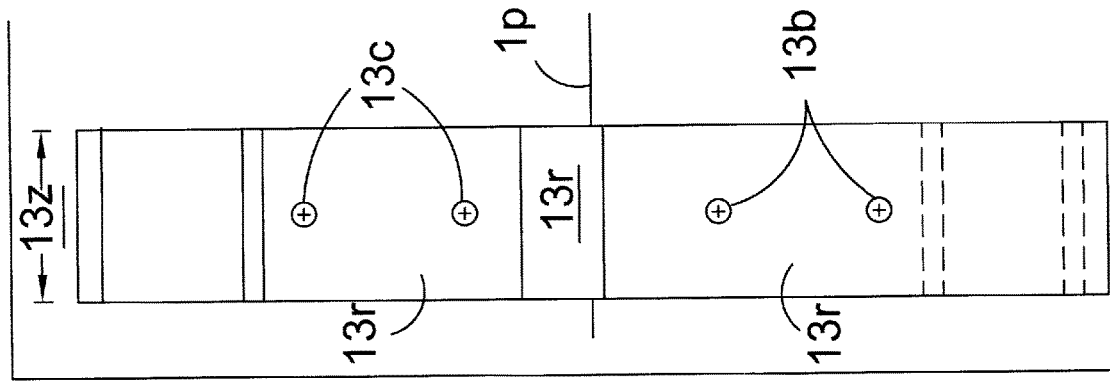
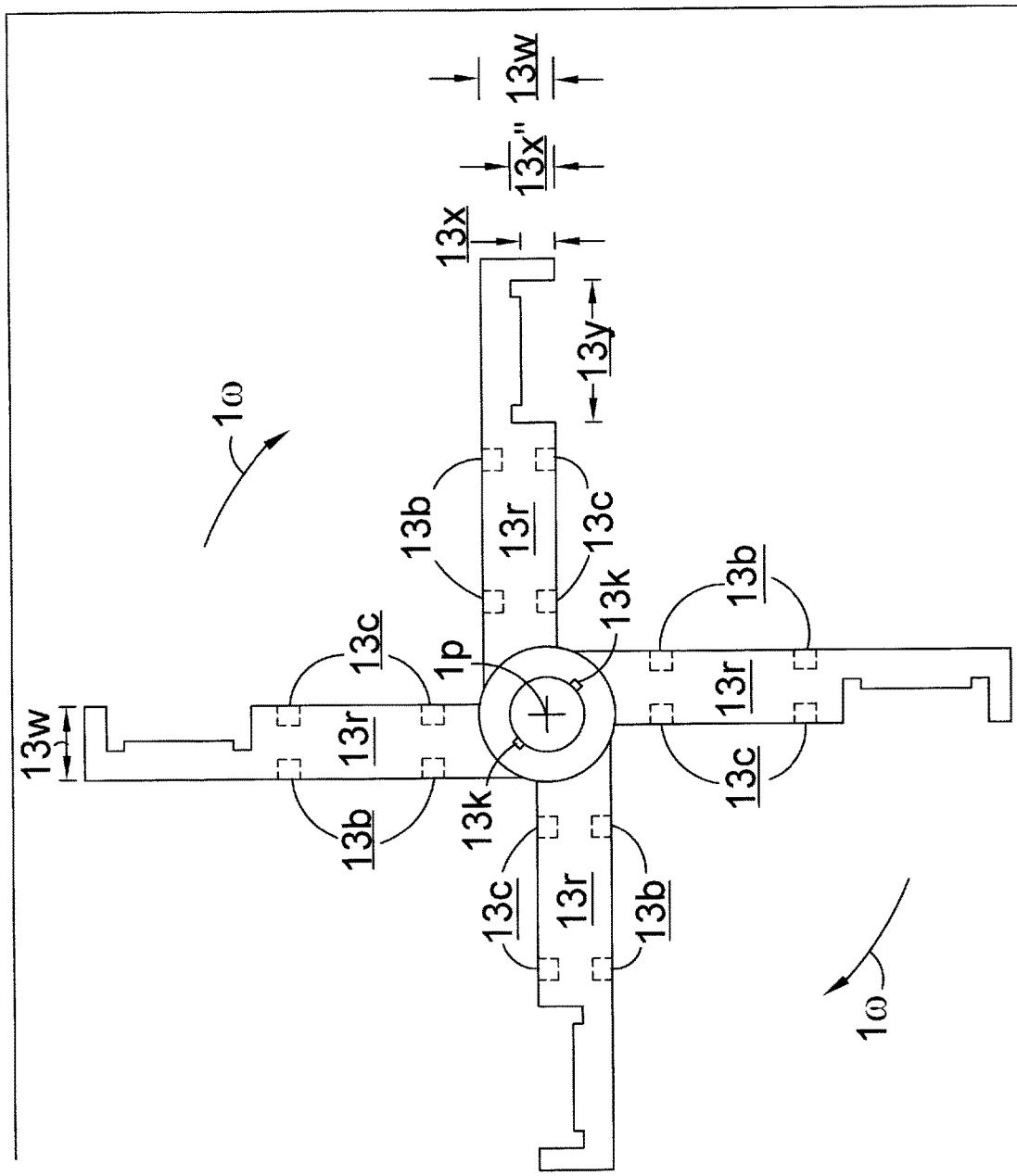

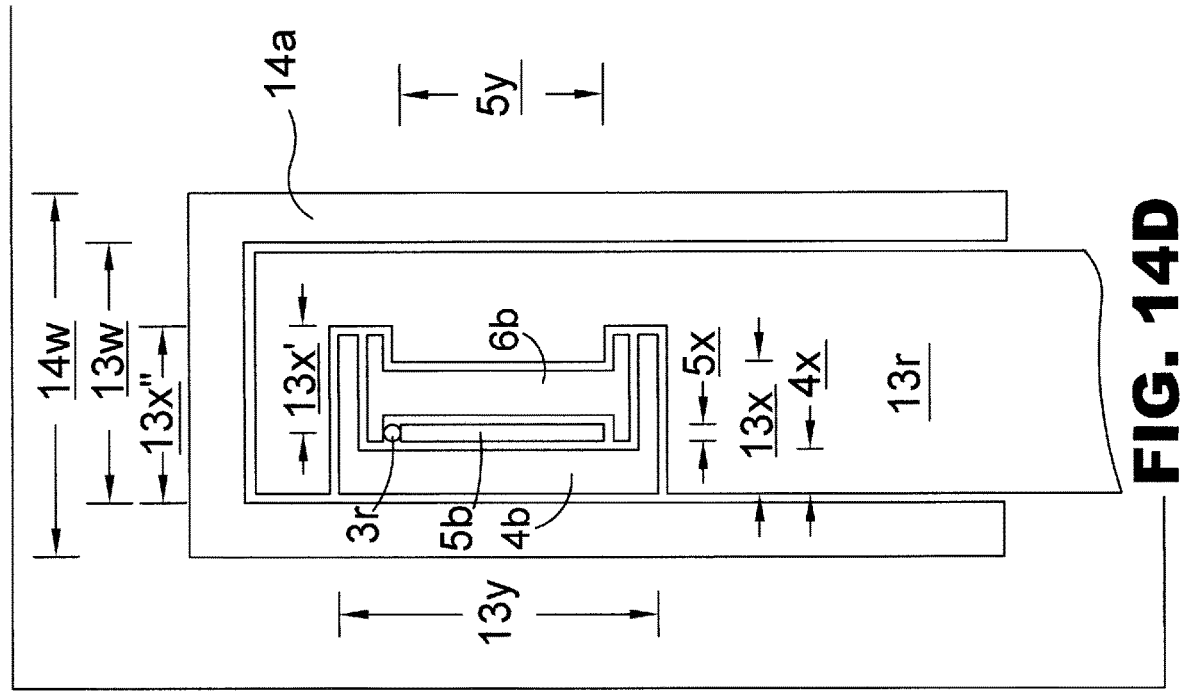
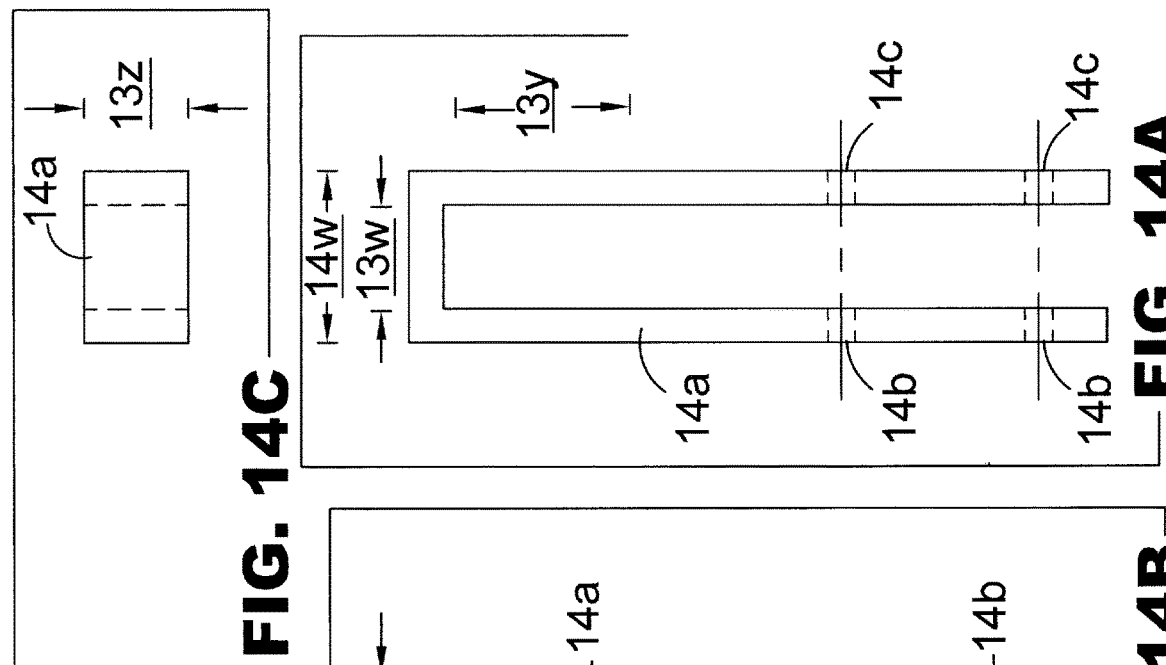
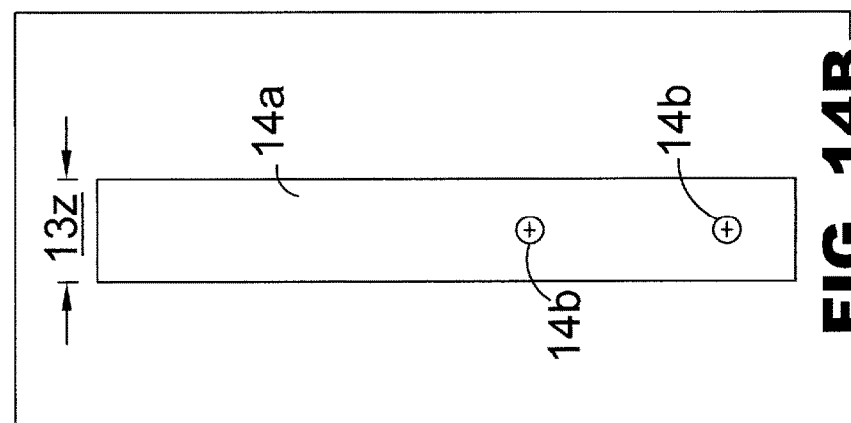

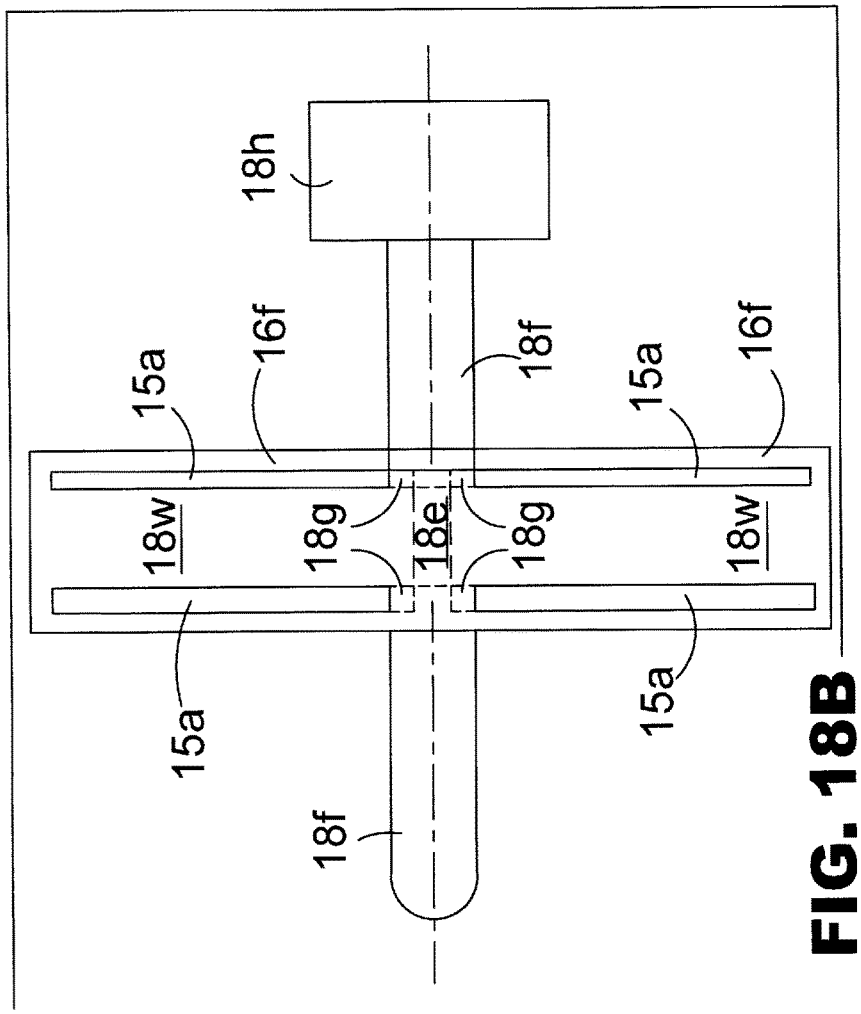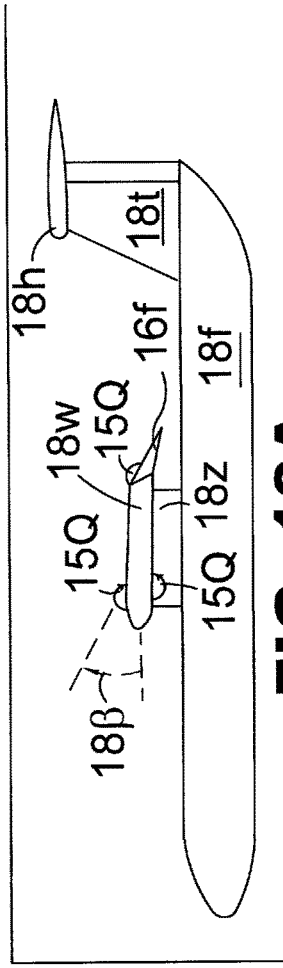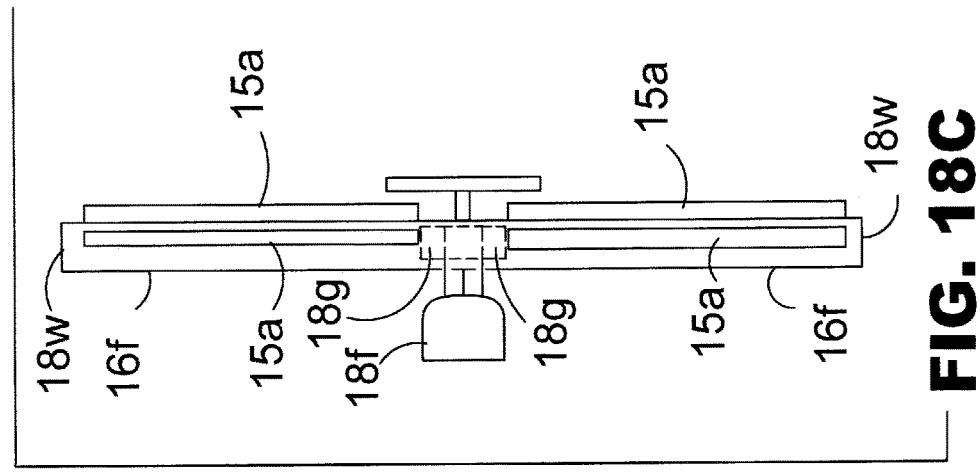

US 11,325,697 B1

VTOL FLYING WING AND FLYING WING AIRCRAFT

BACKGROUND OF THE INVENTION

The global population is increasing rapidly and more people are concentrated in big cities around the world. This causes the rapid increase in the construction of high rise buildings of more than 10 stories high. It has become difficult, if not impossible, to rescue people marooned in these buildings. The principal objective of this invention is to solve this problem by inventing a VTOL flying-craft called VTOL/FWA, hereinafter referred to variously as FW, Flying Wing, or Flying Wing Aircraft, that is specially designed to perform rescue missions horizontally through the high rise building windows.

Various VTOL capable aircraft are now in service. Some have suggested in the prior art. However, none of these crafts can load/unload their payloads horizontally, while hovering nor can these prior art "walk" on building walls to align them to exact window openings. These are the many capabilities of the VTOL/FWA of this patent application.

FIELD OF THE INVENTION

The present invention relates to: (1) Flying-Wing (FW), powered by transverse-radial propellers or any type of suitable propulsion systems, (2) Lift developed on a stationary or moving FW proportional to velocities difference across the wing and proportional to the wing area, (3) Balancing/unbalancing force and moment vectors on VTOL-Flying-Wing Aircraft (VTOL/FWA) and (4) VTOL/FWA walking on vertical surfaces, (5) Anchor a VTOL/FWA outside building window and (6) Horizontal or vertical exchange of payloads between a VTOL/FWA and another object.

DESCRIPTION OF THE PRIOR ART

References

Asymmetrically Changing Rotating Blade Shape [ACRBS] Propeller & Its Airplane and Wind-Turbine Applications. U.S. patent Ser. No. 11/592,851 (Nov. 3, 2006).

U.S. Pat. Nos. 6,991,426 and 6,942,458 describe variable pitch propellers. In 1871 J. Croce-Spinelli first proposed a design to change a propeller pitch by hydraulic pressure (U.S. Pat. No. 6,991,426). In 1920 F. W. Caldwell conducted research to automatically adjust propeller pitch according to the mission need of the airplane (U.S. Pat. No. 6,942,458). However all these variable pitches are designed to fit a specified mission interval, such as during take-off or high altitude cruse, etc. All these variable pitch propellers are not designed to repeat in every cycle of propeller rotation. Furthermore, both lift and drag force components are developed on these propeller blades, except during feather conditions when the propeller is not rotating.

There are other aspects of Vertical-Take-off and Landing aircraft designed for carrying payloads or completing rescue missions. Typical of these is U.S. Pat. No. 2,008,771 issued to Reed on Jul. 23, 1935.

Another patent was issued to Hepperle on Feb. 2, 1943 as U.S. Pat. No. 2,309,899. Yet another U.S. Pat. No. 3,312,286 was issued to Irgens on Apr. 4, 1967. Another was issued to Sbrilli on Apr. 14, 1970 as U.S. Pat. No. 3,506,220 and still yet another was issued on Oct. 10, 1972 to Adrian Phillips as U.S. Pat. No. 3,697,193.

Another patent was issued to Mochizuki on Jun. 19, 1979 as U.S. Pat. No. 4,158,448. Yet another U.S. Pat. No. 4,194,707 was issued to Sharpe on Mar. 25, 1980. Yet another U.S. Pat. No. 4,411,598 was issued to Okada on Oct. 25, 1983. Another was issued to Gilgenbach on Feb. 7, 1989 as U.S. Pat. No. 4,802,822 and still yet another was issued on Jun. 11, 1991 to Bergeron as U.S. Pat. No. 5,022,820.

Another patent was issued to Larimer on May 11, 1993 as U.S. Pat. No. 5,209,642. Yet another U.S. Pat. No. 5,403,160 was issued to You on Apr. 4, 1995. Another was issued to Melkuti on Oct. 3, 1995 as U.S. Pat. No. 5,454,531 and still yet another was issued on Jun. 2, 1998 to Darold B. Cummings as U.S. Pat. No. 5,758,844.

Another patent was issued to Gress on Apr. 13, 2004 as U.S. Pat. No. 6,719,244. Yet another U.S. Pat. No. 6,834,835 was issued to Knowles on Dec. 28, 2004. Another was issued to Milde on May 17, 2005 as U.S. Pat. No. 6,892,979 and still yet another was issued on Sep. 13, 2005 to McCallum as U.S. Pat. No. 6,942,458.

Another patent was issued to Pietricola on Jan. 31, 2006 as U.S. Pat. No. 6,991,426. Yet another U.S. Pat. No. 7,063,291 was issued to Rado on Jun. 20, 2006. Another was issued to Zientek on Oct. 16, 2007 as U.S. Pat. No. 7,281,900 and still yet another was published on May 29, 2008 to Chen as U.S. Patent Application No. 2008/0121752.

Another application was published to Watts on Jun. 28, 2007 as W.O. International Patent Application No. 2007/071924. Yet another W.O. International Patent Application No. 2008/075187 was published to Bianchi on Jun. 26, 2008. Another was published to Nak-Agawa on Jan. 15, 2009 as W.O. International Patent Application No. 2009/008513.

U.S. Pat. No. 2,008,771
Inventor: S. A. Reed
Issued: Jul. 23, 1935

This invention relates to aeronautical propellers of the type wherein the pitch of the propeller blades is automatically variable in flight in response to the propeller thrust.

U.S. Pat. No. 2,309,899
Inventor: A. Hepperle
Issued: Feb. 2, 1943

This invention relates to adjustable, variable pitch propellers in general, and particularly to the kind applicable for use with both aircraft and its vessels.

U.S. Pat. No. 3,312,286
Inventor: F. T. Irgens
Issued: Apr. 4, 1967

The invention relates generally to propellers. More particularly, the invention relates primarily to surface propellers.

U.S. Pat. No. 3,506,220
Inventor: Anthony Sbrilli
Issued: Apr. 14, 1970

A horizontal axis, flat lifting rotor and control wing for aircraft, similar to helicopters and autogyros, that may be adapted for use as a toy for children, advertising devices, and as a form of a windmill when positioned in a windmill form. The invention includes a hollow wing having slotted recesses on opposite sides, and in which the wing element is rotated from an engine or motor source within the fuselage. It combines the proportion and support means of such aircraft.

U.S. Pat. No. 3,697,193
Inventor: Adrian Phillips
Issued: Oct. 10, 1972

Airfoil sections having improved lift characteristics are described for use as propeller blades for air or marine craft for wings of aircraft for hydrofoil sections of hydrofoil vessels and for rotor blades in compressor stages of gas turbine engines. The improved section is characterized by planar upper portion and convex face extending rearwardly of the leading edge for approximately one-third of the chord length of the section whereupon the face assumes a planar shape terminating at the trailing edge in either convergent or parallel relation with the upper surface of the section. The camber line of the trailing edge may be deflected in a direction away from the upper surface at an angle to the mean camber line of the section. Such improved airfoils provide lift by generation of a large positive pressure on the face of the section and only a small negative pressure on the upper surface of the section.

U.S. Pat. No. 4,158,448
Inventor: Matsuji Mochizuki
Issued: Jun. 19, 1979

An airplane includes a wing having the configuration of an equilateral triangle and covered with flexible membrane which is provided with free trailing edges. The wing is secured by pivot brackets to the top of supports placed at the center of gravity of the airplane body as to pivot right and left alternatively to obtain self-balancing of flight like the action of flying a kite, such that it is safe and easy to control the airplane during takeoff, landing and sustained flight while increasing the lifting force.

U.S. Pat. No. 4,194,707
Inventor: Thomas A. Sharpe
Issued: Mar. 25, 1980

A lift augmenting device to provide a vertical take-off capability in aircraft which includes a pair of rotor assemblies with independently individually pivoted rotor vanes so that the attitude of the vanes can be changed at different positions along the circumferential rotational path of the vanes as they rotate with the rotor assemblies to pump air therethrough and selectively generate lift on the aircraft.

U.S. Pat. No. 4,411,598
Inventor: Makoto Okada
Issued: Oct. 25, 1983

A fluid propeller fan useful but not limited to an air-circulating cooling fan for an automotive engine, wherein each of the vanes of the fan has a pitch angle which is gradually reduced from the tip of an intermediate portion toward the radially innermost end of the van so as to provide an increased draught volume and improved draught flow characteristics.

U.S. Pat. No. 4,802,822
Inventor: Hubert S. Gilgenbach
Issued: Feb. 7, 1989

A marine propeller (4) combines decreasing overall pitch from hub (6) to blade tip (20) and increasing progressiveness of pitch with increasing radii from hub to tip, and provides uniform loading from hub to tip. The blade has a maximum transverse dimension (36, 46, 48) between the high pressure surface (16) of the blade and a straight line chord (34, 34a, 34b) between the leading edge (22) and the trailing edge (24) of the blade. The ratio of this maximum transverse dimension to the length of the chord is ever increasing from hub to tip. A parabolic blade rake along the maximum radial dimension line (50) of the blade is provided in combination.

U.S. Pat. No. 5,022,820
Inventor: Robert M. Bergeron
Issued: Jun. 11, 1991

An automatic variable pitch propeller including a central hub defining an axis of propeller rotation and a plurality of blades connected to and extending from the central hub substantially normal to the axis of rotation, each blade being mounted for rotation about a pitch axis, a cam mechanism to translate centrifugal forces imposed on that blade into a force tending to rotate that blade toward a course pitch, that force being opposed by water pressure tending to decrease blade pitch. The cam mechanism including a cam groove formed in an insert, of a material harder than the blades, in each blade shaft and the propeller being provided with variable minimum and maximum blade pitch stops, resilient bias toward minimum blade pitch and manual a pitch-up shift mechanism.

U.S. Pat. No. 5,209,642
Inventor: Gary E. Larimer at al.
Issued: May 11, 1993

An asymmetric set of pre-swirl vanes (stators) and a specially matched propeller for use on an inclined shaft. The propeller is designed by considering the mutual interaction of the propeller on the vanes and the vanes on the propeller. The propulsor unit provides the following:
1. increased propulsion efficiency due to the reduced rotational (swirl) and axial kinetic energy losses in the propulsor's slipstream;
2. reduction or elimination of propeller cavitation;
3. reduction or elimination of unsteady propulsor forces as well as propulsor-induced hull vibrations.

A unique feature of the present invention is that a prior art flat faced commercially available propeller can be modified to match the vane flow field for optimum propulsor performance. The use of commercially available propellers reduces the installation or hardware cost significantly and allows the propeller to be repaired easily if damaged.

Another unique feature is that the vanes operate well with an unmodified commercially available prior art flat faced, optimum constant pitch propeller, and that the propeller as modified for use with the vanes also performs exceptionally well without the vanes. The modified propeller without vanes in fact outperformed the prior art flat faced optimum constant pitch propeller used on the 41 foot test craft.

U.S. Pat. No. 5,403,160
Inventor: Yaw-Yuh You
Issued: Apr. 4, 1995

A fan blade includes a plate and a board fixed on the plate, an opening is formed in the fan blade for facilitating air circulation when the fan blade is operated. The plate and the board each includes a notch, the notches form the opening when the board is fixed on the plate.

U.S. Pat. No. 5,454,531
Inventor: Attila Melkuti
Issued: Oct. 3, 1995

The aircraft incorporates a primary and two control ducted propeller assemblies. The propellers are interconnected for rotation by a single engine. Each propeller assembly is inclined in horizontal flight and has two groups of louvers. When the groups of louvers in a propeller assembly are set to divert air horizontally in opposed directions, reduced vertical thrust is realized. In this manner, pitch and roll may be controlled in vertical flight. Vanes on the control ducts produce differential horizontal thrust to control yaw in the vertical mode. In horizontal flight, all groups of louvers are set to direct the flow aft to produce thrust for high speed forward flight.

U.S. Pat. No. 5,758,844
Inventor: Darold B. Cummings
Issued: Jun. 2, 1998

The vehicle includes a fuselage; a plurality of lifting surfaces attached to the fuselage having control devices attached thereto; and, an articulated propulsion system attached to the fuselage. The propulsion system includes a duct assembly pivotally connected to the fuselage. The duct assembly includes a duct and a propeller assembly mounted within the duct. A motor assembly is connected to the propeller assembly. The duct assembly may be positioned in a substantially vertical position to provide sufficient direct vertical thrust for vertical take-off and landing and may be directed in other positions to provide a varying spectrum of take-off and landing configurations, as well as a substantially horizontal position for high speed horizontal flight. Use of the control surface in the ducted propulsion assembly provides VTOL capability in a very small environment. The environment is not required to be prepared in any special manner. During horizontal flight, the wings provide the lift, which is more efficient than a propeller providing lift. The present invention takes advantage of a center line propulsion, so that there are no asymmetric propulsion loads.

U.S. Pat. No. 6,719,244
Inventor: Gary Robert Gress
Issued: Apr. 13, 2004

The invention relates to improvements with regards to the control of VTOL aircraft that use two propellers or fans as the primary lifting devices in hover. More particularly, the invention is a means for effecting control of the aircraft using just the two propellers alone, and comprises the in-flight tilting of them—which are of the conventional, non-articulated type (though they may have collective blade-pitch)—directly and equally towards or away from one another (and therefore about parallel axes) as necessary for the generation of propeller torque-induced and gyroscopic control moments on the aircraft about an axis perpendicular to the propeller tilt and mean-spin-axes. For a side-by-side propeller arrangement, therefore, their (lateral) tilting towards or away from one another produces aircraft pitch control moments for full control of the aircraft in that direction. Unlike the prior art, no cyclic blade-pitch control, slipstream-deflecting vanes, exhaust nozzles, tail rotors or extra propellers or fans, or conventional control surfaces are needed to effect this aircraft pitch control.

U.S. Pat. No. 6,834,835
Inventor: Gareth Knowles et al.
Issued: Dec. 28, 2004

The present invention is a wing having telescoping segments deployed via an actuator composed of a heat activated material. The actuator is a coiled tube of shape memory alloy (SMA) with large force-displacement characteristics activated thermally by either a fluid or an electrical charge. Actuator motion extends an inner wing segment from an outer wing segment when the coiled tube is compressed. Compression is achieved by heating the coiled tube so as to cause a phase transformation from Martensite to Austenite. The inner wing segment may be retracted by a mechanical device or second SMA coil when the coiled tube is cooled and returned to its Martensite phase.

U.S. Pat. No. 6,892,979
Inventor: Karl F. Milde, Jr.
Issued: May 17, 2005

Personal Aircraft capable of vertical take-off and landing ("VTOL") which comprises:
(a) a fuselage having a front end, a rear end and two lateral sides, the fuselage having a central longitudinal axis extending from the front end to the rear end, between the two lateral sides;
(b) at least one, and preferably two or more, ducted fans, each arranged in the fuselage between the front end and the rear end and between the two lateral sides, for providing vertical lift; and
(c) at least one substantially horizontal wing attached to each side of the fuselage and extending outward with respect to the central longitudinal axis. The wings and fuselage of the aircraft are designed to provide a lift-to-drag (LID) ratio during flight, when flying at an air speed in the range of 50 to 100 MPH, of at least 4:1.

According to a preferred feature of the present invention, the width and wingspan of the aircraft wings are adjustable during flight so that the LID ratio and the footprint of the aircraft may be matched to the needs of the pilot.

U.S. Pat. No. 6,942,458
Inventor: Jonathan E. McCallum et al.
Issued: Sep. 13, 2005

An improved variable pitch fan comprising a fan hub, with fan blades extending radially outward from the fan hub and mounted for rotation about respective radially extending axes corresponding to each fan blade. Each fan blade has a blade surface extending perpendicularly to the radially extending axis of the fan blade, each blade surface lying between respective outer edges of the corresponding fan blade and facing rearward. A pitch shifting mechanism is mounted in the hub and interconnects with the fan blades to control the rotational position of each fan blade about the corresponding radially extending axis of the fan blade. The respective outer edges of each fan blade diverge as the fan blade extends further radially outward; and the blade surface of each fan blade has an angle of attack that decreases as the fan blade extends radially outward. Each blade surface has a constant or increasing radius of curvature as the respective fan blade extends further radially outward. The respective outer edges of each fan blade are straight. Each fan blade has integral moulded counterweight supports and counterweights mounted on the counterweight supports.

U.S. Pat. No. 6,991,426
Inventor: Paolo Pietricola
Issued: Jan. 31, 2006

A variable pitch fan, particularly for propulsion, of the type comprising a rotor and at least two stages of stator blade rows positioned upstream and downstream of the rotor, wherein the rotor blades (8) are of the variable pitch type and have a sinusoidal shape, are of the twisted type (1) or of the constant deflection type (2) and the stator blades (25), positioned downstream of the rotor, are of the twisted type. This rotor blade design allows a reduction of both the torque necessary to activate the variable pitch systems (lither actuator system) and the turning moments due to the centrifugal force. The proposed fan can be set in rotation by a conic couple of gears, contained in a gear oil sump positioned downstream the rotor, by means of one power shaft contained inside the stator blade.

The variable pitch fan further provides a stator row upstream the rotor which are twisted in a manner that allows increased efficiency. The stator row downstream the rotor has a movable twisted part actuated by way of a simple electro mechanic system.

This invention even further provides a light screw female system, actuated by an electric motor, to rotate the variable pitch rotor blades.

U.S. Pat. No. 7,063,291
Inventor: Kenneth S. Rado
Issued: Jun. 20, 2006

An amphibian delta wing jet aircraft, which has a plurality of triangular folding wing panels, two of which are hingedly attached to a lifting shape body, which incorporates a W-shaped hull in it's cross section of a fuselage so that the craft operates efficiently as an aircraft when flying through the air with the wings in a fully unfolded extended position.

The craft also performs well as a watercraft capable of relatively high speeds on the water surface when the wing are folded-up in a non extended position. The W-shape hull transverse cross section also provides excellent characteristics so that the craft can hydroplane over marshlands or waterlogged soil which may be covered with emersed rushes, or snow, cattails and other tall grasses. The craft is also provided with four retractably mounted mechanically extendable wheels, to be utilized when configured as a land vehicle.

U.S. Pat. No. 7,281,900
Inventor: Thomas A. Zientek
Issued: Oct. 16, 2007

Low-noise airfoils and methods of reducing noise. One embodiment provides an aerodynamic member that includes two body portions coupled to each other. The second body portion includes a plurality of airfoil members in a fixed relationship with each other. Optionally, the airfoil members may define an open end of the second body portion. In the alternative, the member can include a third body portion that has an airfoil shape and that is coupled to the second body portion opposite the first body portion. Preferably, the first portion, the airfoil members, and third portion are 12%, 8%, and 2% thickness/chord airfoils respectively. Further, the aerodynamic member may be a rotor blade on a tandem helicopter. Another embodiment provides a cambered airfoil with two coupled body portions one of which has air foil members. One of the body portions includes a slot there through with airfoil members on opposite sides of the slot.

U.S. Patent Application Number 2008/0121752
Inventor: Franklin Y. K. Chen
Issued: May 29, 2008

A propeller includes a plurality of radial propeller blades. Each blade has an adjustable drag coefficient. A plurality of actuators adjusts the drag coefficients of the propeller blades. A controlling unit controls the plurality of actuators such that the drag coefficients of each propeller blade is adjusted according to a pattern that is dependent upon the rotational angle of the particular propeller blade so that the drag of each propeller blade is maximized at the same point through a course of revolution and minimized throughout the remainder of that revolution.

W.O. International Patent Application Number 2007/071924
Inventor: Alan Edward Watts
Published: Jun. 28, 2007

A propeller comprises a hub (1) having a pair of blades (3) extending therefrom. Each blade (3) has a root, a tip, a first blade portion (10a) extending between said root and said tip and a second blade portion (10b) extending between said root and said tip adjacent and substantially parallel to said first blade portion (10a). The first and second blade portions (10a, 10b) each have an arcuate concave face (11a, 11b), the radius of curvature of the concave face (11a) of said first blade section (10a) being greater than the radius of curvature of the concave face (11b) of the second blade section (10b). The concave faces (11a, 11b) of said first and second portions (10a, 10b) facing in substantially opposite directions such that, in use, said concave face (11a) of said first blade portion (10a) faces rearwards and said concave face (11b) of the second blade portion (10b) faces forwards.

W.O. International Patent Application No. 2008/075187
Inventor: Massimillano Bianchi
Issued: Jun. 26, 2008

Variable—pitch propeller (1) of the type comprising at least one blade (6a, 6b, 6c) rotatably pivoted (20a, 20b, 20c) to a cylindrical casing of the propeller (3a, 3b, 4), a shaft coupled to an engine and coaxial to that propeller casing, a kinematic system (7, 8a, 8b, 8c, 10a, 10b, 10c, 11), coupled to the shaft, or to the propeller casing, and to above mentioned at least one blade, for regulating the rotary motion of said at least one blade around its own pivot axis to the propeller casing, as well as means (2, 14, 15) for transmitting the rotary motion of the shaft to the propeller casing, the propeller being shaped to provide at least one not null angular range for the free relative rotation of the above mentioned at least one blade (6a, 6b, 6c) around its pivot axis, relatively to the propeller casing (3a, 3b, 4). The propeller also comprises at least one elastic element (18, 18') countering the relative rotation of said at least one blade relatively to the propeller casing (3a, 3b, 4), or vice versa.

W.O. International Patent Application Number 2009/008513
Inventor: Suguru Nak-Agawa
Issued: Jan. 15, 2009

A conventional propeller fan has a gap between a bellmouth and blade edges, and there occurs a leakage flow flowing through the gap from positive pressure surfaces of the blades toward negative pressure surfaces of the blades. The leakage flow grows as it flows from the front edge to the rear edge of each blade and forms blade edge vortices. This increases blowing noise and motor input. In order to prevent an occurrence of blade edge vortices caused by such a leakage flow, a propeller fan of the invention has mountains and valleys alternately formed at an end surface of each blade.

While these aircrafts and blade types may be suitable for the purposes for which they were designed, they would not be as suitable for the purposes of the present invention, as hereinafter described.

SUMMARY OF THE PRESENT INVENTION

The primary objective of this invention is to solve the problem of rescuing people marooned in high rise buildings. The proposed solution is to allow people to escape through a window into a specially designed aircraft, called a VTOL-Flying-Wing-Aircraft (VTOL/FWA). This VTOL/FWA has unique capability of loading/unloading payloads, horizontally as well as vertically, while stationary. This allows people to walk out of a high-rise building window HORIZONTALLY into the VTOL/FWA waiting outside.

The proposed VTOL/FWA's unique features are summarized in paragraphs (1.0) to (5.0). These are followed by a summary of the key VTOL/FWA maneuver control schemes (6.0) to (13.0) required to achieve the Horizontal-High-Rise-Building-Window-Rescue (HHRBWR) mission task.

NOTE: Bold faced number identifies the figure number and it is followed by a bold faced letter identifies a specified item in the figure. Items illustrated in FIG. 19A will be referenced extensively. Items related to the FIG. 19A front FW are used in most descriptions. These descriptions apply equally well to the rear FW which is identified by the same symbols with an apostrophe. For example, 19β and 19β' identify tilt angles β of front FW 19*w* and rear FW 19*w'* respectively.

(1.0) A pair of specially designed Flying-Wing (19*w* 19*w'*) is located on top near opposite ends of a log fuselage 19*f*. This 19*f* has longitudinally extendable and maneuverable attachments 23*f*, 23*s*, 23*r*, 23*n*, 23*h* and 23*q*.

(2.0) Each FW 19*w* (or 19*w'*) has at least two independent degrees of freedom (β and φ) with respect to FWA fuselage frame 19*f*. They are:

(2.1) Both sides of each FW must tilt ρ together, 19β for 19w and 19β' for 19w'. These FW tilts are pivoted about their respective common wing span axes 21s and 21s', up and down about their respective horizontal planes.

(2.2) FW 19w and 19w' rotate 19 φ and 19 φ' in their respective horizontal planes about their respective vertical axes perpendicular to that FW's span axis 21s (or 21s') which pass through the midpoint of each FW.

(2.3) The rear FW's 19w' horizontal rotational plane is higher above 19f than the front FW's 19w horizontal rotational plane.

(2.4) FW 19w can tilt 19β and/or rotate 19 φ independently without interfering with the other FW's 19w' independent tilt 19β' and/or rotation 19φ' movement during all phase of FWA operations.

(2.5) FW 19w and 19w' are either independently rotate 19 φ and 19 φ' or independently locked or unlock onto the fuselage 19f structure frame.

(2.6) FW 19w and 19w' are either independently tilt 19β and 19β' or independently locked or unlock onto the fuselage 19f structure frame.

(2.7) All flaps 19f or 19f on either side of either FW can tilt 16δ independently.

(3.0) Each side of each FW has a big gear box 21g containing 3 smaller gear boxes 15g to transmitting engine power to 3 TR-Propellers 15a on that side of the FW.

(4.0) The AACTRB propellers are described in FIG. 1 through FIG. 14. The CATRB propellers are more reliable to operate. The notations 15Q and 15a of FIG. 15 used in all other figures and discussions will represent either types of Transverse-Radial (TR) propellers.

(5.0) Three sets of TR-propellers 15Q are installed on each FW to generate thrust vectors 16t (16t') and lift vectors 16l (16l') on FW 19w (19w').

(5.1) The TR-propellers 15a installed on the front FW 19w and the rear FW 19w' may or not be identical.

(5.2) TR-propellers located at a FW's top-front surface $15a_{top}$:

(5.2.1) Each $15a_{top}$ TR-propeller is partially submerged inside FW's leading-edge top surface on both sides of the FW.

(5.2.2) The air speed $16v_1$ pushed by $15a_{top}$ backward of FW's top surface must be higher than the air speed $16v_2$ below the FW's bottom surface air speed $16v_2$ pushed by $15a_{bottom}$ TR-propellers.

(5.2.3) A set of FW span-length airfoil-strips 16b may be placed above the $15Q_{top}$ TR-propellers to deflect more air backward during hover flight. These airfoil-strips 16b will be stored inside the FW leading edge wing surface area 16c during high speed forward flights.

(5.3) TR-propellers located at a FW's bottom-front surface $15a_{bottom}$:

(5.3.1) These $15a_{bottom}$ TR-propellers are partially submerged inside FW's leading-edge bottom surfaces on both side of a FW.

(5.3.2) The air speed $16v_2$ pushed by $15a_{bottom}$ backward of FW's bottom surface must be lower than the air speed $16v_1$ above the FW's top surface air speed $16v_1$ pushed by $15a_{top}$ TR-propellers.

(5.4) TR-propellers located at each FW's flap top-surface $15a_{rear}$:

(5.4.1) These $15a_{rear}$ TR-propellers are partially submerged inside the FW's flap top surface on both sides of each flap 16f.

(5.4.2) The air speed $16v_3$ pushed by $15a_{rear}$ backward of FW's flap 16f top surface and downwards of FW when the flap is deflected down 16δ. The magnitude of $16v_3$ must be equal to or higher than the air speed $16v_1$.

(5.4.3) These $15a_{rear}$ TR-propellers are designed to prevent FW stall during VTOL/FWA flights with high FW tilt angles 19β and/or high flap 16f deflections 16δ.

(5.4.4) Independent controls of $15a_{rear}$ TR-propellers' RPM together and/or independent control of flaps 16f deflections 16δ are designed to modify both the magnitude and direction of the total resultant force vectors 16t and 16l acting on each half-side of each FW.

(6.0) Devices used to control each FW's tilt angles 19β and 19β' are:

(6.1) Hydraulic systems 21h and 21h' to provide independent tilt angles 19β and 19β' controls of FW 19w and 19w' respectively.

(7.0) Control of 19w and 19w' FWs' horizontal rotations 19φ and 19φ'.

(7.1) Electric-Mechanical systems 21m, 21n and 21z make fine adjustment control of 19φ or 19φ'.

(7.2) Reaction-Control-Jets (RCJ) 17j located at each FW wing-tips. These RCJs have the following properties:

(7.2.1) Each wing-tip RCJ clusters must have at least two jet exhausts opposite each other and maintained in the horizontal plane parallel to the FW's rotational φ plane and perpendicular to the FW 19w (or 19w') span axis 21s (or 21s').

(7.2.1.1) Each pair of RCJ are symmetrically located on both ends of each FW's span-wise tilt β (β') axis 21s (21s').

(7.2.1.2) Each wing-tip jet-exhaust 17e vector is perpendicular to the FW span-wise tilt β axis 21s.

(7.2.1.3) Whenever a FW is tilted to an angle 19β (or 19 β") the corresponding wing-tip jet-pair must rotate −19β (or −19β') in order to have the jet thrust vector 17t always in a horizontal plane as specified above in (7.2.1). This is done by electric motor 17m and gears 17g.

(7.2.2) When two RCJ jets on opposite FW wing-tips producing jet thrusts in opposite directions; this will cause CW+φ or CCW−φ rotations of the FW in its horizontal plane.

(7.2.3) Additional RCJ clusters may be installed on fuselage.

(8.0) RCJ jet clusters 17j can rotate 90° (FIG. 17A and (13.6.2)).

(9.0) RCJ jets are also used to control VTOL/FWA stability.

(10.0) Independent controls of the VTOL/FWA are:

(10.1) Independent controls of the horizontal rotations 19q and 19φ' of the front FW 19w and the rear FW 19w'.

(10.2) Independent control of any FW's left-side-flap deflection angle $16δ_{left-side}$ and any FW's right-side-flap deflection angle $16δ_{right-side}$.

(10.3) Independent control of power level and RPM of each left-side TR-propellers [$15a_{top}$, $15a_{bottom}$, $15a_{rear}]_{left-side}$ and each right-side TR-propellers [$15a_{top}$ $15a_{bottom}$, $15a_{rear}]_{right-side}$ of either FW 19w or 19w'.

(10.4) Independent selected firing of RCJ jet(s) at different varying firing rates 20n or power level as illustrated in FIG. 20.

(10.5) independent control of fuel injection 17$f$: from zero to maximum, of any RCJ jet 17$j$.
(10.6) Independent setting of sparks to on or off, in any chamber 17$c$, when fuel injection to that chamber is off.
(10.7) Independent rotation of a FW's opposite wing-tip RCJ jet cluster 17$j$ parallel or perpendicular to FW's horizontal rotational $\varphi$ plane.
(10.8) Independent firing of a FW's opposite wing-tip RCJ jets 17$t$ in the same or opposite directions.

(11.0) Based on the design and redundant control schemes outlined above, it can be expected that this VTOL/WFA can achieve its desired balance—and/or—unbalance of the resultant force-vector components and momentum-vector components in the VTOL/FWA's pitch, roll and yaw axes directions as required by the Horizontal-High-Rise-Building-Window-Rescue (HHRBWR) mission.

To further simplify this presentation, it will be assumed that the desired resultant momentum vector components are always under control. Therefore, only the balance/unbalance of the static two dimensional force vector components are presented below to illustrate how this VTOL/FWA can achieve its HHRBWR mission tasks.

(11.1) Two dimensional resultant-force vector components, acting on both VTOL/FWA wings 19$w$ and 19$w'$ are described below:
(11.2) Let L, D and T represent the net lift 19$l$, net drag 19$d$ and net thrust 19$t$ acting on both the left and right sides of the front FW 19$w$. Similarly, let L', D' and T' represent the net lift 19$l'$, net drag 19$d'$ and net thrust 19$t'$ acting on both the left and right sides of the rear FW 19$w'$. Let 19$m$ (pointing down) represent the total weight of this VTOL/FWA.
(11.3) Project the above force vectors onto vertical (+y-axis, up) and horizontal (+x-axis, towards fuselage nose) directions. The balanced/unbalanced 2-dimensional force vectors equations in the local horizontal [ . . . ]$_x$ and local vertical [ . . . ]$_y$ directions are:

$$[(-L_x'-D_x'+T_x')+(L_x+D_x-T_x)]_x >=< 0$$

$$[(L_y'+T_y'-D_y')+(L_y+T_y-D_y)]_y >=< m$$

(11.3) VTOL/FWA 2-dimensional flight conditions depend on the above two expressions ([ . . . ]$_x$>=<0 & [ . . . ]$_y$>=<m) as shown in the following table. This table illustrates the nine basic 2-D flight conditions.

| 2-D Flight Conditions | [...]$_y$ > m | [...]$_y$ = m | [...]$_y$ < m |
|---|---|---|---|
| [...]$_x$ > 0 | $M^{(z)}_{11}$ = Forward-Ascent Flight | $M^{(z)}_{12}$ = Forward-Level Flight | $M^{(z)}_{13}$ = Forward-Descent Flight |
| [...]$_x$ = 0 | $M^{(z)}_{21}$ = Vertical-Ascent Flight | $M^{(z)}_{22}$ = Hover | $M^{(z)}_{23}$ = Vertical-Decent Flight |
| [...]$_x$ < 0 | $M^{(z)}_{31}$ = Backward-Ascent Flight | $M^{(z)}_{32}$ = Backward-Level Flight | $M^{(z)}_{33}$ = Backward-Descent Flight |

Matrix $M^{(z)}_{xy}$: x = row >=< 0, y = col >=< m, z = a different 2-D (12.0) This section describes the flight sequence required for a typical Horizontal-High-Rise-Building-Window-Rescue-(HHRBWR) mission: (a) Multiple 2-D Flight Conditions of the above table, and (b) Transition flights between different flights $M^{(z)}_{xy}$ of the above table and (c) Transition flights to different 2-D flights. A typical HHRBWR mission flight sequence is break down as elements of $M^{(z)}_{xy}$ presented below. This flight profile by a VTOL/FWA is achieved by the designs and control schemes outlined in earlier sections ((1.0) to (10.0)):

(12.1) $M^{(1)}_{21}$ Vertical ascent from a ground base.
(12.2) $M^{(z)}_{11}$ forward ascent at desired headings (z).
(12.3) $M^{(z)}_{12}$ high speed level flight towards the high-rise building.
(12.4) $M^{(z)}_{13}$ forward descent to a building window at low speed.
(12.5) Transition from $M^{(0)}_{13}$ forward flight to hover $M^{(z)}_{22}$.
(12.6) $M^{(0)}_{22}$ Hover in front of a building window.
  (12.6.1) Transition from hover $M^{(0)}_{22}$ to low speed backward level flight $M^{(0)}_{32}$, and push legs 23$r$ and feet 23$q$ firmly against building wall near window 23$z$.
  (12.6.2) Bend one knee 23$n$ and one 23$h$ to reposition one foot 23$q$ to a different location on wall.
  (12.6.3) Repeat (12.6.2) until the rear end of FWA is directly aligned to the window opening. NOTE: The VTOL/FWA is now in "one-end-anchored-backward level flight mode" $M^{(0)}_{32}$. Which is different than the "hover mode" $M^{(0)}_{22}$.
  (12.6.4) Extend rear fuselage attachments 231.
  (12.6.5) Break window.
  (12.6.6) Extend 23$f$ and rescue ladder 23$s$ into window.
  (12.6.7) Let people walk horizontally into the stationary waiting VTOL/FWA.
(12.7) Transition from backward level flight $M^{(0)}_{32}$ to forward level flight $M^{(0)}_{12}$. Use RCJ jets or adjusting FW TR-propeller forces to push VTOL/FWA away from building.
(12.8) Reposition 23$f$ and ladder 23$s$ back to VTOL/FWA rear end 22$s'$.
(12.9) Transition from forward level flight $M^{(0)}_{12}$ to hover $M^{(\Psi)}_{22}$ at desired heading iv.
(12.10) Transition from hover $M^{(\Psi)}_{22}$ to forward ascent $M^{(\Psi)}_{11}$.
(12.11) $M^{(\Psi)}_{11}$ Transition to high speed forward level flight by reducing both FW tilt angles, flaps deflections and adjusting TR-propellers RPM.
(12.12) $M^{(\Psi)}_{13}$ Forward descent flight at reduced speed.
(12.13) $M^{(\Psi)}_{22}$ Hover above landing site.
(12.14) Adjusting $M^{(\Psi)}_{23}$ Vertical descent rate and touch-down.

(13.0) This section describes how to achieve the flights described above in (12.0) using various controls described in sections (2.0) through (10.0) and illustrated in FIGS. 15 through 24.
  (13.1.0) $M^{(1)}_{21}$: Transition from ground parking position to Vertical ascent $M^{(1)}_{21}$:
  (13.1.1) Tilt both FW 19$w$ and 19$w'$ up (19$\beta$, 19$\beta'$) with both wing leading edges pointing toward each other (FIG. 19A).
  (13.1.2) Adjusting all flaps 16$f$ deflections 16$6$ on both sides of both FW.
  (13.1.3) Adjusting all FW TR-propellers RPM, both FW tilt angles (19$\beta$, 19$\beta'$) until vertical ascent $M^{(z)}_{21}$ is achieved.
  (13.2.0) $M^{(z)}_{21} \rightarrow M^{(z)}_{11}$: Transition from Vertical Ascent $M^{(z)}_{21}$ to Forward Ascent $M^{(z)}_{11}$.
  (13.2.1) Lock rear FW 19$w'$ to fuselage 19$f$ frame.
  (13.2.2) Unlock front FW 19$w$ from fuselage 19$f$ frame.
  (13.2.3) Rotate front FW 19$w$ 180°=19$\varphi$, by pulse firing RCJ jets 17$j$ located at 19$w$ wing tips.
  (13.2.4) Simultaneously pulse firing the RCJ jets 17$j'$ on 19$w'$ wing tips in counter direction −19$\varphi'$ until the desire FWA heading is achieved simultaneously both FW leading edges are pointing forward with the front FW 19w span-axis 21s perpendicular to the fuselage axis.

(13.2.5) Optional fine tune by turn on/off the electric motors 21m on 19w or 21m' on 19w', so that FW 19w span axis 21s is perpendicular to the fuselage axis.

(13.2.6) Lock FW 19w to fuselage frame 19f. Now both FWs' leading edges are pointing up towards the fuselage nose direction at high tilt angles 19β, 19β', and high 16δ angles and the VTOL/FWA is ascending at slow forward speed moving at desired heading ω, $M^{(\psi)}_{11}$.

(13.3.0) Transition from low speed ascent forward flight $M^{(\psi)}_{11}$ at desired heading ψ to high speed forward level flight at the same desired heading ψ by simultaneously adjusting:

(13.3.1) Lower both FWs' tilt angles 19β and 19β'.

(13.3.2) Adjusting all flaps 16f deflections 16δ on both sides of both FW.

(13.3.3) Adjusting both FW's angle-of-attack 16α to achieve the desired altitude at high forward speed.

(13.3.4) Adjusting all 6 TR-propellers RPM on each FW.

(13.4.0) Transition flight from high speed forward-level flight $M^{(\psi)}_{12}$ to hover $M^{(\psi)}_{22}$ is achieved by performing the reversed set of maneuvers as described above to place this VTOL/FWA hovering $M^{(\psi)}_{22}$ close to, and in front of, a selected high-rise building window 23y.

(13.5.0) Transition from Hover $M^{(\psi)}_{22}$ to backward level flight $M^{(\psi)}_{12}$. This is done by using the RCJ jets (or horizontal forces difference between 19w and 19w' or use optional retractable propeller 19p') to push the feet 23q against the building wall near outside the window 23y. This will be identified as the "Anchored Level Flight Hover" (ALFH) state.

(13.5.1) As described in (12.6.2) and (12.6.3); the VTOL/FWA may be required to perform walking maneuver on a building wall during its ALFH state to align 23f' and 23s to window opening.

(13.6.0) During this "anchored level flight hover" state, gyros are used to stabilize the VTOL/FWA. However, the VTOL/FWA will still be experiencing small disturbances, due to wind gusts and later due to weight changes as people rush into the ALFH VTOL/FWA. To further improve the FWA stability during "anchored level flight hover" state the following controls are performed as needed:

(13.6.1) Accelerometers placed at fuselage 19f nose to detect any change in vehicle stability.

(13.6.2) Tilt one FW's wing-tip RCJ Jets 17j 90° so these jets thrusts 17t can be used to make small pitch or roll corrections. The other FW's RCJ jets 17t will be used to make small yaw corrections, or forward/backward position corrections during VTOL/FWA's "anchored level flight hover" state.

(13.6.3) Allow different amount of fuel 17f to be injected into the combustion chamber 17c.

(13.6.4) Allow oxygen to be injected into the compressed air stream 17a.

(13.6.5) Allow the use or not-use of electric spark to heat the compressed air 17a in the combustion chamber 17b.

NOTE: steps (13.6.2), (13.6.3) and ((13.6.5) control the thrust force 17t magnitude for refined corrections of VTOL/FWA stability during "anchored level flight hover" state.

(13.6.6) Control using propellers 19p rotate to position 19p' can also be used to make refined adjustments during and transition in-and-out of VTOL/FWA "anchored level flight hover" state.

(13.6.7) Additional RCJ clusters on fuselage, as stated in (7.2.3), may be used.

(13.7.0) Next transition flight from "anchored level flight hover" state to forward-ascent flight $M^{(w)}_{11}$: Once all passengers are inside the VTOL/FWA and the ladder 23s and 23f are retraced to 22s'. The VTOL/FWA will move away from the building window. This involves transition flight from "anchored level flight hover" state $M^{(0)}_{32}$ to forward level flight $M^{(0)}_{12}$ or forward ascent flight $M^{(0)}_{11}$. This is done by:

(13.7.1) Using RCJ exhaust jets 17j firing in the same direction to push VTOL/FWA slowly in forward level flight $M^{(w)}_{12}$.

(13.7.2) Or adjusting all FWs' TR-propellers' RPM and simultaneously adjusting both FWs' tilt angles 19β, 19β' and/or all flaps 16f deflections 16δ to achieve slow speed forward-ascent push of FWA $M^{(z)}_{11}$ away from the building.

(13.7.3) Transition flight from forward-ascent $M^{(z)}_{11}$ to hover $M^{(z)}_{22}$ then to high speed level flight toward a desired landing site. These process are achieved by performed the reversed process described earlier.

This concludes the invention summary of using VTOL/FWA to perform HHRBWR mission.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of examples, with reference to the accompanying drawings in which: FIG. 1 through FIG. 14 describe Transverse-Propellers. FIG. 15 through FIG. 24 describe VTOL/FWA equipped with TR-propellers in horizontal rescue missions.

FIG. 1A is a perspective view of an example showing a typical transverse-radial four blade 1b propellers of unspecified characteristics according to an embodiment of the present invention;

FIG. 1B is an illustrated view of blade 1b area 1a changing characteristics: The straight line 1i represents a Constant-Area-Transverse-Radial-Blade (CATRB), where the blade area 1a is constant in each revolution. The curved line 1j represents an Asymmetric-Area-Changing-Transverse-Radial-Blade (AACTRB), where the blade area 1a changes asymmetrically in each revolution. AACTRB area 1a variation 1j in each revolution is divided into four regions: maximum AACTRB area region is identified as 1e, minimum AACTRB area region is identified as 1g, the region where AACTRB area is increasing from minimum area 1g to maximum area 1e is identified as 1h and the region where the AACTRB area is decreasing from maximum area 1e to minimum area 1g is identified as 1f;

FIG. 1C is a graph illustrating the estimated drag coefficient 1d of each blade 1b as it rotates around 1ω. Straight line 1m corresponds to constant area CATRB 1i. The curved line 1n illustrates the estimated 1d variation of an AACTRB 1j;

FIG. 2A is an illustrative view of a net thrust 2t' being produced per revolution, when 1b is of the type AACTRB 1j propeller rotating 1ω in free space;

FIG. 2B is an illustrative view of FIG. 2A when the propeller is partially covered by wing surface 2k, and a large net thrust 2t is produced in each revolution;

FIG. 2C illustrates a constant area 1i CATRB is rotating in free space, no net thrust 2g' is produced in each revolution, 2g'=0.

FIG. 2D illustrates when the same FIG. 2C propeller is partially covered by wing surface 2k, a net thrust is produced per revolution, where 0<2g;

Figure 3D:
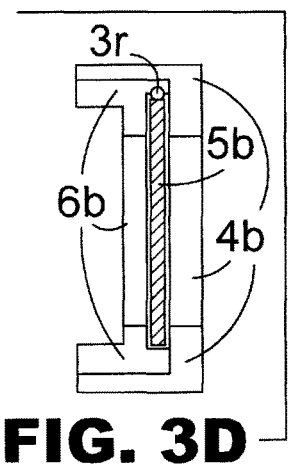
Figure 3A:
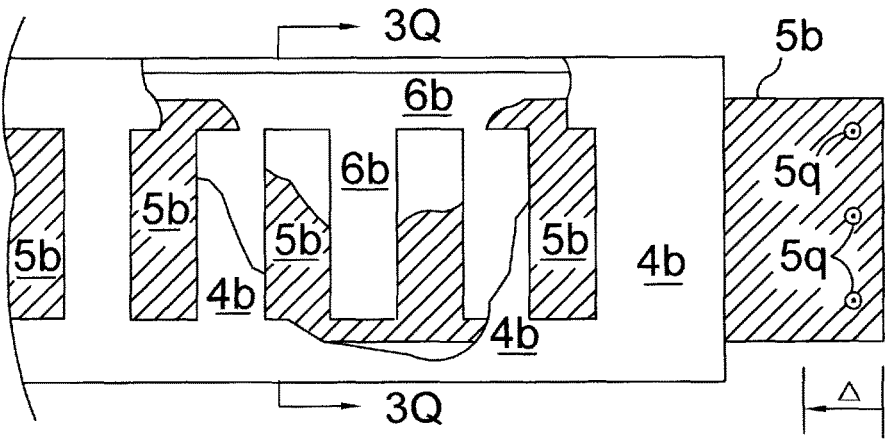
Figure 3E:
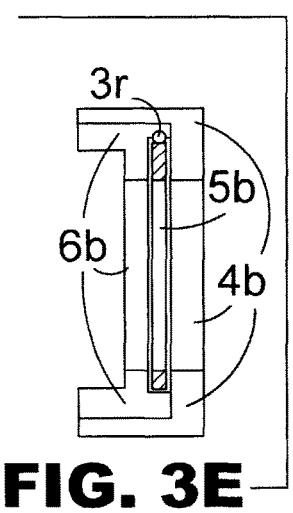
Figure 3B:
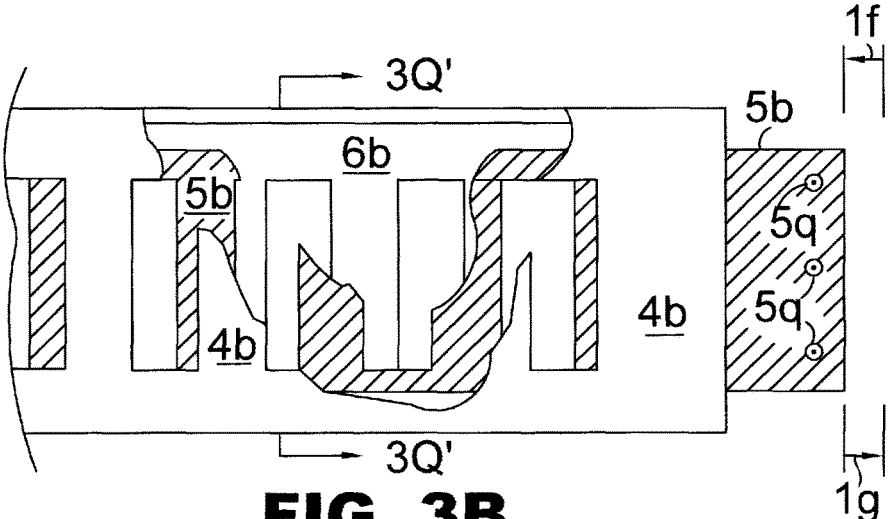
Figure 3F:
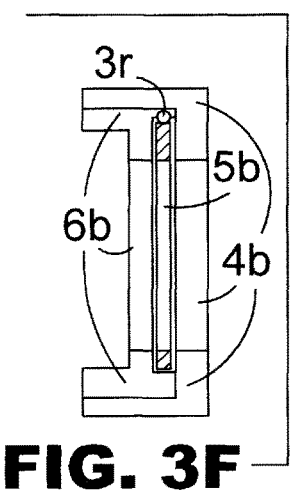
Figure 3C:
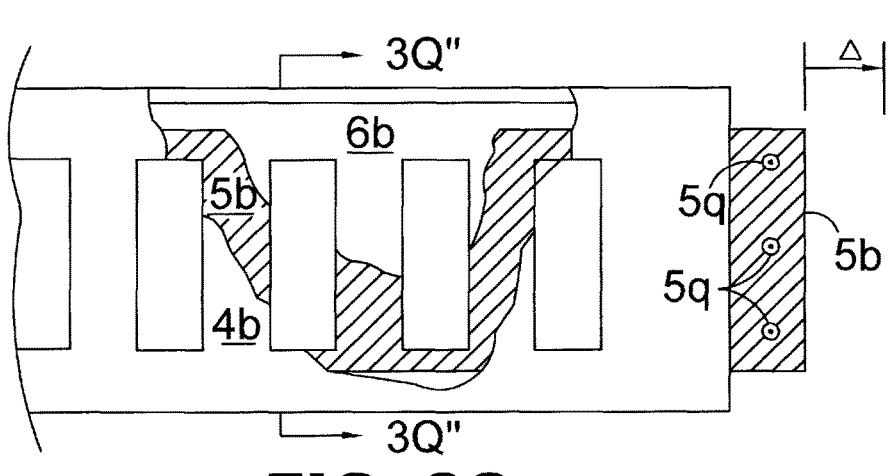
Figure 4B:
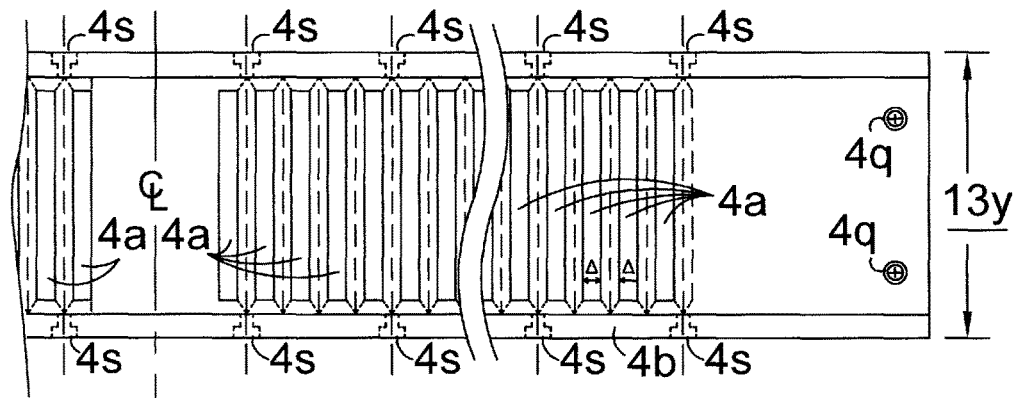
Figure 4A:
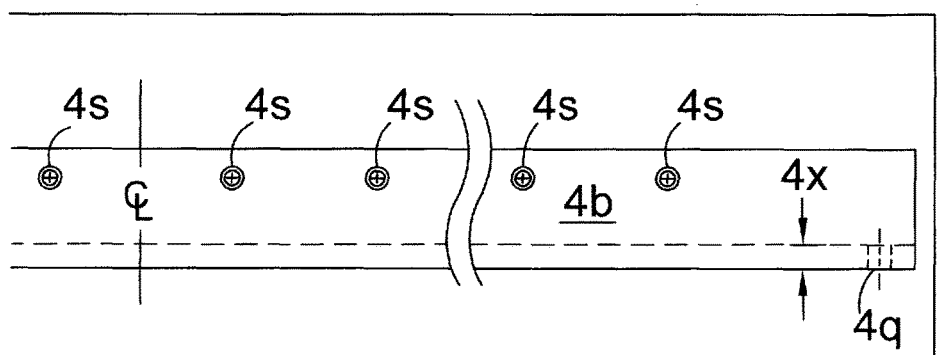
Figure 4C:
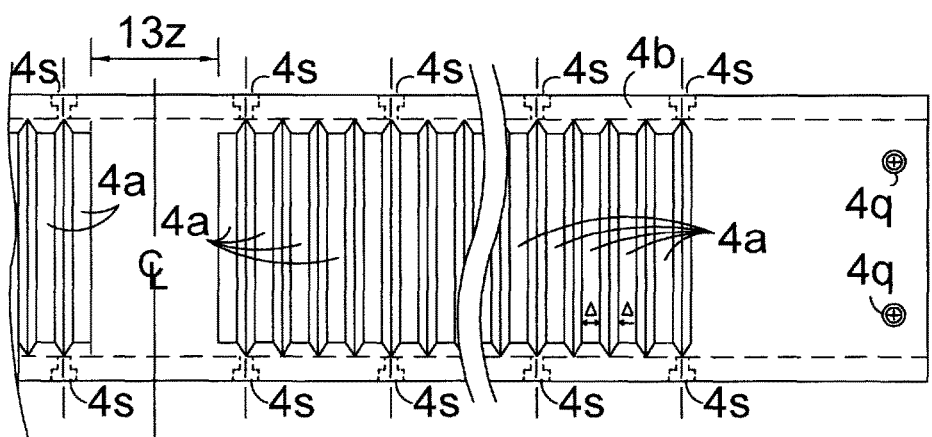
Figure 4D:
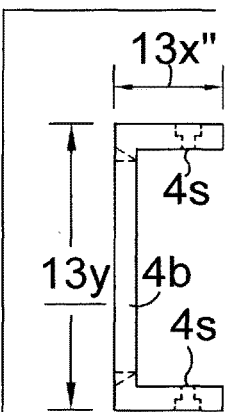
Figure 6C:
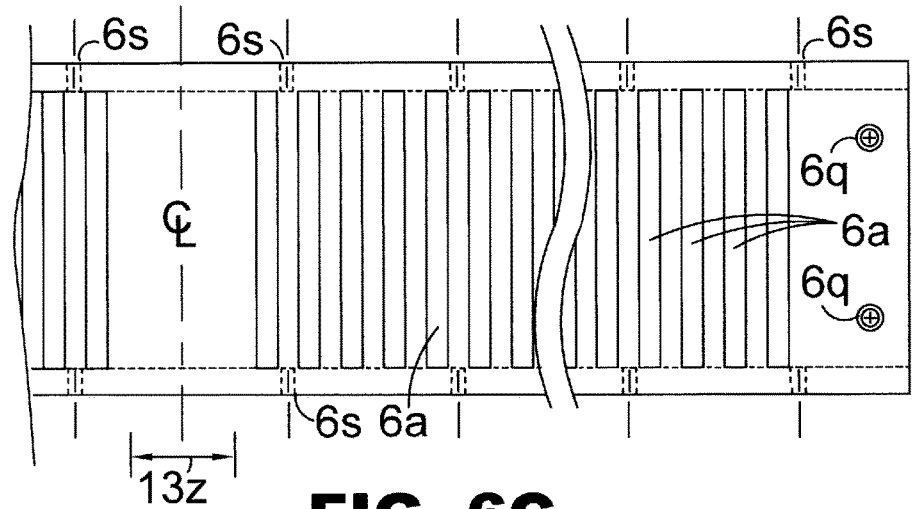
Figure 6B:
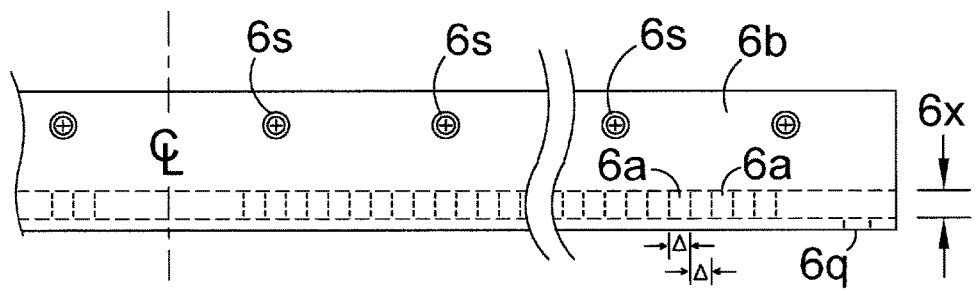
Figure 6A:
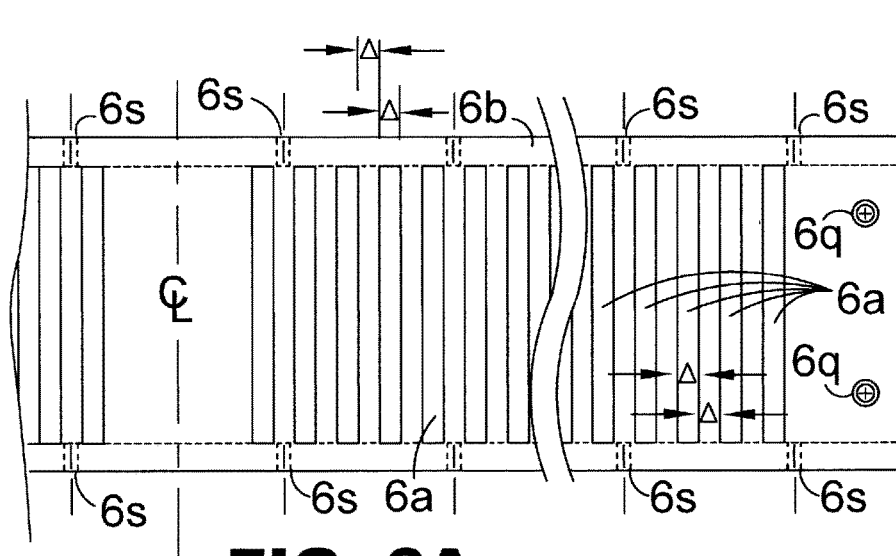
Figure 6D:
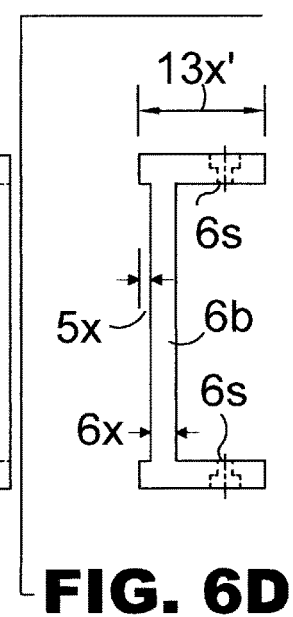
Figure 7B:
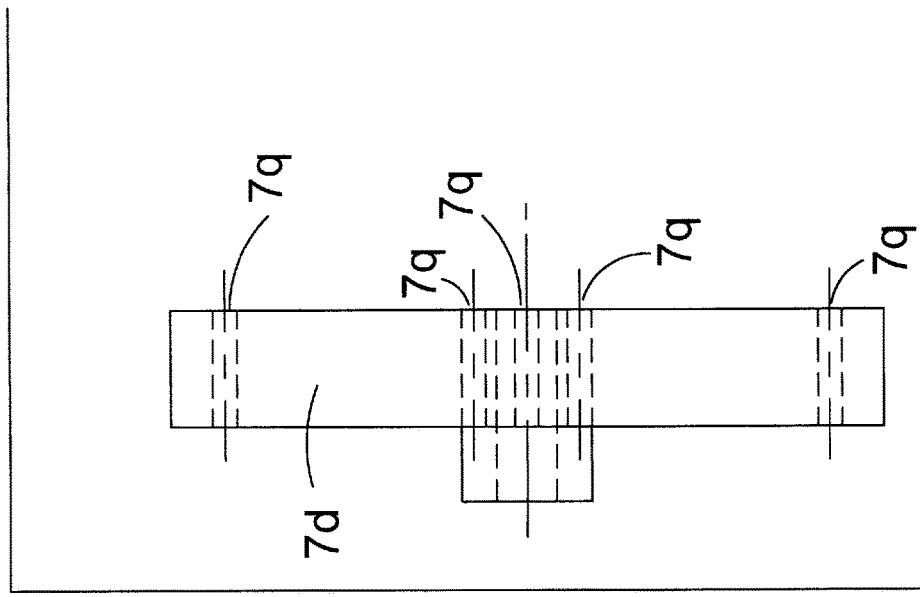
Figure 7A:
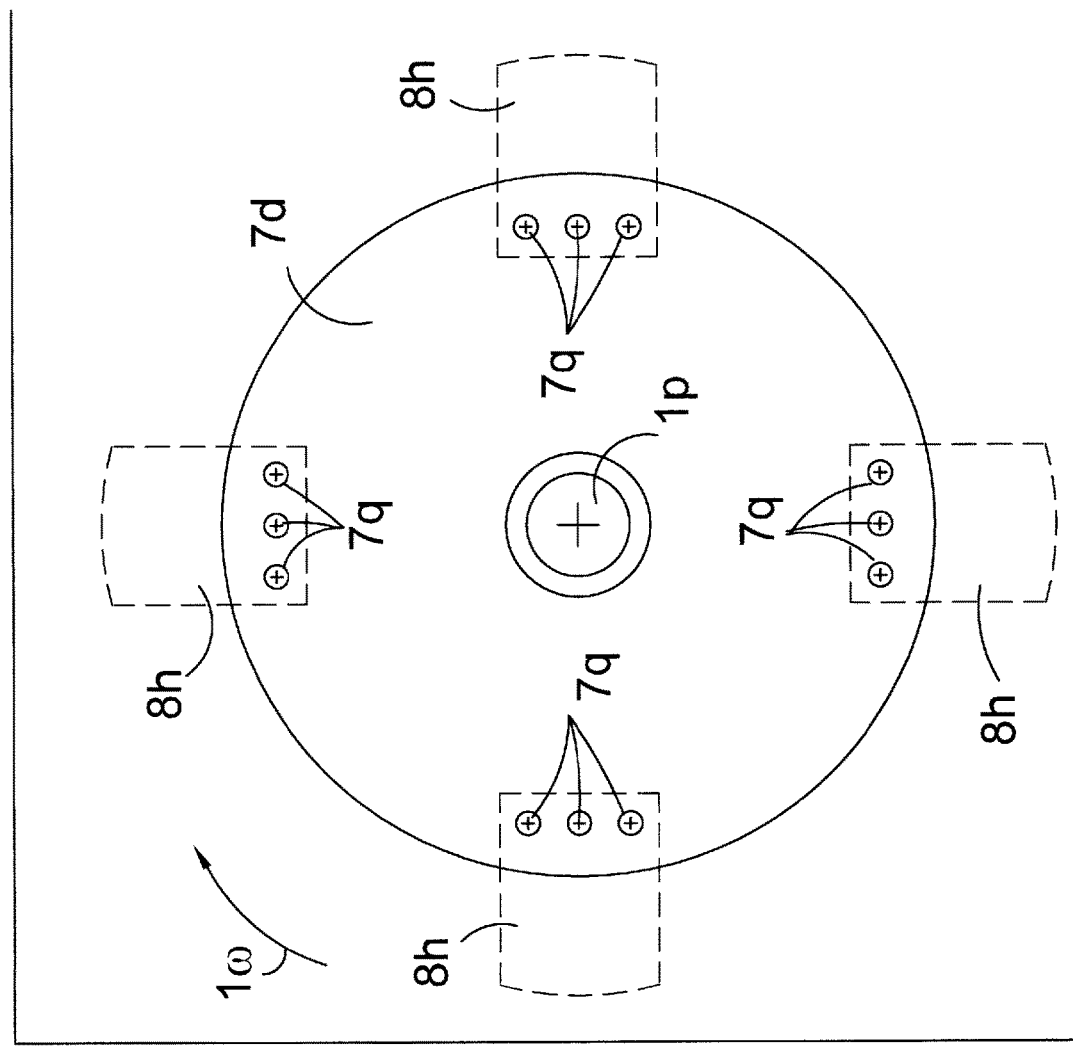
Figure 12B:
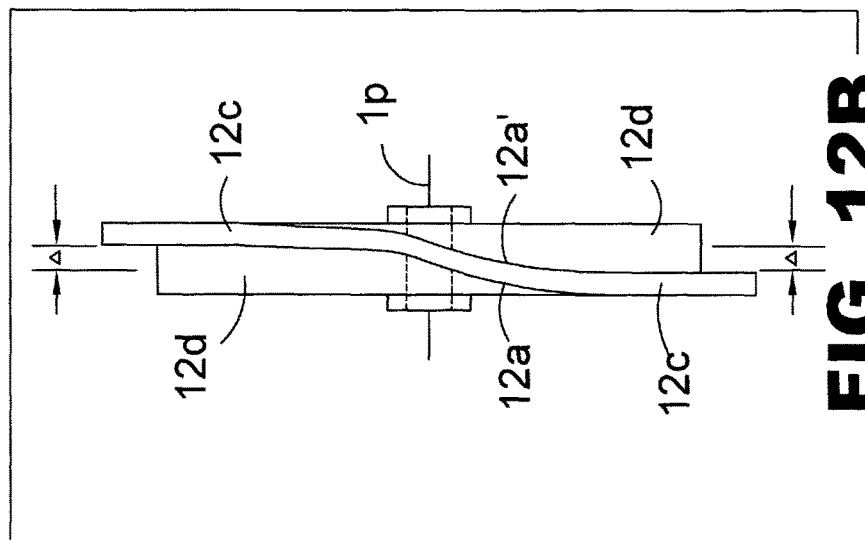
Figure 12A:
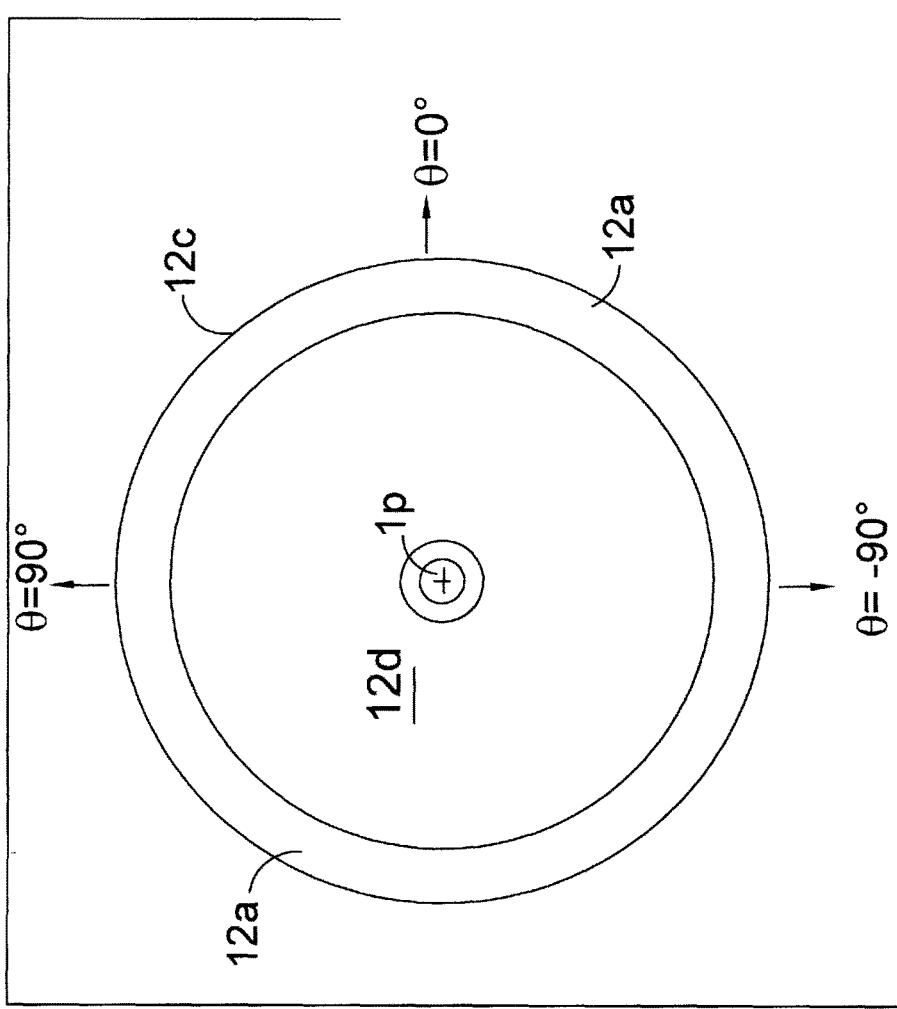
Figure 12C:
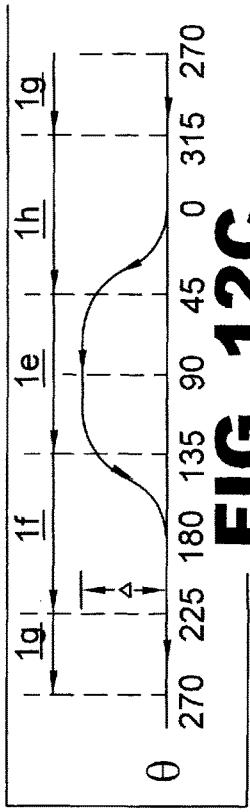
Figure 15:
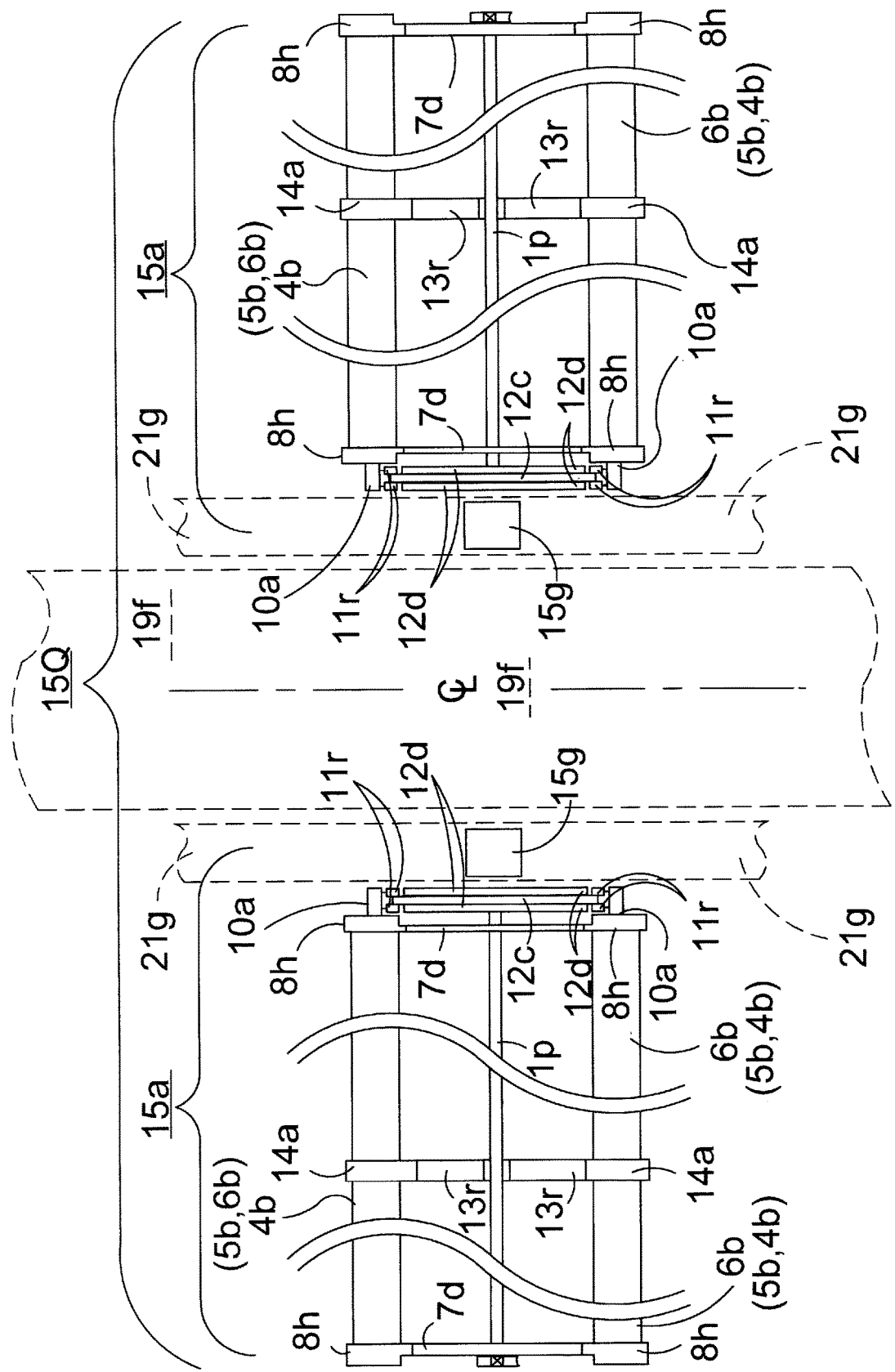

FIG. 3A is a front view showing the composition of a three layers 4b, 5b, 6b of an AACTRB at its maximum area 1a region 1e, where the middle-layer 5b blocks the air flow through these three layers 4b, 5b, 6b;

FIG. 3B is a front view showing the three layers 4b, 5b, 6b of an AACTRB in its partially open regions 1h or 1f. This is when the middle-layer 5b openings 5a are partially aligned with outer layers 4b and 6b openings 4a and 6a;

FIG. 3C is the front view showing the three layers 4b, 5b, 6b of an AACTRB in its minimum area 1a region 1g, when all middle-layer 5b openings 5a aligned respectively with 4b and 6b openings 4a and 6a;

FIG. 3D is the section 3Q view of FIG. 3A. Small ball bearings 3r on top of 5b are not show in FIGS. 3A, 3B and 3C to avoid clutter;

FIG. 3E is the section 3Q' view of FIG. 3B;

FIG. 3F is the section 3Q" view of FIG. 3C;

FIG. 4A is the top view of the front-layer 4b of a three-layer AACTRB. 4a are rectangular openings on 4b. 4q are the screw locations where 4b is attached to 8h at 4q' (FIG. 8). 4s are screws locations where 4b is attached to back-layer 6b at 6s. Thickness of 4b is 4x;

FIG. 4B is the back view of FIG. 4A;

FIG. 4C is the front view of FIG. 4A. Dimensions 4x is the thickness of 4b. 13z is at the midpoint of 4b where the three-layer AACTRB is attached to 13r;

FIG. 4D is the end view of FIG. 4C;

FIG. 5A is the front view of the middle-layer 5b of a three-layer AACTRB. 5a are rectangular openings on 5b. 5q are the pin 10q locations, where 5b is connected to the oscillating block 10a at 10q. 5x is the thickness of 5b;

FIG. 5B is the section 5Q view of FIG. 5A;

FIG. 5C is the end view of FIG. 5A;

FIG. 6A is the front view of the back-layer 6b of a three-layer AACTRB. 6a are the rectangular openings on 6b. 6q are the screw locations where 6b is attached to 8h at 6q' (FIG. 8). 6s are the screws locations where front-layer 4b is attached to back-layer 6b;

FIG. 6B is the top view of FIG. 6A. The space 13z in the mid-point of 6b is where the rotating arm 13r and clamp 14a are connected to the assembled (FIG. 14D) three layer AACTRB 4b, 5b, 6b. Thickness of 6b is 6x;

FIG. 6C is the rear view of FIG. 6A;

FIG. 6D is the end view of FIG. 6A. 13x' is the width of 6b flange;

FIG. 7A is the front view of the rotating end disk 7d, which connects four 8h blocks at screw locations 7q. This allows each 8h to connect to one end of a three layer blade at 4q and 6q. The locations of 8h are shown by dashed outlines on 7d;

FIG. 7B is the side view of FIG. 7A;

FIG. 8A is the front-end view of the block 8h which connects each 4b and 6b ends at screw locations 4q' and 6q' and to disk 7d at screws locations 7q';

FIG. 8B is the front view of FIG. 8A. The space between the two 7q' is for 7d. Also shown are the screw locations 4q' where the end of front-layer 4b is attached to 8h. Screw locations 8q are where cover-plate 9a is attached to 8h;

FIG. 8C is the rear-end view of FIG. 8B. The center 10x by 10y space is for the oscillating block 10a;

FIG. 8D is the top view of FIG. 8B;

FIG. 9A is the front view of a cover plate 9a attached to 8h at 8q. removing cover plate 9a allow service the connection between 5a and 10a;

FIG. 9B is the end view of FIG. 9A. 9g are groves to allow pin 10p to extend out slightly so that 10p can be pulled out to disconnect 5b from 10a;

FIG. 9C is the top view of FIG. 9A;

FIG. 10A is the side view of the oscillating block 10a, which connects the AACTRB's middle-layer 5b to 10a at 5q and 10q respectively. The locations indicated by 10s are for rods 11b which connect to rollers 11r;

FIG. 10B is the top view of FIG. 10A;

FIG. 10C is the front end view of FIG. 10A, where the vertical slot space is reserved for the middle-layer 5b which has a thickness 5x;

FIG. 10D is the side view of one of the three pins used to connect middle-layer 5a to the oscillating block 10a at 10q. The maximum length of 10p should be less than 10x plus 9x;

FIG. 10E is the end view of FIG. 10D;

FIG. 11A is the end view of the two rollers 11r;

FIG. 11B is the side view of FIG. 11A;

FIG. 11C is a side view showing the connections between the rollers 11r, the oscillating block 10a, shafts 11b connecting 11r to 10a at 10s, connection between 10a and block 8h, connection between 8h and rotating disk 7d and finally contact between rollers 11r and the stationary cam 12d and its twisted rim ring 12c cam surfaces 12a and 12a';

FIG. 12A is the front view of the stationary cam disk 12d and one of the two rollers 11r contacting surface 12a on the twisted ring 12c;

FIG. 12B is the side view of FIG. 12A. The present view illustrates the axial 1p displacement A of the twisted ring 12c contour surfaces 12a and 12a'. Ideally, this axial displacement A is identical to the width of each rectangular openings 4a, 5a, 6a of the three-layer AACTRB 4b, 5b, 6b;

FIG. 12C is a view of the twisted rim ring 12c surfaces 12a and 12a' profile in axial 1p displacement, expressed as a function of each AACTRB revolution angle Θ. This figure also illustrates the middle-layer 5b axial 1p displacement profile during each oscillation cycle or AACTRB revolution cycle. Also superimposed on this figure are the regions 1e, 1f, 1g, 1h where each AACTRB area 1a takes a different characteristic 1j during each revolution cycle;

FIG. 13A is the front-view of the four rotating arms 13r used to hold the four three-layer 4a, 5a, 6a AACTRB and where power is transmitted to the AACTRB propeller from 1p. Screw locations 13b and 13c are used to hold a cover clamp 14a to each 13r. 13x is the sum of 4b, 5b, 6b thickness 4x, 5x, 6x respectively. 13y is the height of 4b. 13z is the width of 13r;

FIG. 13B is side-view of FIG. 13A;

FIG. 14A is the side-view of a cover clamp 14a holding the three-layer AACTRB to the rotating arm 13r. Screw locations 14b and 14c are aligned to screw locations 13b and 13c respectively on 13r;

FIG. 14B is the side view if FIG. 14A;

FIG. 14C is the top view of FIG. 14A;

FIG. 14D is a sectional view of assembled 14a, 13r, 4b, 5b and 6b;

FIG. 15 is the sectional view 2Q of FIG. 2B, which illustrates the identical left side 15a and the right side 15a AACTRB propellers labeled 15Q. The symbol 15Q is also used to represent a pair of identical 15a CATRB propellers in all other figures by remove items 7d, 8h, 10a, 11r and 12d from FIG. 15. A more detailed illustration on how the left-side FW is connected to its right-side FW is illustrated in FIG. 21, where each small gear box 15g (inside a large gear box 21g) is attached to each TR-propeller on each side of each FW.

Figure 16A:
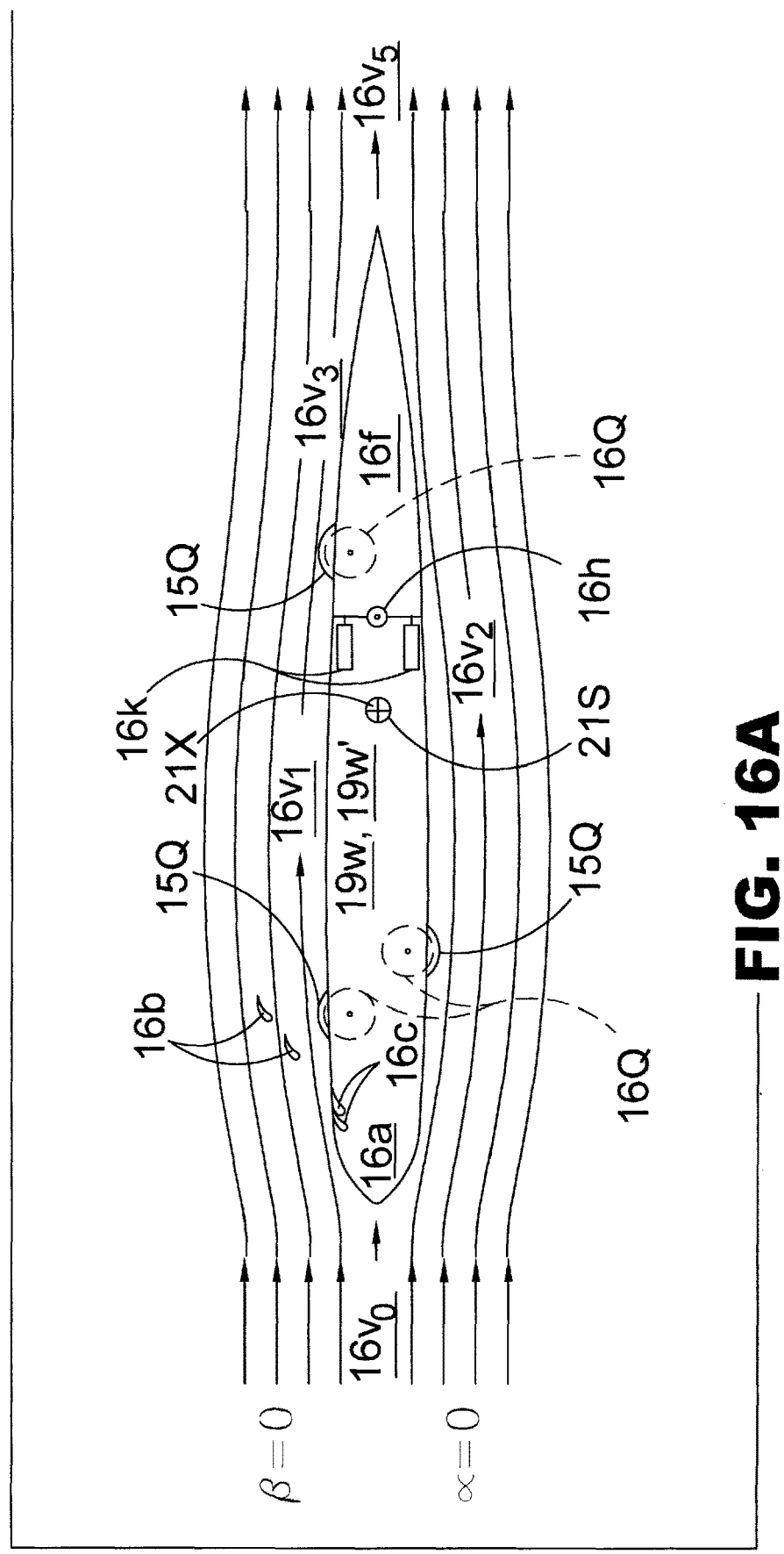
Figure 16B:
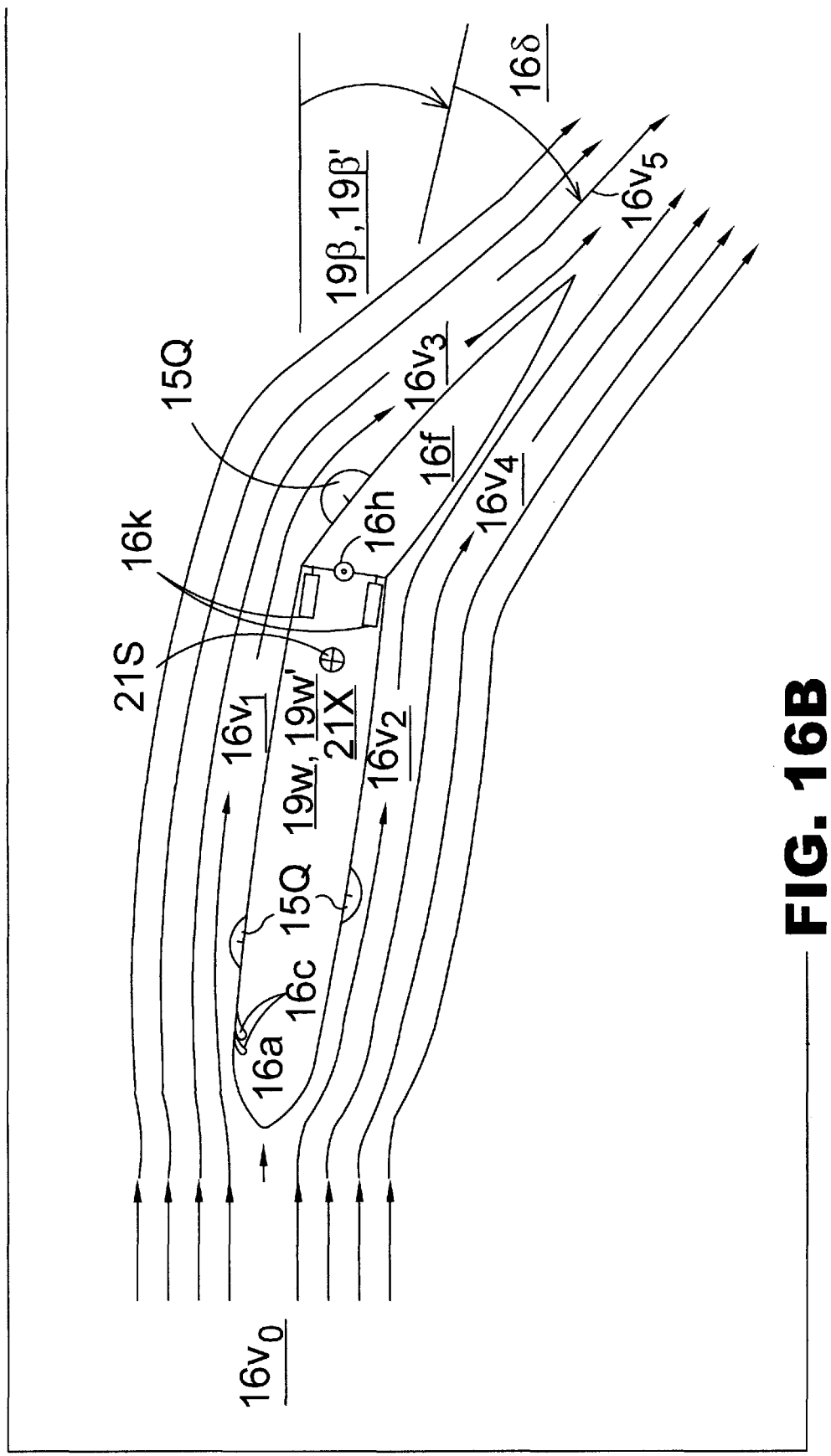
Figure 16C:
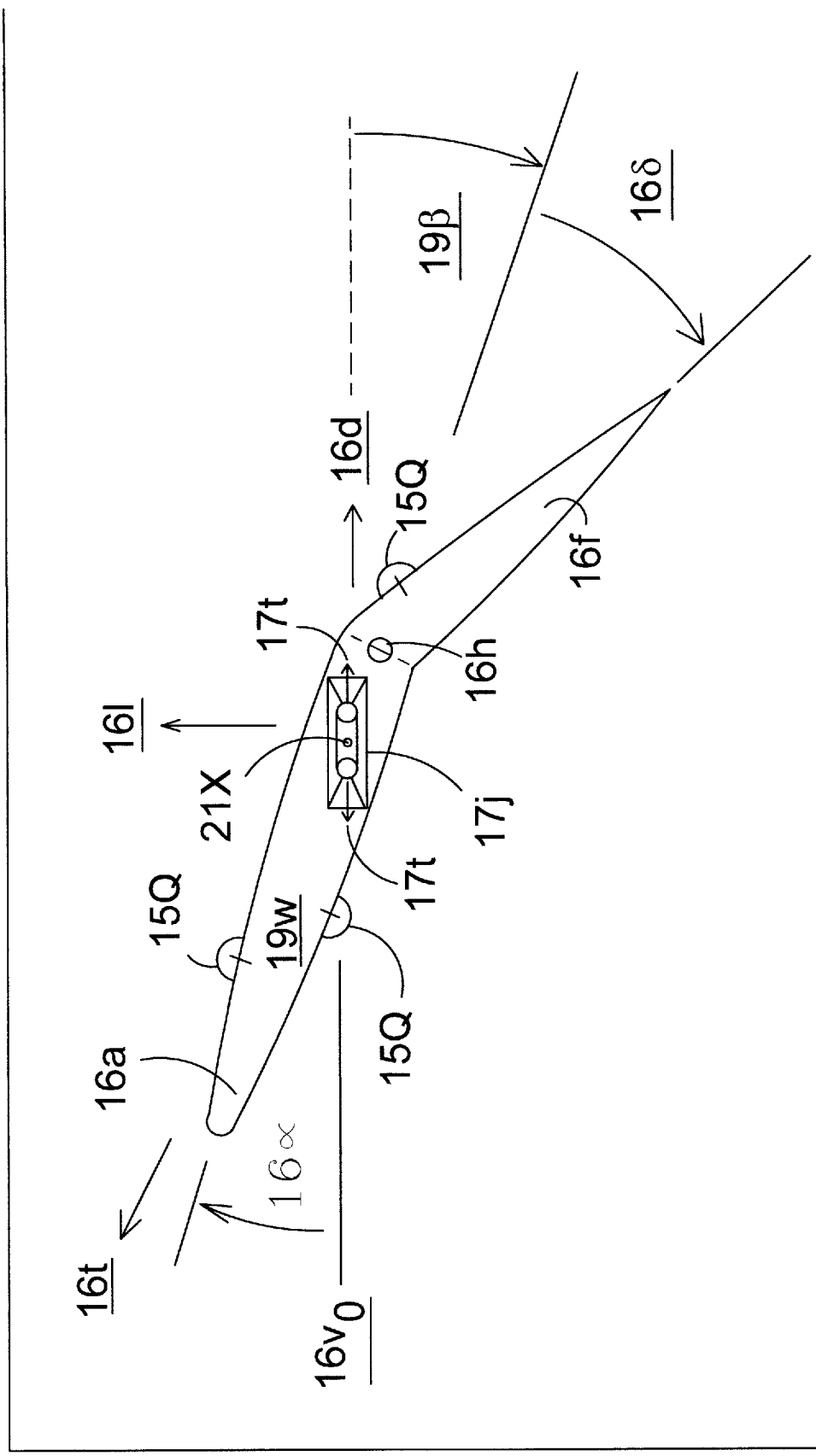
Figure 17A:
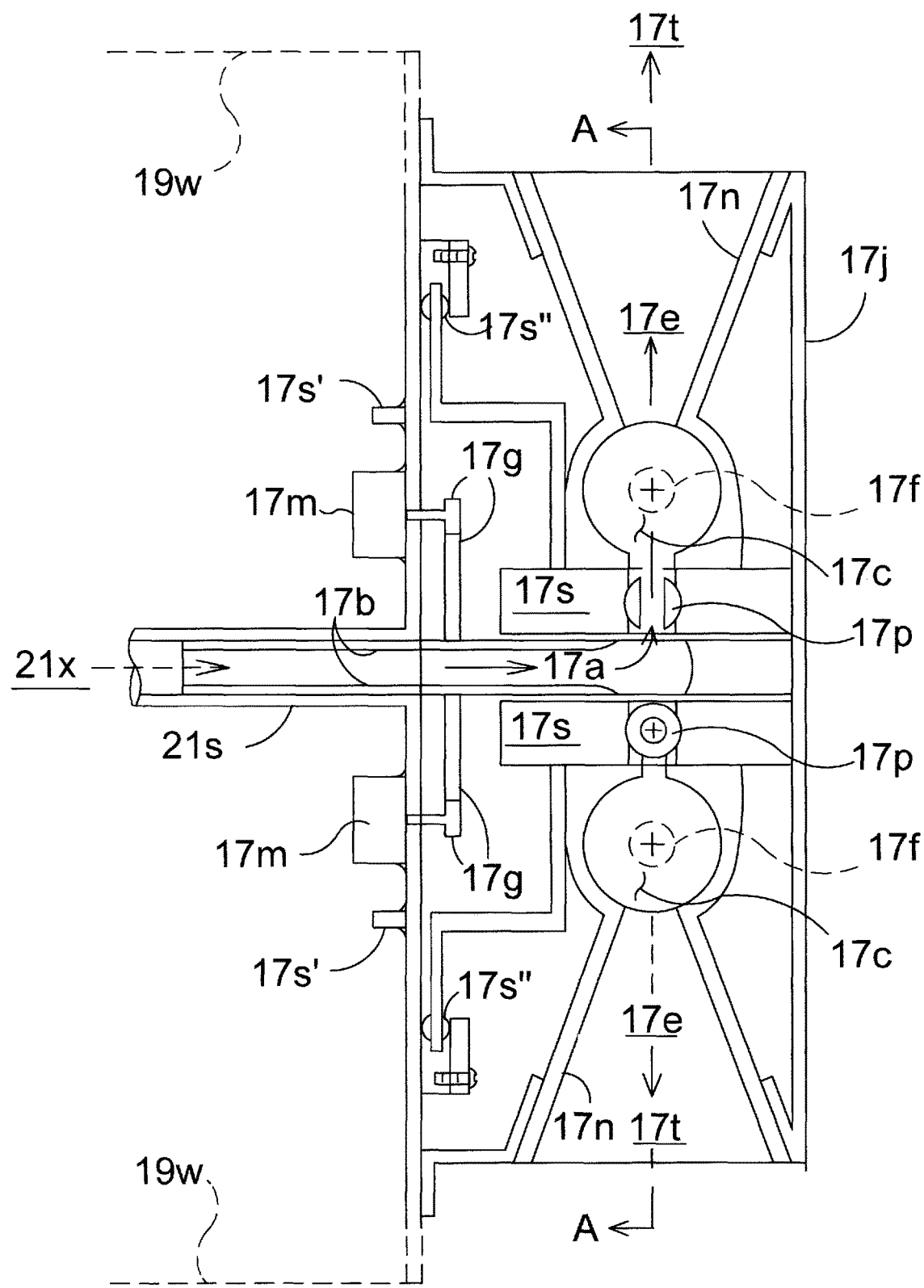
Figure 17B:
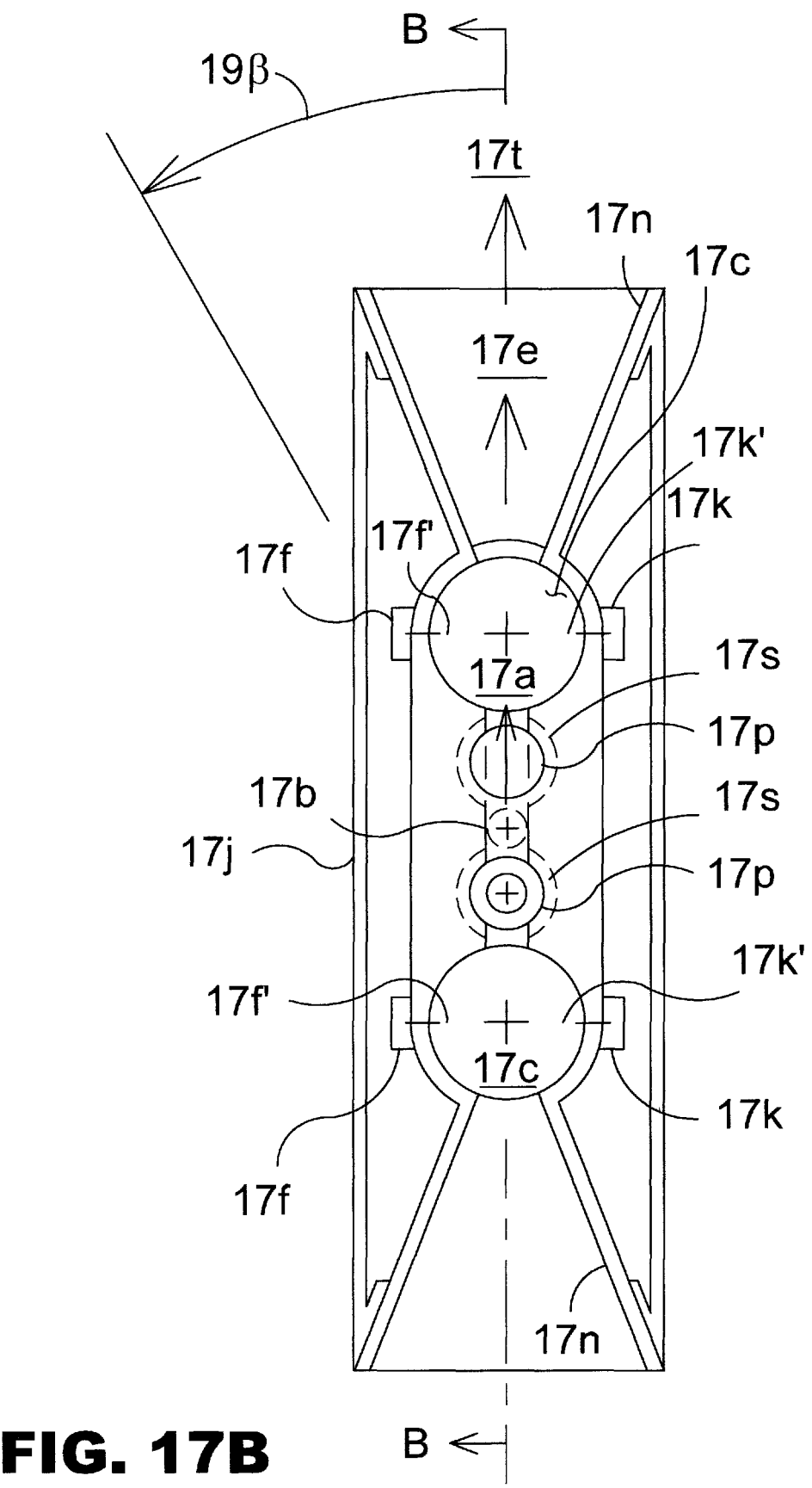

FIG. 16A illustrates the side view of the air flow pattern around a FW 16a (=19w or =19w') with zero flap 16f deflections 16δ=0°. A set of three TR-propellers 15Q are located on the FW's top-front, bottom-front and flap-top-front surfaces. The positions of these 15Q are adjustable as identified by 16Q. A set of FW span-wise airfoil strips 16b located above the FW's top-front 15Q TR-propellers. They are used to deflect more air backward during hover. These airfoil strips 16b are stored inside the FW nose-surface at 16c during FWA high speed forward flight. Hydraulics 16k are used to control the flap 16f deflections 16δ from the front part of the FW 16a about a hinge shaft 16h (parallel to FW span axis 21s). The FW top surface air velocities $16v_1$ and $16v_3$ must be higher than the FW bottom surface air velocity $16v_2$;

FIG. 16B illustrates the air flow pattern around a FW, when the FW is tilted 19β (or 19β') degrees about the FW span axis 21s (or 21s') from local horizontal planes and the flap 16f is deflected 16δ degrees from FW chord plane about the hinge shaft 16h;

FIG. 16C illustrates the resultant force vectors acting on the same FW as illustrated in FIG. 16B. If this FW is in forward level flight, then the wing cord will have an angle-of-attack 16α. $16v_0$ is small when VTOL/FWA is stationary. However, when VTOL/FWA is in vertical ascent or vertical descent, then the $16v_0$ vector in FIG. 16C will be tilted up or down by the vertical ascent or descent speed vectors. 17j is a FW wing-tip RCJ jet cluster. 17n are jet nozzles. In this figure the FW is identified as 19w or 19w' and the resultant force vectors are identified as 16l or 16l', 16d or 16d' and 16t or 16t' for lift, drag and thrust vectors on FW 19w or 19w' respectively. These notations will be referenced in later discussions;

21x and 21x' are the center lines of wing-span axes 21s and 21s' of 19w and 19w' respectively; when the FW 19w and 19w' tilt 19β and 19β', their respective wing-tip RCJ jet clusters 17j and 17j' will counter rotate –19β and –19β' about their respective axis 21s and 21s' to maintain the jet thrust vectors 17t always parallel to the FW horizontal rotational φ plane;

FIG. 17A illustrates the top section-view of a typical FW wing-tip RCJ jet cluster 17j consisting of two jets. Compressed air 17a is piped 17b in along the FW 19w wing-span axis 21s via valve 17p to combustion chamber 17c. Where fuel 17f is injected into 17c and an electric spark 17k' is used to ignite the air/fuel mixture causing combustion in the combustion chamber 17c. The explosion exhausts 17e at high velocity through the nozzle 17n generating a thrust pulse vector 17t at the wing-tip perpendicular to the wing-span axis 21s. 17s are solenoids controlling the valves, 17p. 17m are electric motors which rotate the 17j via gears 17g in opposite direction –19β of the 19w tilt angle 19β. This is done to maintain the jet thrust pulses 17t vectors always parallel to FW rotational 19φ horizontal plane. 17s' are solenoids used to lock/unlock the RCJ cluster 17j to the wing-tip structure 19w. During hover, the electric motors 17m may be used to rotate one FW's RCJ jets 17j 90° to align their thrust vectors 17t perpendicular to the FW's rotational φ plane. This is done to maintain VTOL/FWA stability during "anchored level flight hover" state;

FIG. 17B is the section A-A view of FIG. 17A. 17f are the fuel injection units. 17k and 17k' are the spark generator and spark location respectively.

Figure 17C:
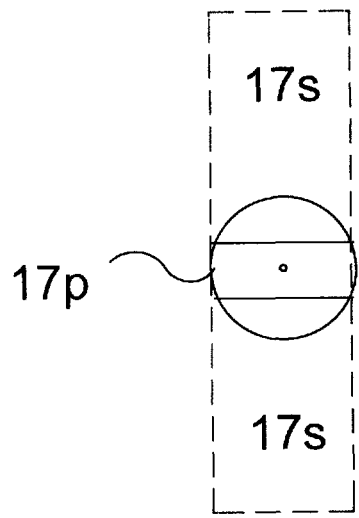
Figure 17C:
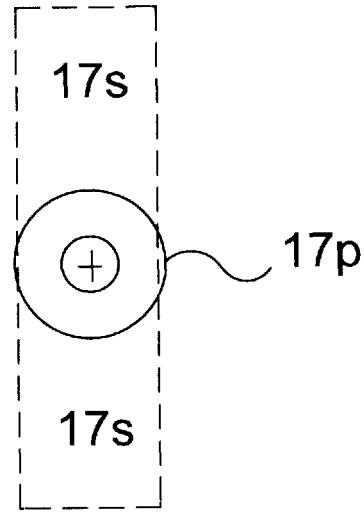
Figure 17C:
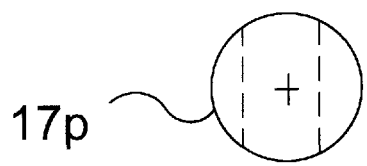
Figure 19A:
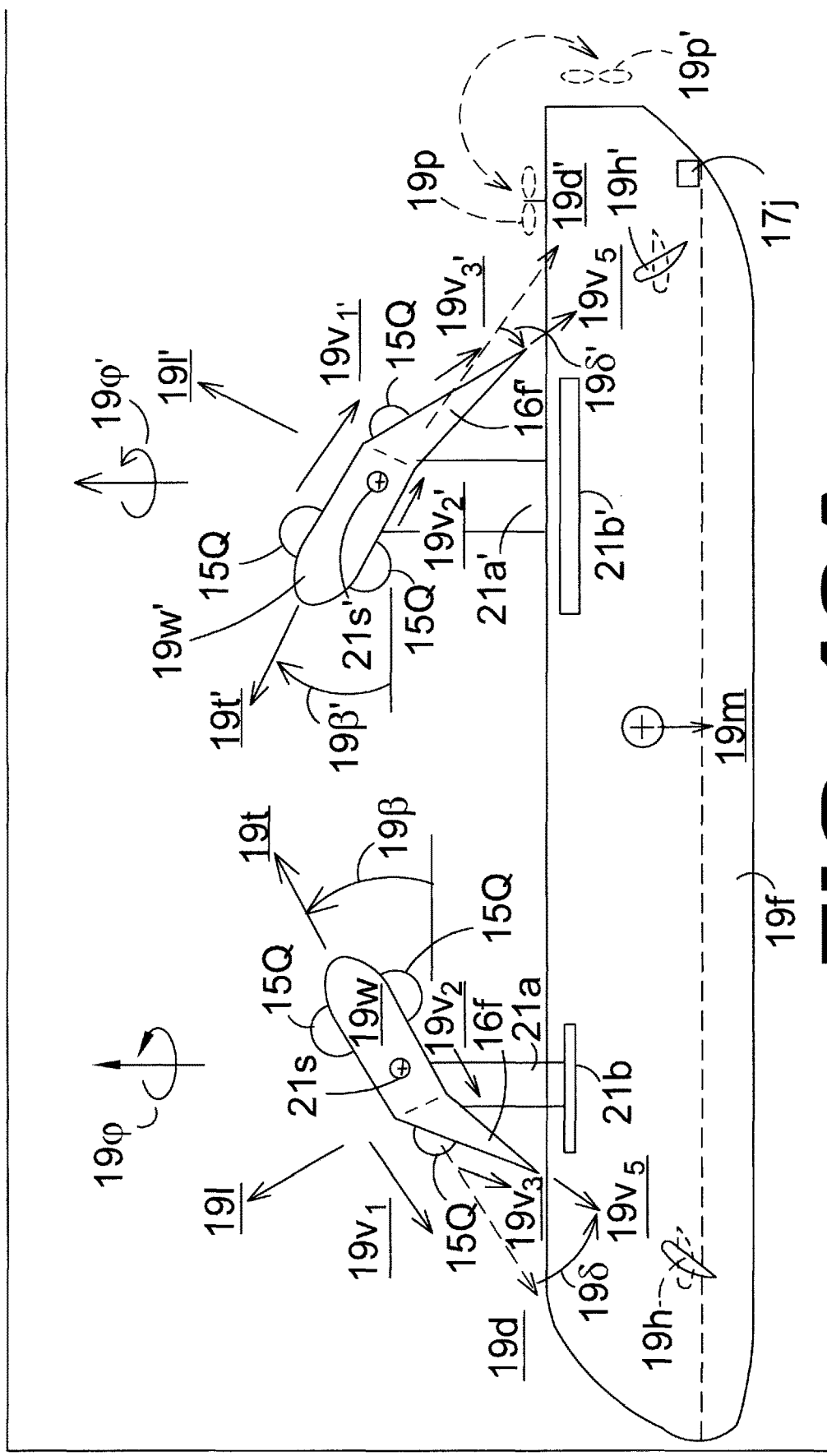

FIG. 17CA shows a relative view of solenoid 17s controlling valve 17p rotation;

FIG. 17CB shows a relative view of solenoid 17s controlling valve 17p rotation;

FIG. 17CC shows the controlling valve 17p rotation;

FIG. 18A illustrates the side view of an aircraft equipped with only one FW 18w (=19w) and one elevator 18h;

FIG. 18B is the top view of FIG. 18A;

FIG. 18C is the front view of FIG. 18B;

FIG. 19A is the side view of a VTOL/FWA of weight 19m in its hover or vertical ascent/descent or low-speed forward/backward or ALFH (Anchored Level Flight Hover) configurations.

Figure 19B:
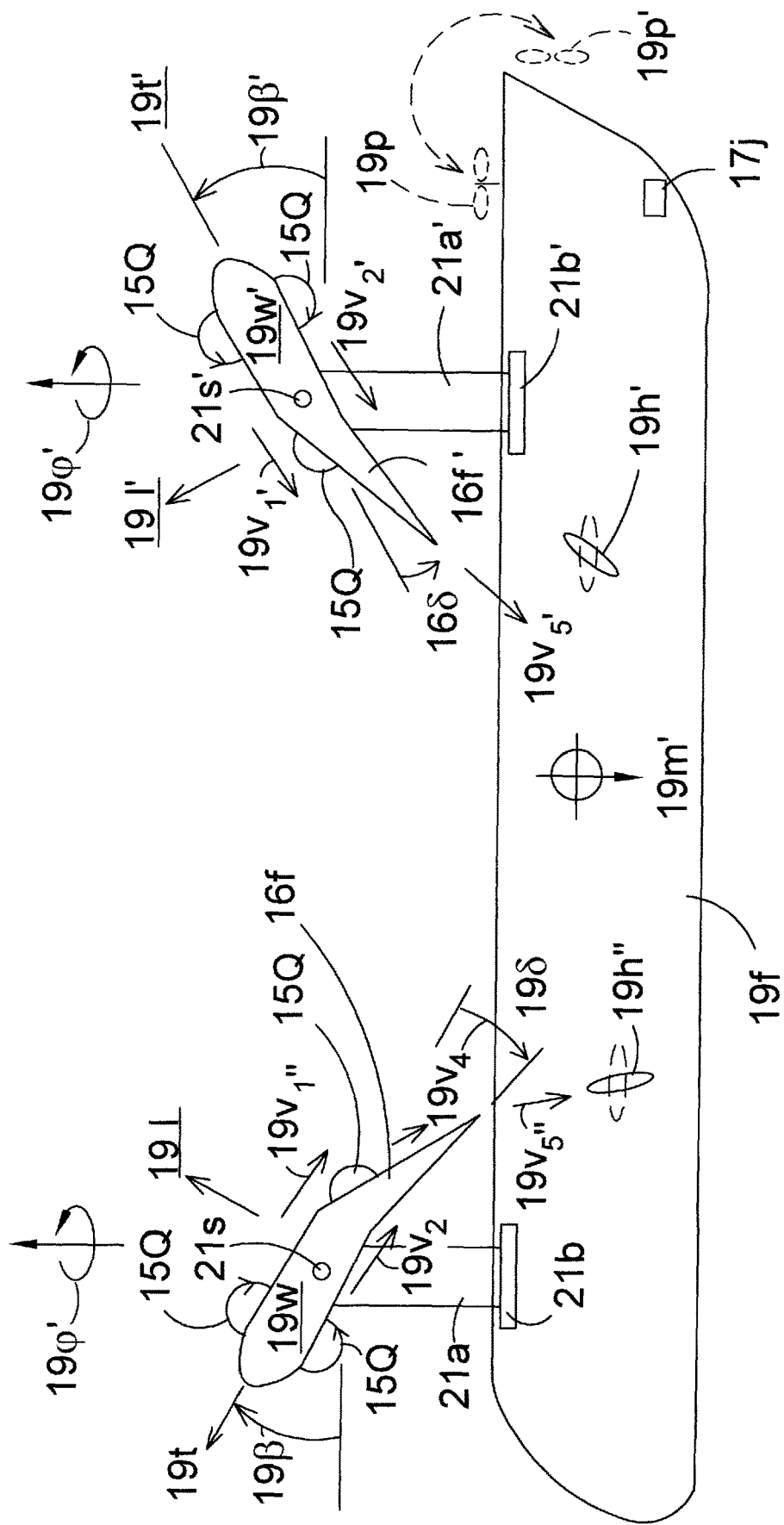
Figure 20:
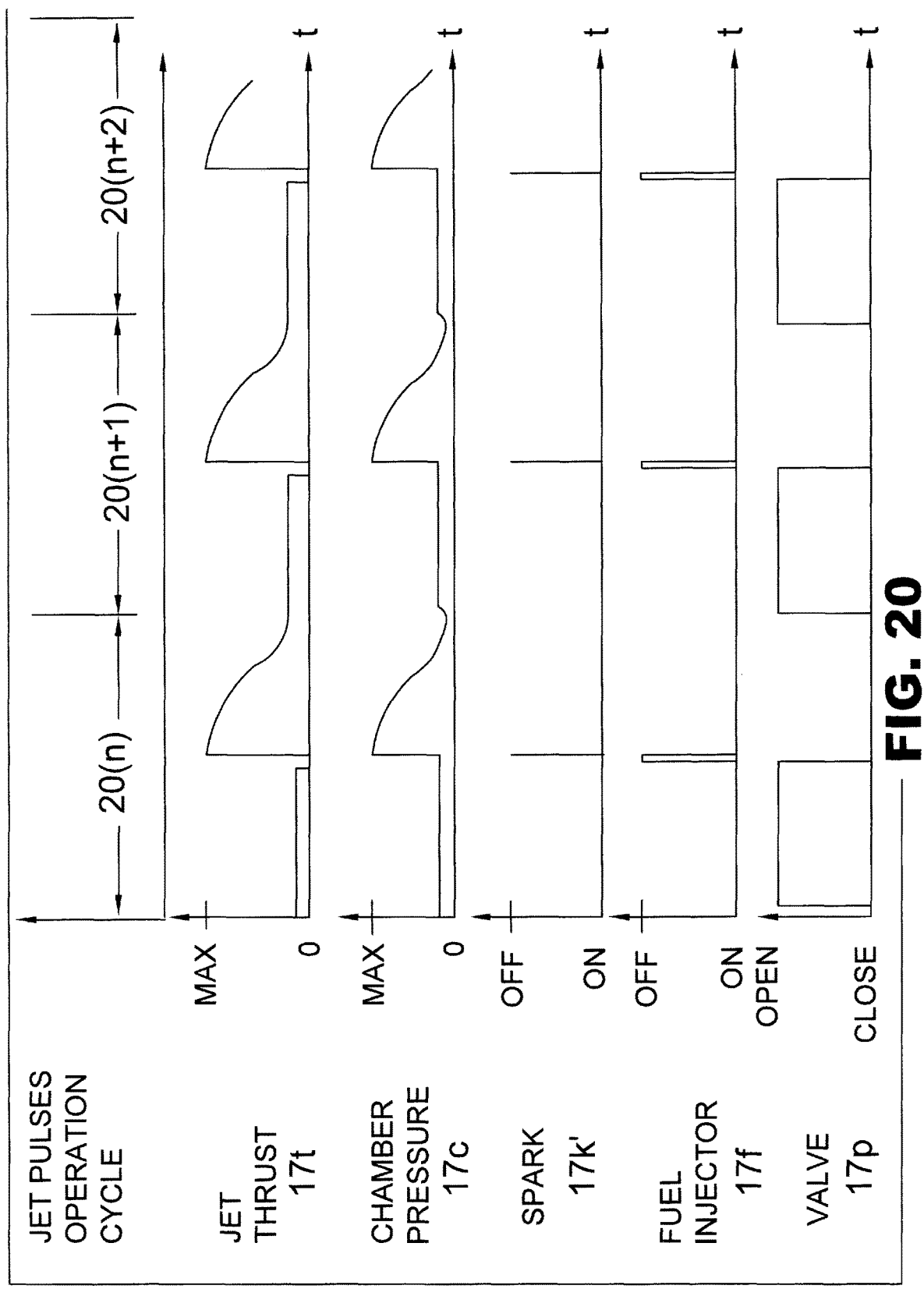

FIG. 19B is an alternative configuration of FIG. 19A: FIG. 19B showing the FW 19w and 19w' tilted upward with their leading edges pointing AWAY from each other;

FIG. 20 illustrates the timing sequence used to generate a sequence of jet pulses 17t.

Figure 21B:
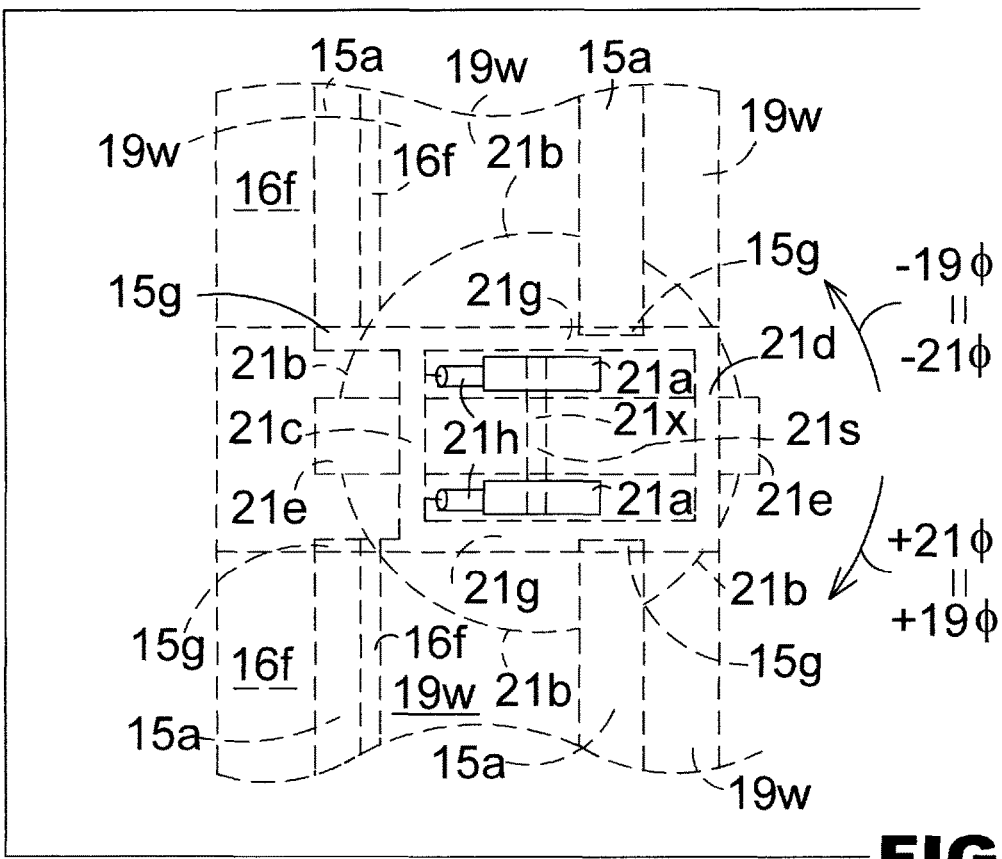
Figure 21A:
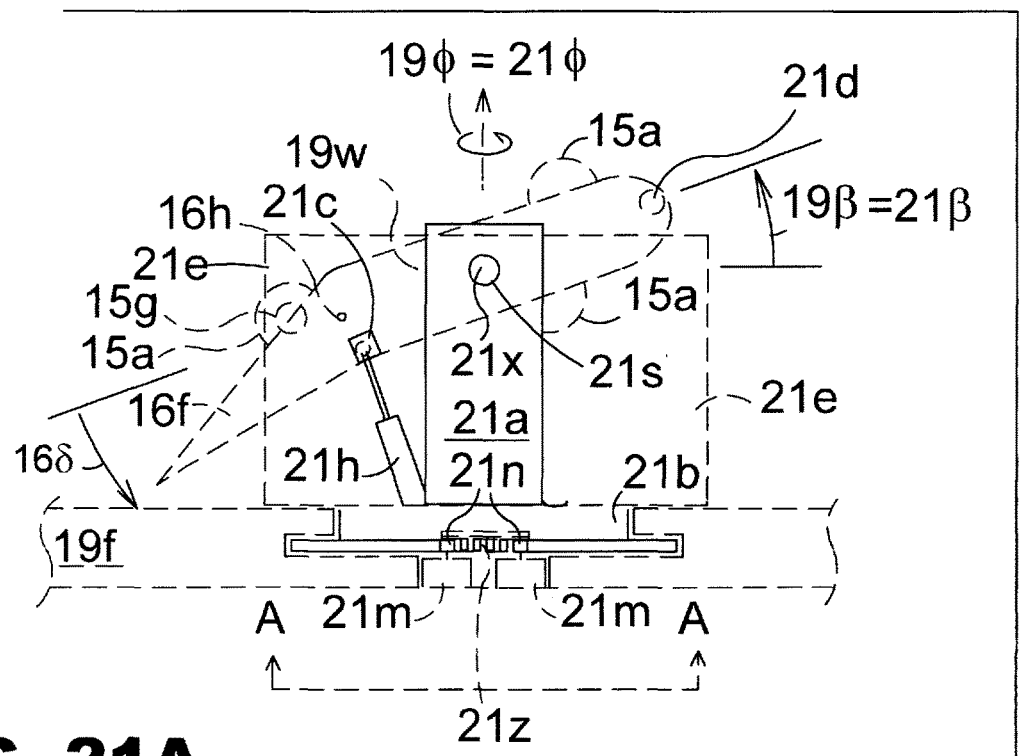

FIG. 21A illustrates the way FW 19w is connected on the fuselage 19f by two vertical beams 21a attached on top of a rotatable disk 21b.

Figure 21D:
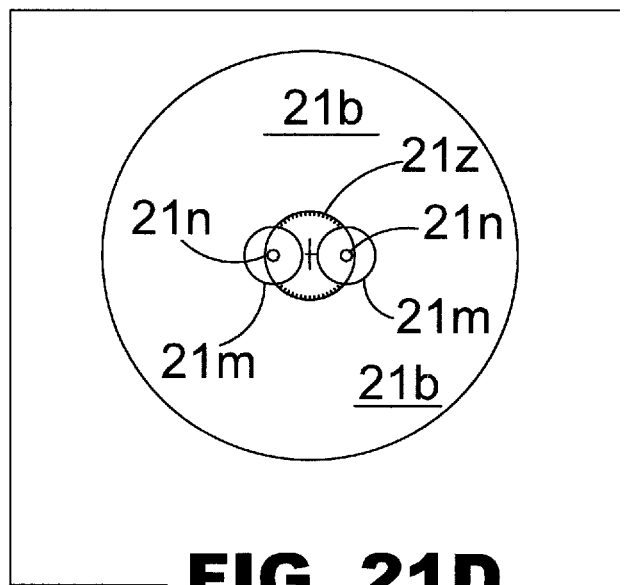
Figure 21C:
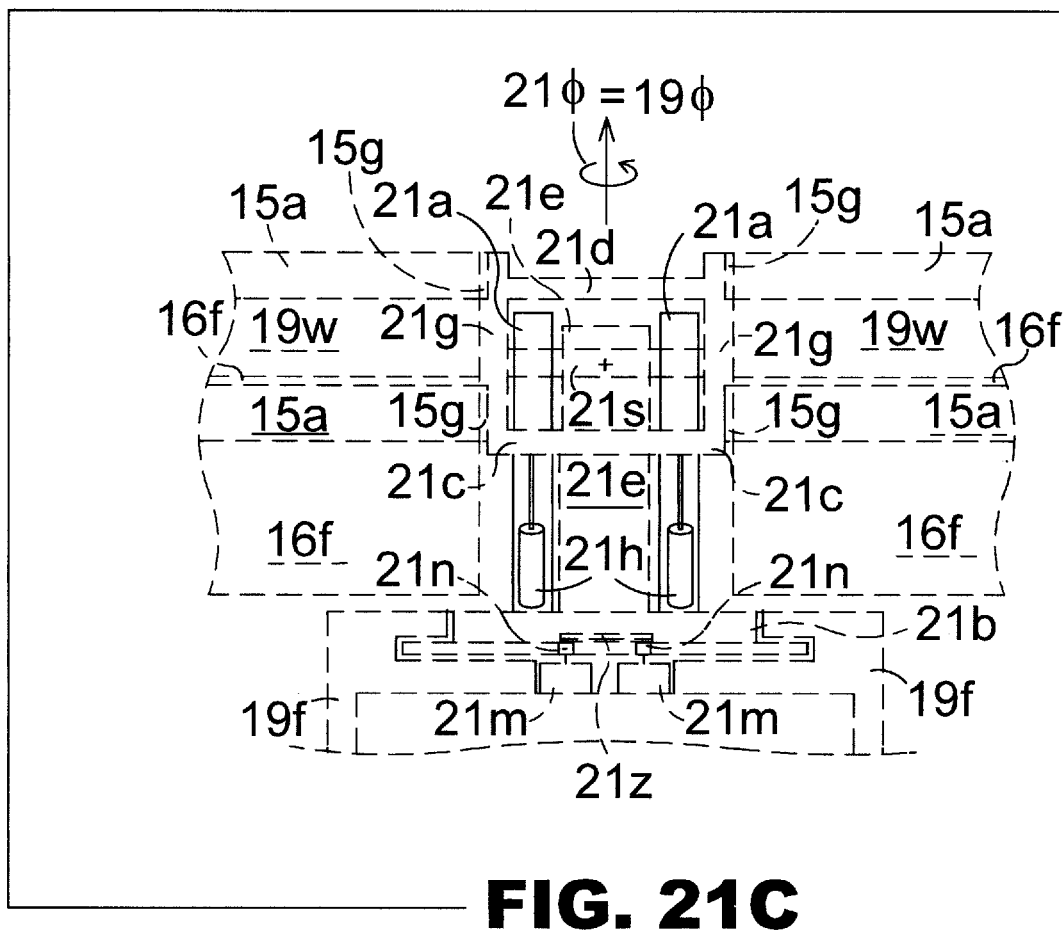

FIG. 21B is the top-view of FIG. 21A;

FIG. 21C is the end-view of FIG. 21A.

Figure 22C:
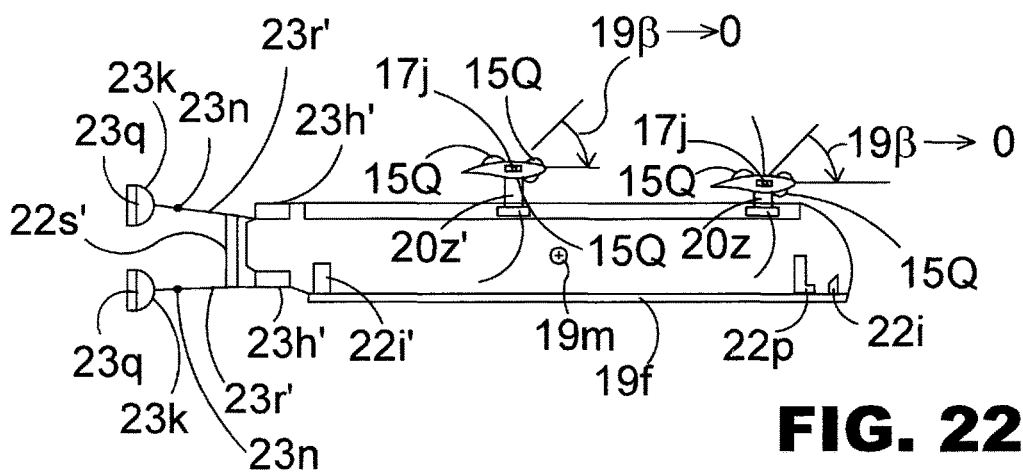
Figure 22B:
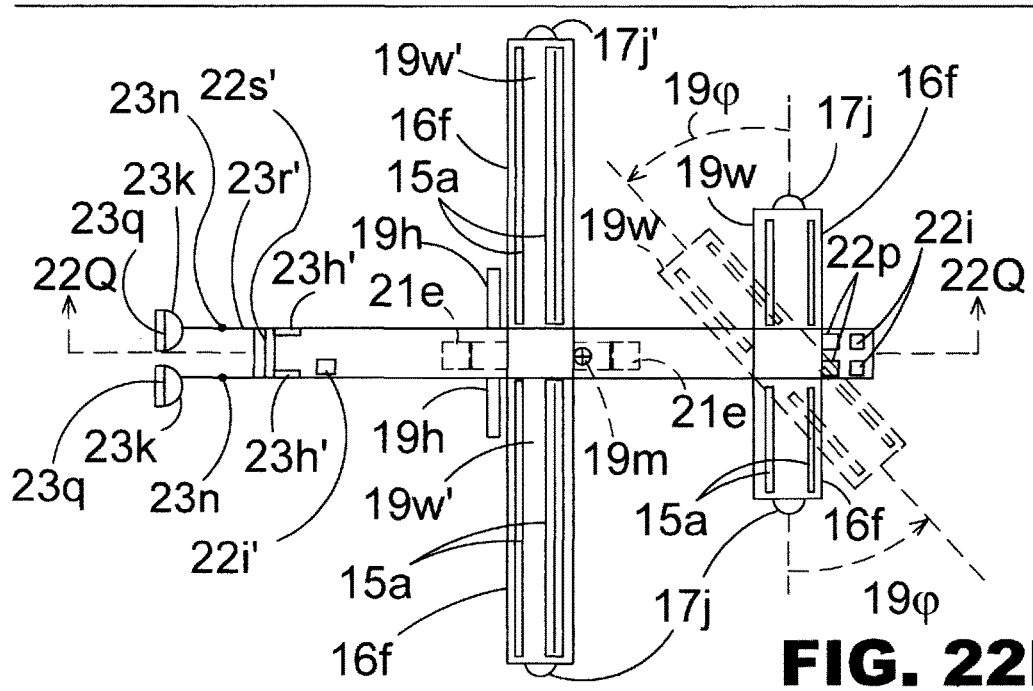
Figure 22A:
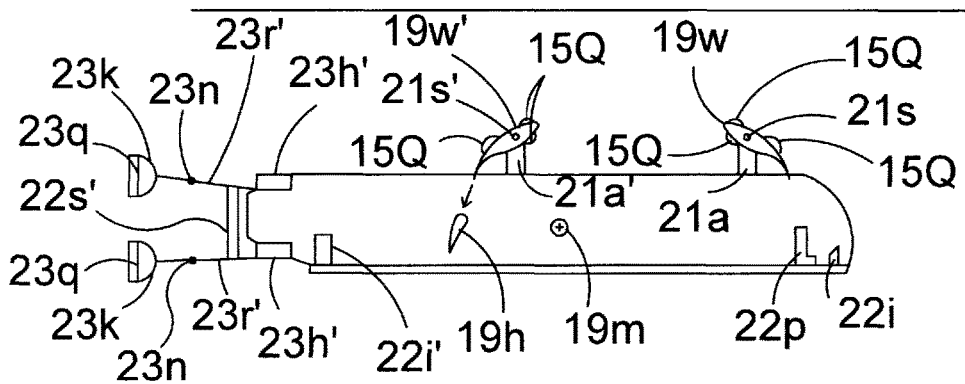

FIG. 21D is the bottom view of FIG. 21A. Illustrates the use of electric motors 21m and gears 21n and 21z to fine turn 21φ;

FIG. 22A is a sectional 22Q (FIG. 22B) view of a hovering FIG. 19A. 22p are the pilot seats and 22i the instrument panel. 22s' is the folded position of steps 23s and walking plank, 23f. 23h' are the folded positions of hydraulic systems 23h. Each 23h controls a leg 23r, a knee 23n and a foot 23q. 23k are air inflated balloons, each covering a foot and the heavy spring connecting foot 23q and leg 23r.

Figure 23A:
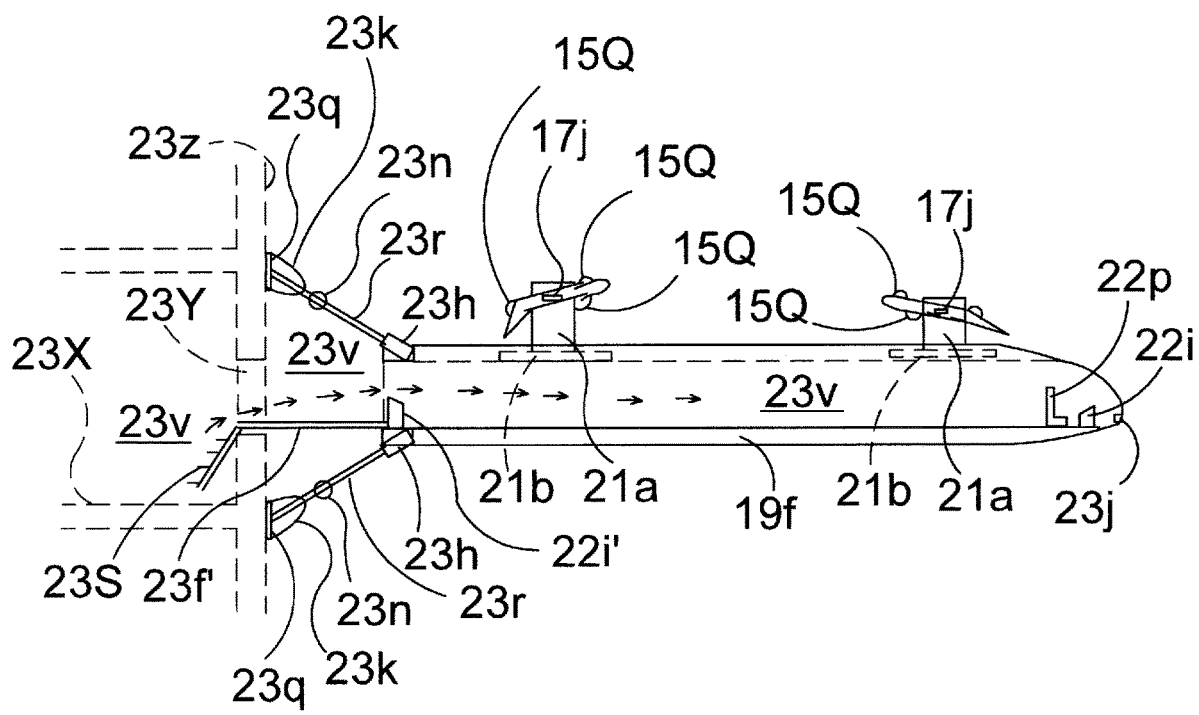

FIG. 22B is the top view of the hovering FIG. 22A during transition flight from hover towards low speed forward flight by rotating 19w in a horizontal plane 180°=19 φ so that both 19w and 19w' leading edges will be pointing to the fuselage nose direction with both 19w and 19w' at high tile angles 19β and 19β' and their flaps 16f and 16c are tilted down 19δ and 19δ';

FIG. 22C is the side view of FIG. 22B transitioned to high speed forward flight after 19w has completed its 180° rotation 19φ and after both FW 19w and 19w' are tilted down 19β and 19β' and flaps 19f, 19f' are tilted up 19δ, 19δ' close to zeroes and desired angle-of-attack 16a and 16a' values are achieved;

FIG. 23A is the section view of a VTOL/FWA in backward level flight configured during high rise building 23z window 23y rescue mission (HRBRM) with its legs 23r, knees 23n and feet 23q pushed on the building wall and walkway 23f extended and stairs 23s inside the window 23y.

Figure 23B:
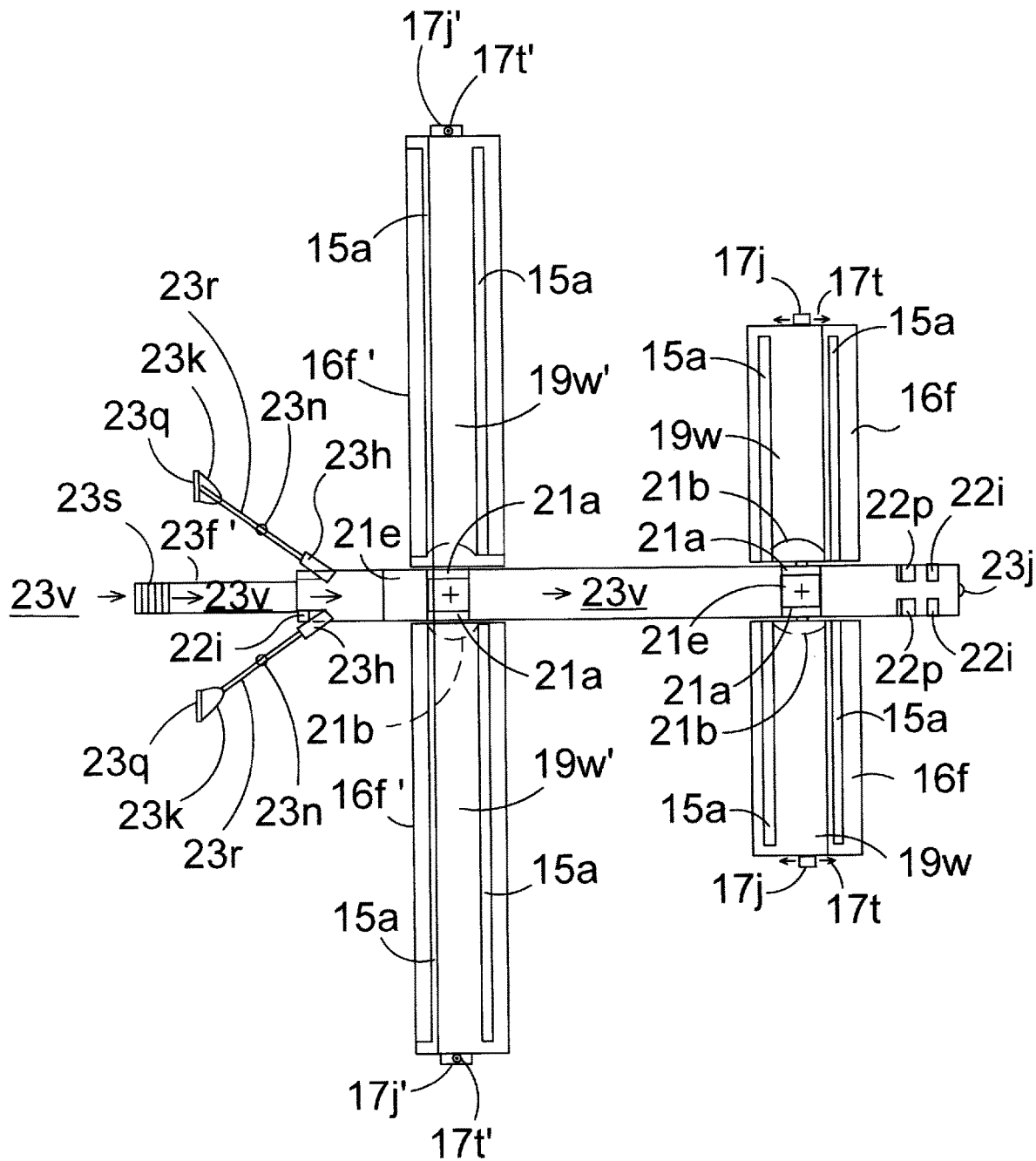
Figure 23C:
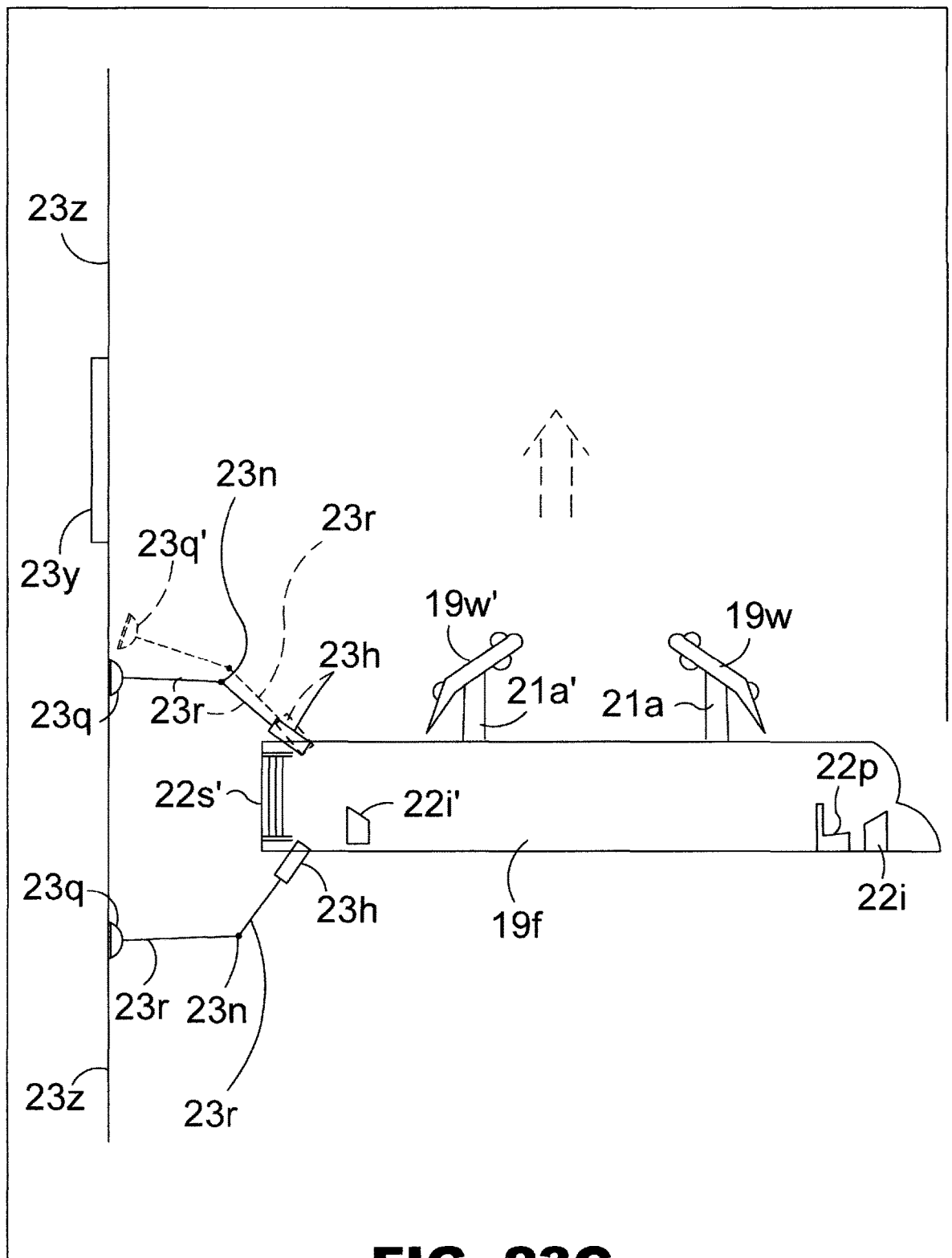

FIG. 23B is a top view of FIG. 23A. 23v is the escape pathway from the burning building floor 23x to the inside of VTOL/FWA;

FIG. 23C illustrates the walking maneuver of a VTOL/FWA. Prior to extending 23f' and 23s into the window 23y, this VTOL/FWA while in ALFH state may have to walk on the building outside wall to accurately align it to the window opening.

Figure 24:
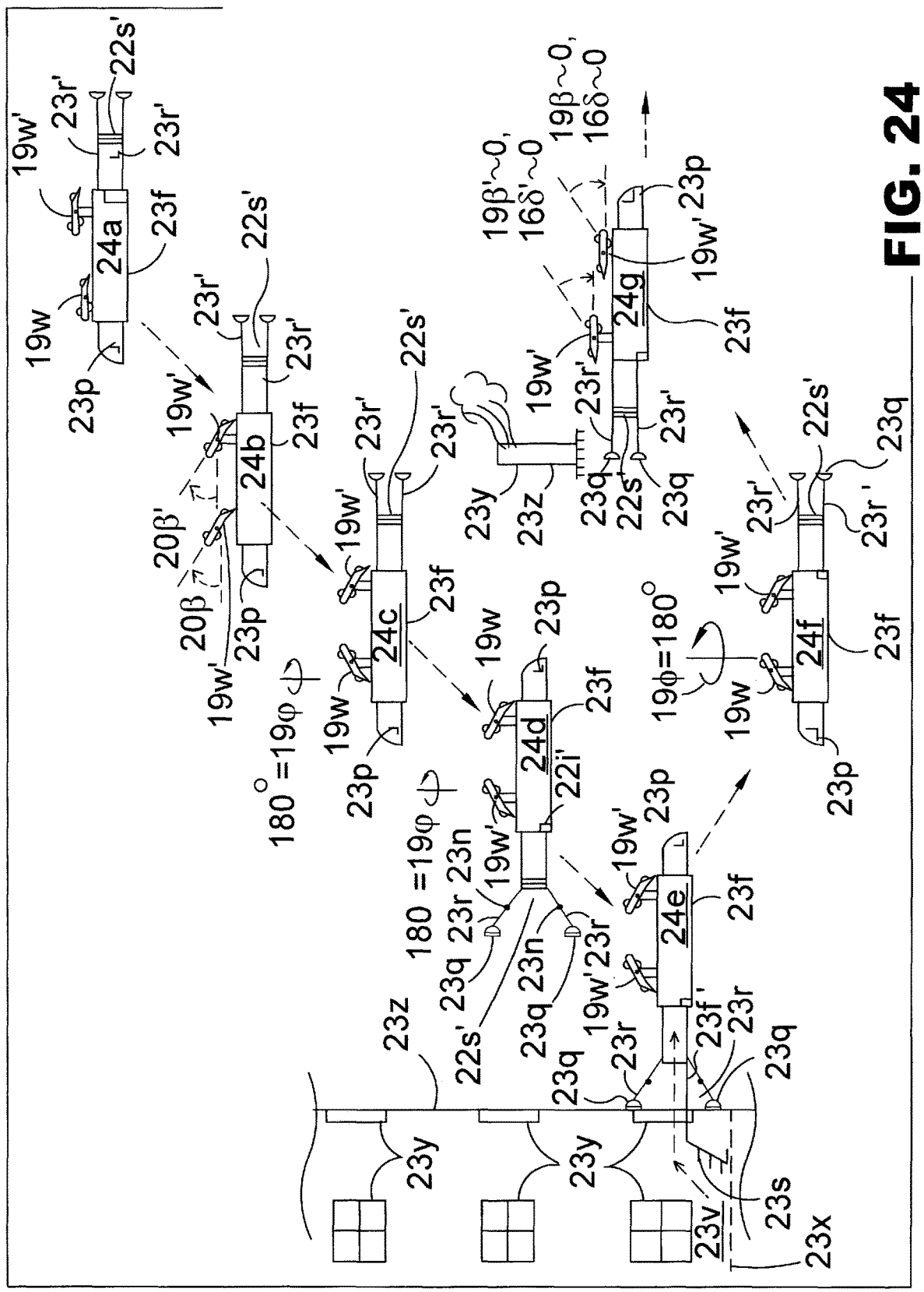

FIG. 24 illustrates the VTOL/FWA high rise building 23z window 23y rescue mission (HRBWRM) rescue sequence from 24a to 24g;

DESCRIPTION OF THE REFERENCED NUMERALS

Turning now descriptively to the drawings, in which similar reference characters denote similar elements throughout the several views, the figures illustrate the VTOL/FWA of the present invention. With regard to the reference numerals used, the following numbering is used throughout the various drawing figures.

In the following descriptions, different views of a same item are labeled by the same figure number followed by a different capital letter. For example: three views of FIG. 9 are identified as: FIG. 9A, FIG. 9B and FIG. 9C. Furthermore, each important item in each figure is identified by a bold face number followed by a lower case bold face letter: The bold face number corresponding to the figure number where this item is illustrated in its details. For example, item labeled 8h in FIG. 1A is illustrated in detail in FIG. 8. Another example, items labeled 1e in FIG. 12C and in FIG. 16A is illustrated in detail in FIG. 1B. A list of acronyms, symbols and definitions used in the drawing figures follow.

AACTRB Asymmetric Area Changing Transverse-Radial Blade;
ALFH Anchored Level Flight Hover;
CATRB Constant Area Transverse-Radial Blade;
FW Flying-Wing;
FWA Flying-Wing-Airplane;
HRBWRM High Rise Building Window Rescue Mission;
Model A VTOL/FWA model as illustrated in FIG. 19A;
Model B VTOL/FWA model as illustrated in FIG. 19B;
VTOL Vertical Take-Off and Landing;
VTOL/FWA Vertical Take-Off and Landing Flying-Wing Aircraft;
ALFH Anchored-Level-Flight-Hover. Stationary VTOL/FWA (FIG. 19A);
RCJ Reaction-Control-Jets
$[\ldots]_x$ $[(-L_x'-D_x'+T_x')+(L_x+D_x-T_x)]_x$
$[\ldots]_y$ $[(L_y'+T_y'-D_y')+(L_y+T_y-D_y)]_y$
$M^{(z)}_{11}$ 2-D forward-ascent flight in x-y plane and any z-plane.
$M^{(z)}_{21}$ 2-D vertical-ascent flight in x-y plane and any z-plane;
$M^{(z)}_{31}$ 2-D backward-ascent flight in x-y plane and any z-plane;
$M^{(z)}_{12}$ 2-D forward-level flight in x-y plane and any z-plane;
$M^{(z)}_{22}$ 2-D hover flight in x-y plane and any z-plane;
$M^{(z)}_{32}$ 2-D backward-level flight in x-y plane and any z-plane;
$M^{(z)}_{13}$ 2-D forward-descent flight in x-y plane and any z-plane;
$M^{(z)}_{23}$ 2-D vertical-descent flight in x-y plane and any z-plane;
$M^{(z)}_{33}$ 2-D backward-descent flight in x-y plane and any z-plane;

Δ Maximum amplitude of oscillation of middle blade layer; Rectangular opening width of all three-blade layers; Distance between rectangular openings of all three-blade layers;
α Angle-of-attack;
β FW tilt angle reference to a horizontal plane above fuselage;
ψ Desired VTOL/FWA heading;
φ FW azimuth rotation angle in a horizontal plane above fuselage. φ=∅=φ;
θ AACTRB or CATRB propeller blade angle of rotation;
ω AACTRB or CATRB propeller RPM=dθ/dt;
Λ Vector cross operator;
m VTOL/FWA weight;

NOTE: All item number correspond to FIG. number in illustration drawings

FIG. 1
1a Blade area facing tangential air velocity vector $13r \wedge 1\omega$;
1b Transverse-Radial blade;
1d Estimated drag coefficient of 1b;
1e Region of maximum 1a (45°<θ<135° approximately). Where all openings 4a, 5a, 6a on three-layer blade 4b, 5b, 6b are completely blocked;
1f Region where openings 5a on 5b is in the process of moving away of their alignment with openings 4a and 6a to reduce air flow through;
1g Region of minimum 1a (225°<θ<315° approx). Where corresponding openings 4a, 5a, 6a on blade 4b, 5b, 6b are all aligned;
1h Region where openings 5a on 5b is in the process of aligning up with openings 4a and 6a to allow more air flow through;
1i 1b is CATRB (1b=1i) and also represent constant area 1b;
1j 1b is AACTRB (1b=1j) and also represent variable area 1b;
1p Power shaft of AACTRB (or CATRB) propeller;
1m Estimated drag coefficient of 1i;
1n Estimated drag coefficient of 1j;
1ω Transverse-Radial propeller RPM. Also, direction of propeller rotation;

FIG. 2
2g Net reaction force acting on 1p due to rotation of CATRB 1i propeller when 1i is half covered by 2k;
2g' Net reaction force acting on 1p due to rotation of CATRB 1i propeller in free space. 2g'=0;
2k Wing surface covering half of AACTRB 1j propeller or half of CATRB 1i propeller;
2t Reaction force acting on 1p due to rotation of AACTRB propellers 15a and 15a' half covered by 2k;
2t' Reaction force acting on 1p due to rotation of AACTRB propellers 15a and 15a' in free space;
2u Net air velocity per revolution generated by CATRB 1i propeller rotation which is half covered by 2k;
2u' Net air velocity per revolution generated by CATRB 1i propeller rotation in free space;
2v Net air velocity per revolution due to rotation of AACTRB propeller which is half covered by 2k;
2v' Net air velocity per revolution due to rotation of AACTRB 1j propeller in free space;
2Q Section view of 15Q shown in FIG. 15;

FIG. 3
3Q Section view from FIG. 3A for FIG. 3D;
3Q' Section view from FIG. 3B for FIG. 3E;
3Q" Section view from FIG. 3C for FIG. 3F;
3r Ball bearings on top edge of 5b (not shown elsewhere to avoid clutter);

FIG. 4
4a Rectangular openings on front-layer blade 4b;
4b Front-layer blade of the three-layer AACTRB;
4q Screw locations at both ends of 4b to attach 4b to 8h;
4q' Screw locations on 8h (FIG. 8) to connect 4b to 8h;
4s Screw locations to attach 4b to 6b;
4x Thickness of 4b;
FIG. 5
5a Rectangular openings on middle-layer blade 5b;
5b Middle-layer blade of the three-layer AACTRB;
5q Pin holes locations on one end of the middle-layer blade 5b;
5Q Section view of FIG. 5B;
5x 5b thickness;
5y 5b height (FIG. 10C);
FIG. 6
6a Rectangular openings on the rear-layer blade 6b;
6b Rear-layer blade of the three-layer AACTRB;
6q Screw locations at both ends of 6b to attach 6b to its 8h;
6q' Screw locations on 8h connecting 8h to 6b (FIG. 8);
6s Screw locations on 6b to attach 6b to 4b;
6x Thickness of 6b;
FIG. 7
7d Rotating disk connecting four 8h per 7d;
7q Screw locations on 7d connecting 7d to 8h;
7q' Screw locations on 8h to connect 8h to 7d (FIG. 8);
FIG. 8
8h Block attached on rotating disk 7d, blades 4b and 6b. Block 8h serves as a housing for 5b connection to 10a;
8q Screw locations on 8h to connecting 8h to its cover plate 9a;
8q' Screw locations on 9a to attach 9a on 8h (FIG. 9);
FIG. 9
9a Cover plate of 8h for servicing 5b and 10a connection;
9g Groves on 9a to allow extended 10p oscillation movement;
9x Grove depth to allow extended 10p movement;
FIG. 10
10a Oscillating block. 10a is connected to 5b at 10q and 11r at 10s;
10q Pin 10p locations connecting 10a to 5b;
10p Pins used to connect 5b to 10a;
10s Hole locations on 10a for shafts 11s which are connected to rollers 11r;
10x Width of 10a;
10y Height of 10a;
FIG. 11
11r Rollers attached to 11s. Rollers 11r are pressed against twisted ring cam surfaces 12a and 12b of 12c on the rim of stationary cam disk 12d;
11n Nuts;
11s Shafts;
11w Washers;
FIG. 12
12a Cam surface on one side of twisted ring 12c;
12a' Cam surface on opposite side of 12a of twisted ring 12c;
12c Twisted ring 12c is the rim of 12d. The twisted ring profile is the cam 12c profile;
12d Stationary disk has twisted ring shaped rim 12c;
FIG. 13
13r Rotating arms which transmit power from 1p to AACTRB propellers;
13b Screw locations (on the back side of rotation 1ω) attach 14a to 13r;
13c Screw locations (on the front side of rotation 1ω) attach 14a to 13r;
13k Keys attaching 13r to 1p;
13x Depth of cut at each 13r top to fit (thickness wise) assembled 4b, 5b, 6b;
13x' Flange width of 6b;
13x" Flange width of 4b;
13y Height of 4b;
13z Width of 13r;
13w Depth of 13r;
FIG. 14
14a Cover clamp attached to and hold assembled 4b, 5b, 6b on 13r;
14b Screw locations to attach 14a to back side (behind 1ω rotation) of 13r;
14c Screw locations to attach 14a to front side (in front of 1ω rotation) of 13r;
14w Depth of clamp 14a;
FIG. 15
15a Section 2Q view (FIG. 2B) of the right-half or left-half of a AACTRB propeller;
15g Gear box for each TR-propeller. Three 15g inside each 21g on each side of a FW;
15Q Combining the left-side 15a and the right-side 15a with fuselage 19f in middle. Also see FIG. 21.
FIG. 16
16a Sectional view of a typical FW (19w or 19w') with 15a on top-side, bottom-side and top-flap on each side of each FW;
16b FW span-wise airfoil strips position during VTOL/FWA hover;
16c Airfoil strips 166 position during VTOL/FWA forward flight;
$16v_0$ Air velocity in front of a FW 16a at zero angle-of-attack, 16α=0;
$16v_1$ Average air velocity over FW 16a top surface;
$16v_2$ Average air velocity over FW 16a bottom surface;
$16v_3$ Average air velocity over FW flap top surface;
$16v_4$ Redirected $16v_2$, as it is deflected downwards by flap 16f;
$16v_5$ Average 16a downwash, which is the average velocity of $16v_3$ and $16v_4$;
16α Angle-of-attack;
16l Lift-force vector;
16d Drag-force vector;
16t Thrust-force vector;
16f Flap on either left or sides of FW 19w;
16f' Flap on either left or side of FW 19w';
16k Hydraulics control flap 16f deflections 16δ
16h Flap hinge rod;
16δ Flap deflection angle=19δ;
16δ' Flap deflection angle=19δ';
16Q Adjustable embedded positions of 15Q;
FIG. 17
17a Compressed air;
17b FW span-wise tube, carrying compressed air 17a to FW wing tips. It is also the FW's tilt β axis 21s of center line 21x;
17c Combustion chambers;
17e Combustion exhausts jet;
17f Fuel injection regulator;
17f' Fuel sprays;
17g Gears to maintain RCJ jets 17e parallel to FW 19w rotational 19φ plane during FW19w tilt 19β maneuvers;
17j FW wing-tip RCJ cluster;
17k Spark regulator;
17k' Spark inside 17c;
17m Electric stepping motors connected to gears 17g;
17n RCJ jet nozzle;

17*p* Compressed air 17*a* valves;
17*s* Solenoids used to control the open/close of valves 17*p*;
17*t* RCJ jet thrust pulse. 17*t* is parallel to 17*e* at 19*w* wing tips;
17*t'* RCJ jet thrust pulse at 19*w'* wing tips;
17*s'* Solenoids used to lock/unlock 17*j* on FW wing-tip structure;
17*s"* bearing between 17*j* and FW tip structure 19*w*;
FIG. 18
18*e* Engine;
18*f* FWA fuselage;
18*g* Gear box. Same as gear box 21*g*;
18*h* FWA horizontal tail stabilizer;
18*t* FWA vertical tail;
18*w* FWA FW. Same as FW 19*w*;
18*z* Vertical support for 18*w* on top of 18*f*;
FIG. 19
19*l* Lift-force vector on front FW 19*w*;
19*l'* Lift-force vector on rear FW 19*w'*;
19*d* Drag-force vector on front FW 19*w*;
19*d'* Drag-force vector on rear FW 19*w'*;
19*t* Thrust-force vector on front FW 19*w*;
19*t'* Thrust-force vector on rear FW 19*w'*;
19*f* VTOL/FWA fuselage;
19*h* Horizontal stabilizer inside 19*w* downwash $19v_5$ during hover;
19*h'* Horizontal stabilizer inside 19*w'* downwash $19v_5'$ during hover;
19*p* Optional propellers. 19*p* can tilt and rotate to position 19β';
$19v_1$ Average air velocity above 19*w* top surface. $19v_1 > 19v_2$;
$19v_2$ Average air velocity below 19*w* bottom surface;
$19v_3$ Average air velocity above flap 19*f* top surface. $19v_1 =< 19v_3$;
$19v_5$ Average downwash velocity of 19*w*;
$19v_1'$ Average air velocity above 19*w'* top surface. $19v_1' > 19v_2'$;
$19v_2'$ Average air velocity below 19*w'* bottom surface;
$19v_3'$ Average air velocity above flap 19*f'* top surface. $19v_1' 19v_3'$;
$19v_5'$ Average downwash velocity of 19*w'*;
19β Front FW 19*w* tilt angle;
19φ Front FW 19*w* horizontal rotation angle;
19β' Rear FW 19*w'* tilt angle;
19φ' Rear FW 19*w'* horizontal rotation angle;
19δ Independent left-flap or right-flap 19*f* deflection angles;
19δ' Independent left-flap or right-flap 19*f* deflection angles;
19*m* VTOL/FWA weight;
FIG. 20
20*n* The nth RCJ jet 17*e* pulse cycle;
20(*n*+1) The (n+1)th jet 17*e* pulse cycle;
20*n*+2) The (n+2)th jet 17*e* pulse cycle;
FIG. 21
21*a* Two FW support beams anchored on top rotatable disk 21*b*;
21*b* Rotatable disk inside fuselage 19*f* top structure;
21*c* Beam connecting rear left-side 21*g* and rear right-side 21*g*. It is also connected to one end of hydraulics 21*h*;
21*e* Engine located on top of disk 21*d* between two 21*a* beams;
21*g* Two big gear boxes; as part of the left-side and part of right-side FW structure. These two 21*g* are connected together by beams 21*d*, beam 21*c* and power shaft 21*s*. Smaller gear boxes 15*g* and power transmission shafts are located inside these 21*g* to supply power to different TR-propellers 15*a*. Power transmitted to the flap-top TR-propellers to allow flap 16*f* deflections independent of the FW tilt angles;
21*h* Two hydraulics; each with its one end attach to the rotating disk 21*d* and its other end attached to the beam 21*c*. These hydraulics are used to control the FW 19*w* tilt angles 19β;
21*m* Optional electric motors to fine tune 19*w* rotation 19φ,
21*n* Gear attached to 21*m*;
21*z* Gears located at the bottom center of disk 21*b*;
FIG. 22
22*p* Pilot seats for VTOL/FWA normal operations;
22*i* Instrument & control panel for normal VTOL/FWA flight;
22*i'* Instrument and control panel for window rescue operation;
22*s'* Folded stairs 23*s* and folded extendable walking plank 23*f'*;
FIG. 23
23*f'* Telescopic extended walking plank;
23*h* Four independent rotatable hydraulic system to push legs 23*r* and feet 23*q* on building outside wall 23*z*;
23*h'* 23*h* in folding position;
23*q* Foot attached to each leg 23*r* with controls. Each foot can be a wheel with an electric motor at its hub;
23*j* Sensors
23*k* Air inflated cover to reduce drag during normal flight;
23*n* Knees with controls;
23*r* Leg in extended position;
23*r'* Leg in folded position;
23*s* Stairs in extended position;
23*v* Escape path from inside window 23*y* following steps 23*s*, extended walking plank 23*f* to inside VTOL/FWA fuselage 19*f*;
23*x* Floor inside high rise building 23*z* window 23*y*;
23*y* High rise building window;
23*z* High rise building;
FIG. 24
24*a* Rescue VTOL/FWA in high speed level flight towards a high rise building 23*z*;
24*b* Reducing VTOL/FWA forward flight speed by adjusting 19β, 19β', all 16*f* and TR-propellers RPM to achieve low speed descent to desired window opening;
24*c* Rotate 19*w* 180° 19φ so that both 19*w* and 19*w'* leading edges will be pointing upward and toward each other and the VTOL/FWA achieves hover condition with its rear-end pointing at the desired window 23*y*;
24*d* Extend all legs from 23*r'* to 23*r*. Next, change from hover to low speed backward level flight until all legs 23*r* are firmly pushed on the building outside wall. Finally, extend 23*f* to the window outside glass; If 23*f* is not accurately aligned to the window opening, the pilot must perform a walking maneuver as illustrated in FIG. 23C;
24*e* Break the window 23*y* before extend the stairs 23*s* into the window 23*y* all the way to the floor 23*x* to allow people to walk, along path 23*v*, out the window 23*y* into the waiting VTOL/FWA;
24*f* After all people are inside the VTOL/FWA, slowly move away from window 23*y* and retract 23*s* and 23*f* back to 22*s'* position as illustrated in FIG. 22A;
24*g* Pilot seated at 23*p* take over VTOL/FWA controls. First rotate 19*w* azimuth 19*q* 180°, then tilt both 19β, 19β' and all 16*f* and 16*f'* close to their horizontal positions for high speed level flight towards a desired landing site;

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1A illustrates a transverse-radial four blade $1b$ propeller. This propeller is powered by an engine $20e$ through a shaft $1p$ and arms $13r$ at the middle of $1b$ and at both $1b$ ends by rotating disks $7d$. Where $1b$ ends are attached to $7d$ via block $8h$. Details of $7d$ and $8h$ are illustrated in FIG. 7 and FIG. 8 respectively. Also identified are rotation direction $1\omega$, rotation angle $\theta$ and regions of rotations $1e$, $1f$, $1g$ and $1h$ for later references;

FIG. 1B illustrates the changing of blade $1b$ area $1a$ in each revolution cycle. Two types of transverse-radial blades $1b$ are compared: The straight line represents a constant area $1b$ (CATRB) and an asymmetric-area-changing $1b$ (AACTRB) is represented by a curved line $1j$. The asymmetric-area-changing of $1j$ in the four regions in each revolution are identified as $1e$, $1f$, $1g$ and $1h$: maximum $1a$ in $1e$ region, minimum $1a$ in $1g$ region, increasing $1a$ in $1h$ region and decreasing $1a$ in $1f$ region. These four regions will be referenced in later discussions;

FIG. 1C illustrates the estimated $1b$ drag coefficients $1d$ as a function of rotation angle $\theta$. Line $1m$ represents constant $1d$ for a constant area blade $1i$ (CATRB). Curved $1n$ represents asymmetric changing $1d$ for an asymmetric-area-changing blade $1j$ (AACTRB). Also illustrated are the changes of $1n$ in these four regions $1e$, $1f$, $1g$ and $1h$ during each rotation cycle;

FIG. 2A illustrates the net air vector $2v'$ and net reaction thrust $2t'$ produced by rotating an AACTRB propeller in free space in each revolution. The area $1a$ characteristic of this AACTRB is illustrated by $1j$;

FIG. 2B illustrates the same AACTRB propeller in FIG. 2A and is half submerged inside a wing surface $2k$. The net air vector $2v$ will be used to develop lift $17l$ on the wing surface $2k$. The net reaction thrust $2t$ developed is acting on the power shaft $1p$, which is connected to the wing structure $2k$. This thrust vector $2t$ will be used to provide wing $2k$ propulsion $17t$ as will be described later. Section $2Q$ will be illustrated in FIG. 15;

FIG. 2C illustrates the net air vector $2u'$ and there will be no net reaction thrust vector $2g'$ (=0) produced by a Constant-Area-Transverse-Radial-Blade (CATRB) propeller rotating in free space. The constant area $1a$ characteristic of this CATRB is illustrated by $1i$;

FIG. 2D illustrates the same CATRB propeller in FIG. 2C and is half submerged inside a wing surface $2k$. The net air vector $2u$ can be used to develop lift on wing $2k$. The much smaller net thrust $2g$ ($0<2g<<2t$) developed on $1p$ can contribute to wing $2k$ propulsion;

FIG. 3A illustrates the three layers $4b$, $5b$, $6b$ of an Asymmetric-Area-Changing-Transverse-Radial-Blade (AACTRB) in region $1e$ of each rotation cycle. All three layers have multiple numbers of the same size rectangular openings $4a$, $5a$, $6a$ of same width $\Delta$. The space between adjacent rectangular openings on each blade layer (between $4a$ on $4b$, or between $5a$ on $5b$ or between $6a$ on $6b$) are also $\Delta$. Layers $4b$ and $6b$ are fixed on the rotating arm $13r$. All corresponding rectangular openings $4a$ and $6a$ on layers $4b$ and $6b$ are always aligned. It is the middle-layer $5b$, which is sandwiched between $4b$ and $6b$, and oscillates in the $4b$ and $6b$ length-wise direction. The maximum oscillation amplitude is $\Delta$. Therefore, as $5b$ oscillates in each revolution cycle it blocks the air flow completely in $1e$ region, or partially blocks the air flow in regions $1f$ and $1h$ or opens the three-layer blade completely to let maximum air flow through in region $1g$. As illustrated in FIG. 2B $1g$ region is completely inside the wing structure $2k$, $1e$ region is completely outside the wing surface $2k$. $1f$ and $1h$ regions are half way covered by the wing structure $2k$. Each AACTRB rotates through the four regions of $1j$ in each revolution cycle: Shown here in FIG. 3A is the middle-layer blade $5b$ completely blocking the air flow through this three-layer blade when $1j$ is in region $1e$. Holes $5q$ on $5b$ are for pins $10\beta$, where $5b$ is attached to an oscillating block $10a$ at holes $10q$. The symbol A represents the $5b$ maximum oscillation amplitude. $\Delta$ is also the rectangular opening $4a$, $5a$, $6a$ widths of all three-layer blades $4a$, $5a$ and $6a$. $\Delta$ is also the distance between rectangular openings $4a$, $5a$, $6b$ in each of the three-layer blades $4b$, $5b$ and $6b$ respectively;

FIG. 3B illustrates FIG. 3A further where $5b$ partially blocks the air flow through this three-layer blade $4b$, $5b$, $6b$. This three-layer AACTRB $1j$ is in partially-open region $1f$ or in partially-closed region $1h$;

FIG. 3C illustrates FIG. 3B further where the middle-layer blade $5b$ aligns all its rectangular openings $5a$ with the rectangular openings $4a$ of $4b$ and $6a$ of $6b$, thus allowing maximum air flow through and places the AACTRB $1j$ in the $1g$ region;

FIG. 3D illustrates the sectional $3Q$ view of FIG. 3A. $3r$ are rollers which are not shown in FIG. 3A;

FIG. 3E illustrates the sectional $3Q'$ view of FIG. 3B. $3r$ are rollers which are not shown in FIG. 3B;

FIG. 3F illustrates the sectional $3Q''$ view of FIG. 3C. $3r$ are rollers which are not shown in FIG. 3C;

FIG. 4A illustrates the top view of the front-blade $4b$ of the three-layer $4b$, $5b$, $6b$ AACTERB. Multiple numbers of rectangular openings $4a$ of width $\Delta$ are aligned along the $4b$ span. The distance between the adjacent rectangular openings $4a$ is also $\Delta$. The flange width of $4b$ is $13x''$ which gives $4b$ strength and allows $4b$ to attach to $6b$ by screws at $4s$. Locations $4q$ are for screw locations to attach $4b$ to $8h$ at $4q'$ shown in FIG. 8. $4x$ is the thickness of $4b$. Space $13z$ at the middle of $4b$ is for rotating arm $13r$.

FIG. 4B illustrates the rear view of the FIG. 4A;

FIG. 4C illustrates the front view of FIG. 4A;

FIG. 4D illustrates the end view of FIG. 4A. Dimensions $13y$ and $13x''$ allow the assembled three-layer-blade $4b$, $5b$, $6b$ to be attached to rotating arm $13r$ (FIG. 14D);

FIG. 5A illustrates the front view of the middle-blade $5b$ of the three-layer AACTERB. Rectangular openings $5a$ of width $\Delta$ align the entire span of $5b$. The distance between adjacent rectangular openings $5a$ is also $\Delta$. $5q$ are for pin $10p$ to attach $5b$ to oscillating block $10a$ at $10q$ (FIG. 10A). $5x$ is the thickness of $5b$. When $5b$ is in the $1g$ region, the rectangular openings $4a$, $5a$, $6a$ on all three layers are aligned to allow maximum air flow through $4b$, $5b$, and $6b$. When $5b$ is in the $1h$ or $1f$ regions, the rectangular openings $5a$ on $5b$ are partially aligned with the rectangular openings $4a$ on $4b$ and $6a$ on $6b$, to allow a moderate amount of air flow through $4b$, $5b$, and $6b$. When $5b$ is in the $1e$ region, the rectangular openings $5a$ on $5b$ are aligned with the spaces between the adjacent rectangular openings of $4a$ and $6a$ and no air can flow through $4b$, $5b$ and $6b$;

FIG. 5B illustrates the FIG. 5A sectional $5Q$ view of the middle-blade $5b$ of the three-layer AACTERB;

FIG. 5C illustrates the end view of the middle-blade $5b$ of the three-layer AACTERB.

FIG. 6A illustrates the front view of the rear-blade $6b$ of the three-layer AACTERB. Rectangular openings $6a$ of width $\Delta$ are aligned along $6b$ span. The distance between any adjacent rectangular opening $6a$ is also $\Delta$. $6s$ are screw locations to join back-layer 6b with front-layer 4b. The rectangular openings 4a and 6a are always aligned. 6q are screw locations where 6b is attached to block 8h at 6q' as shown in FIG. 8. 6x is the thickness of 6b. The space 13z at the middle of 6b is for rotating arm 13r. Flanges width 13x' gives 6b strength and allows 6b to attach to 4b at 6s;

FIG. 6B illustrates the top view of FIG. 6A;

FIG. 6C illustrates the rear and view of the rear-blade 6b of the three-layer AACTERB;

FIG. 6D illustrates the end view of the rear-blade 6b of the three-layer AACTERB;

FIG. 7A illustrates the front view of one of two rotating disks 7d designed to hold both ends of each assembled 4b, 5b, 6b AACTRB as first illustrated as 1b in FIG. 1A. The four dashed square outlines on 7d are for blocks 8h. Where each 8h connects a 4b and a 6b ends to disk 7d. 7q are screw locations on 7d connecting 7d to 8h. 8h is first identified in FIG. 1A and illustrated in detail in FIG. 8;

FIG. 7B illustrates the side view of one of two rotating disks 7d designed to hold both ends of each assembled 4b, 5b, 6b AACTRB as first illustrated as 1b in FIG. 1A;

FIG. 8A illustrates the front end view of the connecting block 8h which were first identified in FIG. 1A. Each 8h provides a housing space to allow a middle-layer 5b and 10a to be connected and oscillate together with maximum oscillation amplitude Δ. Other items in FIG. 8 are: 7q' are screw locations connecting 8h to 7d. 4q' are screw locations connecting 8h to 4b. 6q' are screw locations connecting 8h to 6b. 8q are screws locations connecting 8h to its cover plate 9a;

FIG. 8B illustrates the side view of FIG. 8A;

FIG. 8C illustrates the back end view of FIG. 8B;

FIG. 8D illustrates the top view of FIG. 8B;

FIG. 9A illustrates the side view of 8h cover plate 9a. Screw locations 8q' connect 9a to 8h. When opened, this cover plate 9a allows for servicing of the connection between the middle-layer 5b and oscillating push-and-pull block 10a. 9g are groves to allow movement of pin 10a ends, which are slightly protruded out of one side of 10a at 10q to allow 10p to be pulled out for repair;

FIG. 9B illustrates the side view of 8h cover plate 9a;

FIG. 9C illustrates the top view of 8h cover plate 9a;

FIG. 10A illustrates the side view of the oscillating push-and-pull block 10a which connects to the middle-layer 5b by pins 10p at locations 10φ. 10s are locations for two shafts 11s which connect to rollers 11r as illustrated in FIG. 11C. Three pins 10p are used to connect 5b to 10a at 10φ. Pin 10p length is slightly longer than 10x to allow pins to be pulled out for service;

FIG. 10B illustrates the top view of FIG. 10A;

FIG. 10C illustrates the front end view of FIG. 10A;

FIG. 10D illustrates the side view of the pins 10p used to connect 10a to middle-layer 5b. Pin length is slightly greater than 10x, but not more than the grove 9g depth 9x, for service pull out;

FIG. 10E illustrates the end view of the pins 10p;

FIG. 11A illustrates the end view of the rollers 11r. Each roller 11r can rotate at the end of a shaft 11s. These two rollers 11r are placed on either sides of the twisted ring '12c presses against 12c surfaces 12a and 12a', where 12c is the twisted rim of stationary cam 12d;

FIG. 11B illustrates the side view of the rollers 11r;

FIG. 11C illustrates the various connections between rollers 11r and roller shafts 11s, between the rollers 11r and stationary cam surfaces 12a and 12a' of 12c, between push-and-pull oscillating block 10a and block 8h, between stationary disk 7d and 8h, between 8h and three-layer AACTRB 4b, 5b, 6b. 11w are washers and 110 are nuts;

FIG. 12A illustrates the front view of the stationary cam disk 12d. The cam profiles are determined by the twisted ring 12c surfaces 12a and 12a' on the rim of 12d which are partially visible in FIG. 12B. Two rollers 11r are placed on either sides of 12d pressing against its twisted rim cam 12c surfaces 12a and 12a';

FIG. 12B illustrates the side view of the stationary cam disk 12d. The cam profiles are determined by the twisted ring 12c surfaces 12a and 12a' on the rim of 12d which are partially visible. Two rollers 11r are placed on either sides of 12d pressing against its twisted rim cam 12c surfaces 12a and 12a';

FIG. 12C illustrates a typical profile of this twisted ring 12c surfaces 12a and 12a'. Superimposed on FIG. 12C are the 1j rotation regions 1e, 1f, 1g and 1h corresponding to the oscillation positions of middle-layer blade 5b, which identify the asymmetric changing of a three-layer AACTRB area 1j in each AACTRB revolution cycle as first illustrated in FIG. 1B. Symbol A shown in FIG. 12B and FIG. 12C represents the rectangular opening 4a, 5a, 6a width and also the space between all adjacent rectangular openings on each AACTRB layers 4b, 5b, 6b. The vibrations due to 5b (and 10a) axial 1P direction oscillations can be reduced by rotating the stationary cam disk 12d on the right side 15a of the FW fuselage 180° opposite the 12d on the left side 15a' of the FW fuselage. In other words, the corresponding middle-layer blades 5b on both sides of the FW fuselage will be synchronized to oscillate towards or away-from each other at all times. Of course, this is assuming the 15a RPM is synchronized to the 15a' RPM;

FIG. 13A illustrates the front view of the rotating arm 13r which transmits the engine 20e power from 1p to 13r and finally to the four AACTRB propellers. The three-layer AACTRB 4b, 5b, 6b are assembled and placed at the tip of each 13r and held onto 13r by cover clamp 14a (FIG. 14A). 13x is the sum of the three-layer blade thickness: 4x plus 5x plus 6x. The flange of 4b is 13x" which gives 4b strength and allow 4b to attach to 6b at 4s. 13y is the height of 4b. 13z is the 13r width. Screw locations 13b and 13c are for clamp 14a to attach on 13r. Keys 13k attach 13r onto power shaft 1p;

FIG. 13B illustrates the side view of FIG. 13A;

FIG. 14A illustrates the side view of a cover clamp 14a which holds each assembled three-layer 4b, 5b, 6b AAC-TRB to its rotating arm 13r. 13z is the width of 13r. Screw locations 14b and 14c on 14a align to screws locations 13b and 13c respectively on 13r;

FIG. 14B illustrates the front view of FIG. 14A;

FIG. 14C illustrates the top view of FIG. 14A;

FIG. 14D is a sectional view illustrating the assembled 14a, 13r, 6b, 5b and 4b;

FIG. 15 is a sectional 2Q view of FIG. 2B. It views an AACTRB propeller from downstream of the air flow 2v'. This view is identified as 15Q. Items above 1p are outside the FW surface 2k. Items below 1p are submerged inside the FW surface 2k. FIG. 15 illustrates the connections of the key components which make up a Flying-Wing AACTRB propeller 15Q: The FW left AACTRB propeller is labeled as 15a and the FW right AACTRB propeller is also labeled as 15a. Key items visible in 15Q are: two of the three-layer AACTRB 4b and 6b, rotating arms 13r, rotating end disks 7d, stationary cam disks 12d, connecting blocks 8h, parts of oscillating block 10a, rollers 11r, small gear box 15g, power shafts 1p. A more detailed connection between the left and right side 15a is shown in FIG. 21, where three small gear boxes 15g are placed inside one big gear box 21g on each sides of the FW. The two big gear boxes 21g on each side of each FW are connected by 21d, 21s and 21c. FIG. 15 can also be used to illustrate the CATRB propellers equipped FW, by simply ignoring items in FIG. 15: 7d, 8h, 10a, 11r, 12d and consider 4b, 5b, 6b, representing constant area propeller blades. Therefore, the symbol 15Q will be used to represent both CATRB and AACTRB equipped FW.

FIG. 16A illustrates a side sectional view of air flow around a Flying-Wing (FW). This FW is equipped with three sets of Transverse-Radial propellers 15Q. The first 15Q is located on the FW top surface near the FW leading edge and it is partially submerged inside the FW top surface 2k and rotating CW (view from left wing tip) to push the air $16v_1$ towards the FW trailing edge. The second 15Q is located near the FW bottom surface leading edge and it is also partially submerged inside the FW bottom surface 2k and rotating CCW to push the air at a slower speed $16v_2$ ($<16v_1$) towards the FW trailing edge. The third 15Q is partially covered by the FW flap 16f top surface and it is part of the FW flap and it is rotating CW to push the air $16v_1$ further backwards and downwards $16v_3$ ($16v_2<16v_1<16v_3$) over the top surface of flap 16f. Two hydraulics 16k control flap 16f deflections 16δ about flap hinge axis 16h. 16Q represents controllable 15Q positions over FW surface. 16b are spanwise airfoils strips used to deflect more air backwards during hover. 16b are stored under FW top surface at 16c during high speed forward flight.

FIG. 16B illustrates the air flow pattern over a tilted 19β FW with deflected 16δ flap 16f. The downward airflow $16V_5$ plus downward deflected $16V_4$ generates more lift on FW. The flap top 15Q will prevent wing stall at high angle of attack 16∝ and high flap deflections 16δ.

FIG. 16C illustrates the resultant lift 16l, drag 16d and thrust 16t force vectors acting on the stationary or non-stationary FW. 17j are wing tip RCJ clusters.

FIG. 17A is the top view illustrating a typical RCJ (Reaction Control Jet) cluster with two jet nozzles 17n. Compressed air 17a is piped from FW tilt 20β axis 21s to wing tip values 17p. Selected opening/closing of valves by solenoid 17s will allow air 17a to flow into specific combustion chamber 17c. Fuel 17f is injected into chamber 17c and ignited by spark 17k'. The combustion exhaust 17e jets out of nozzle 17n producing a thrust pulse 17t on the FW tip perpendicular to 21s. After the chamber 17c pressure has reduced below air 17a pressure, the solenoid will reopen 17p to repeat the jet pulse 17e cycle as shown in FIG. 20.

FIG. 17B is the section A-A of FIG. 17A.

FIGS. 17CA, 17CB, and 17CC shows the three views of a solenoid 17s which controls the opening/closing of a valve 17p.

FIG. 18A illustrates the side view of a Flying-Wing-Aircraft (FWA): A FW 18w (=19w) is supported by a vertical fin structure 18z above the fuselage 18f. A regular horizontal stabilizer 18h sets on top of a vertical tail 18t which is located above the fuselage 18f tail section. 18e is the engine, 18g are the gear boxes, 15a are the AACTRB or CATRB propellers identified in FIG. 15. This single FW aircraft is designed to take-off and land on short runways;

FIG. 18B illustrates the top view of FIG. 18A;

FIG. 18C illustrates the front view of FIG. 18B;

FIG. 19A illustrates a typical VTOL/FWA in hover, low-speed ascent/descent, low-speed forward/backward level flights, or ALFH states. Both the front FW 19w and the rear 19w' are tilted up their leading edges pointing toward each other at tilt angles 19β and 19β' respectively. 21s is 19w tilt 19β axis. Two posts 21a attached to rotatable 19φ disk 21b support power shaft 21s. $19v_1$, $19v_2$, $19v_3$, and $19v_5$ are air velocities around 19w, 19l, 19d and 19t are resultant lift, drag and thrust force vectors acting on 19w. 19 φ is 19w horizontal rotation angle. Surface 19h is rotated into downstream $19v_5$ to provide control during hover. 19h are rotated level (shown in dashed line) during forward flight at high speed. 19p are optional propellers that can be rotated to 19p' during ALFH state. Same definition of notations with an apostrophe for 19w'.

FIG. 19B illustrates a similar VTOL/FWA as in FIG. 19A except in FIG. 19B configuration, the leading edges of 19w and 19w' are pointing upward and away from each other. All notations in FIG. 19B have the same definition as defined in FIG. 19A.

FIG. 20 illustrates the timing sequence required to generate a sequence of jet thrust pulses 17t. They are: (1) opening/closing fresh air 17a valve 17p, (2) Fuel injection 17f on/off, (3) Spark 17k' on/off, (4) Rise/fall of combustion chamber 17c pressure, (5) Rise/fall of jet thrust pulse 17t acting on the FW wing-tips. The selection of firing each RCJ jet is determined by computer based on mission requirements.

FIG. 21A illustrates the way FW 19w is attached to the fuselage 19f by two vertical beams 21a fixed on top of a rotatable 21φ (=19q) disk 21b. This disk 21b is placed inside 19f top structure and it can rotate 21q inside 19f. Engine 21e is placed on top of 21b between the two beams 21a. Engine power is transmitted through shaft 21s, which is supported by beams 21a on either side of 21e to big gear boxes 21g located on both left and right sides of 19w. Engine power is further distributed to three smaller gear boxes 15g inside of each 21g, and then to each TR-propeller 15a. This arrangement allows all three TR-propellers 15a on each side of 19w to operate independently at different RPMs and different power levels.

The left-side and right-side of 19w are connected at three places: (1) by power shaft 21s, (2) by structure beam 21d connecting the front-left-side 21g to the front-right-side 21g of 19w and (3) by structure beam 21c connecting the rear-left-side and rear-right-side of big gear box 21g. FW 19w tilt angle 19β is controlled by two hydraulics 21h. Each 21h is attached to disk 21b at one end and at the other end attached to 21c, as illustrated in FIG. 21B. FW rotation 21q (=19φ) is controlled by wing tip RCJ jets 17j for rapid rotation 19φ. The above description applies to FW 19w'

FIG. 21B illustrates the top view of FIG. 21A;

FIG. 21C illustrates the end view of FIG. 21A. It shows the electric motor 21m and gears 21n, 21z are used to rotate the disk 21d. This figure also illustrates the 19w angle of rotation 21φ=19φ.

FIG. 21D is the bottom view of FIG. 21A. It illustrates the optional electric motor 21m, gears 21n and 21z to fine tune 21φ angle.

FIG. 22A illustrates the same VTOL/FWA of FIG. 19A. 22i are instrument and control panels. 22s' is the folded position of stairs 23s and extended walkway 23f. 23h' are hydraulics in rest position, each controls a leg 23r. 23n are knees including knee controls. 23q are feet including foot controls. 23r' are leg 23r in rest position.

FIG. 22B illustrates the transition flight from hover to low-speed forward flight. This is done by first unlocking 19w from fuselage 19f. Then use RCJ jets 17j, at 19w wing tips, to rotate 19w 180° (=21φ=19φ). Simultaneously, lock FW 19w' on fuselage 19f and use RCJ jets 17j', at 19w' wing tip, to counter rotate 19w' and 19f together until 19q completes 180° rotation and simultaneously the fuselage 19f is pointing at the desired location.

FIG. 22C illustrates the transition flight from low-speed to high-speed forward flight. This is done by simultaneously lower 19β and 19β', adjusting all TR-propellers 15a power and all flap 16f deflections until desired forward speed at desired altitude are achieved.

FIG. 23A illustrates a VTOL/FWA in backward level flight $M^{(0)}{}_{32}$ with all its feet 23q pushing firmly against the window 23y outside wall. This is also labeled as ALFH (Anchored-Level-Flight-Hover) state during window rescue mission. The telescopic walkway 23f' and stairs 23s are extended out from their folded position 22s' to the building floor 23x. This allows people marooned inside the building to walk horizontally along dashed-line-arrows path 23v, into the rescue VTOL/FWA waiting outside the window 23y.

FIG. 23B illustrates the top view of FIG. 23A. The stability of VTOL/FWA during the ALFH state is maintained by sensors 23j located at each foot 23q and at fuselage nose. Large disturbances are controlled by TR-propellers RPM, flap 16f deflections or by optional propellers at 19p'. Small disturbances are corrected by tilting one FW's 19w' wing-tip RCJ jets 17j' 90° so that these jet thrust vectors 17t' are perpendicular to the other 19w FW's wing-tip RCJ jet 17j thrust vectors 17t. These perpendicular jet thrust vectors (17t and 17t') are used to correct small variations of the VTOL/FWA's pitch, roll and yaw disturbances. In addition, the magnitude of each jet pulse can be controlled by changing: pulse duration 20n, amount of fuel injected per cycle 17k', spark-energy per cycle, etc., as illustrated in FIG. 20.

FIG. 23C illustrates a VTOL/FWA walking on building wall 23z. This is done by using on-board computer to select and free one foot 23q' at a time from the wall and then place this foot 23q' in a different location on the wall. By repeating this walking process with different foot 23q until the rear-end of VTOL/FWA is accurately aligned to the window opening.

Alternately, all feet 23q can be wheels, with electric motors at wheel hubs to drive this VTOL/FWA (in LFAH state) in all directions on a relatively smooth building outside wall.

Also, by changing VTOL/FWA from ALFH state to Backward-Ascent/Descent state or yaw maneuver. This will allow the net backward force developed on both FW to push this VTOL/FWA with wheel feet around on the building wall.

FIG. 24A illustrates the VTOL/FWA in Horizontal High Rise Building Window Rescue Mission (HHRBWRM) sequence: (1) 24a: VTOL/FWA in high speed level fight towards a high rise building 23z; (2) 24b: reducing VTOL/FWA forward speed by tilting both FWs 19w and 19w' upwards 20β and 20β' and adjusting all 15a RPMs and all flap 16f deflections 16δ; (3) 24c: after achieving the desired altitude and heading ψ to about 100 meters in front of the high rise building window 23y. Rotate 19w 180°=19φ ending with VTOL/FWA hovering with its rear-end point at window. (4) 24d: Perform backward level flight until all feet 23q are pushed firmly on building wall 23z near window 23y. If required, perform walking maneuver (FIG. 23C) to accurately align VTOL/FWA to window opening, before extending walkway 23f; (5) 24e: break the window 23y then extend the stairs 23s into the room floor 23x; (6) 24f: after people have walked horizontally into the hovering rescue VTOL/FWA (FIG. 23A), slowly retract 23s then push VTOL/FWA away from the building by adjusting 19w and 19w' tilt angles 2013 and 20β' and/or 19w and 19w' TR-propellers RPMs and/or use wing tip RCJ 17j to push VTOL/FWA away from the building 23z. Finally, retract the telescoping walkway 23f and fold back the stairs 23s to 22 s' position; and (7) 24g: rotate 19φ the FW 19w 180° to achieve the desired VTOL/FWA heading ψ, tilt both 20β and 20β' and flaps 16f down close to their respective horizontal positions for high-speed forward level flight towards a desired landing site.

What is claimed is:

1. A VTOL aircraft for performing rescue missions horizontally through high rise buildings comprising:
a fuselage with at least two flying-wings located on top adjacent opposite front and rear ends of the fuselage;
a telescopic walking plank extending from the rear end of said fuselage; and,
a plurality of extendible legs extending from said rear end of said fuselage each having a foot adapted to rest on an outside wall of a building, said walking plank adapted to penetrate a window of said building for allowing individuals to enter said aircraft; and each flying wing having clusters of reaction control jets on each wing tip of said flying wings for controlling the flying wing azimuth angle orientation relative to fuselage longitudinal axis.

2. The aircraft according to claim 1, further comprising trans-verseradial propellers on both flying wings.

3. The aircraft according to claim 1, further comprising independent propulsion systems on a left side and a right side of each flying wing.

4. The aircraft according to claim 3, wherein said independent propulsion systems simultaneously generate lift force and thrust force vectors on said flying wings.

5. The aircraft according to claim 3, wherein said independent propulsion systems are on a top surface of each side of each said flying wing pushing air over the top surface of the wing.

6. The aircraft according to claim 5, wherein the propulsion systems move air over the top surface of the flying wing at faster speed than the air speed moved over the bottom surface of the flying wing thereof.

7. The aircraft according to claim 6, wherein the propulsion systems generate a lift-force vector on a stationary flying wing.

8. The aircraft according to claim 6, wherein the propulsion systems generate a lift-force vector on a non-stationary flying wing.

9. The aircraft according to claim 3, wherein said independent propulsion systems are on a bottom surface of each side of each said flying wing pushing air over the bottom surface of the wing.

10. The aircraft according to claim 3, wherein said independent propulsion systems are on a top surface of each side of each said flying wing.

11. The aircraft according to claim 10, wherein the propulsion systems move air over the top surface of the flying wing at faster speed than the air speed moved over the bottom surface of the flying wing thereof.

12. The aircraft according to claim 10, wherein the flying wing includes a flying wing flap having a top surface and the propulsion systems move air over the top surface of the flying wing flap at faster or equal speed of the air speed moved by propulsion systems on the top surface of the flying wing.

13. The aircraft according to claim 12, wherein the propulsion systems simultaneously generate both lift-force vector and thrust force vector on a flying wing.

14. The aircraft according to claim 1, wherein each said flying wing has two independent degrees of freedom with respect to a frame of said fuselage.

15. The aircraft according to claim 14, wherein each said flying wing independently tilts (β) up-and-down about a wing-span axis.

16. The aircraft according to claim 14, wherein each said flying wing independently rotates (φ) in a horizontal plane above the fuselage.

17. The aircraft according to claim 1, wherein the propulsion systems generate thrust-force vectors on the flying wing.

18. The aircraft according to claim 1, wherein the propulsion systems generate thrust-force vectors on the flying wing.

19. The aircraft according to claim 1, wherein the propulsion systems generate thrust-force vectors on the flying wing.

20. The aircraft according to claim 1, wherein the propulsion systems generate thrust-force vectors on the flying wing.

21. The aircraft according to claim 1, wherein the aircraft is equipped with steerable wheel-feet and wheel brakes for pushing in any direction on a building wall by performing backward-ascent, backward-descent or sideway maneuvers.

22. The aircraft according to claim 1, further comprising motorized steerable wheel-feet and brakes drivable in any direction on a building wall.

23. The aircraft according to claim 1, wherein the aircraft is capable of exchanging pay-loads with a stationary or a moving object horizontally and vertically.

24. The aircraft according to claim 11, wherein the propulsion systems simultaneously generate both lift-force vector and thrust force vector on a flying wing.

\* \* \* \* \*